US012608636B2

(12) United States Patent
Mortemousque et al.

(10) Patent No.: US 12,608,636 B2
(45) Date of Patent: Apr. 21, 2026

(54) METHOD FOR DETERMINING A SPIN/CHARGE CONVERSION OPERATING POINT, METHOD FOR DETERMINING AN OPERATING POINT ASSOCIATED WITH CHARGING OF A SINGLET STATE AND SYSTEM THEREFOR

(71) Applicants:COMMISSARIAT À L'ENERGIE ATOMIQUE ET AUX ENERGIES ALTERNATIVES, Paris (FR); CENTRE NATIONAL DE LA RECHERCHE SCIENTIFIQUE, Paris (FR)

(72) Inventors: Pierre-André Mortemousque, Grenoble (FR); Baptiste Jadot, Grenoble (FR); Tristan Meunier, Grenoble (FR); Matias Urdampilleta, Grenoble (FR)

(73) Assignees: COMMISSARIAT ÀL' ENERGIE ATOMIQUE ET AUX ENERGIES ALTERNATIVES, Paris (FR); CENTRE NATIONAL DE LA RECHE, Paris (FR)

( * ) Notice: Subject to any disclaimer, the term of this patent is extended or adjusted under 35 U.S.C. 154(b) by 513 days.

(21) Appl. No.: 18/084,904

(22) Filed: Dec. 20, 2022

(65) Prior Publication Data

US 2023/0197834 A1 Jun. 22, 2023

(30) Foreign Application Priority Data

Dec. 20, 2021 (FR) ...................................... 2114009

(51) Int. Cl.
*G06N 10/40* (2022.01)

(52) U.S. Cl.
CPC .................................. *G06N 10/40* (2022.01)

(58) Field of Classification Search
CPC ............................... G06N 10/40; G06N 10/20
See application file for complete search history.

(56) References Cited

U.S. PATENT DOCUMENTS

| | | | |
|---|---|---|---|
| 10,482,388 | B1 | 11/2019 | Jock et al. |
| 2020/0127096 | A1 | 4/2020 | Eendebak et al. |

(Continued)

FOREIGN PATENT DOCUMENTS

EP 3 214 038 9/2017

OTHER PUBLICATIONS

Search Report as issued in French Patent Application No. FR2114009, dated Jul. 29, 2022.

(Continued)

*Primary Examiner* — Matthew L Reames
(74) *Attorney, Agent, or Firm* — CUSHMAN PARTNERS, LLC

(57) ABSTRACT

A method for determining an optimal spin/charge conversion operating point in a system including a pair of quantum dots including first and second quantum dots, the pair of quantum dots containing two charged particles and adopting a first charge state (2,0) in which both charged particles are in the first quantum dot, a second charge state (1,1) in which each quantum dot contains a charged particle, or a third charge state (0,2) in which both charged particles are in the second quantum dot, the charge state being a function of the voltage applied to at least two gates, the value of these voltages defining an operating point of the pair of quantum dots; the charged particles adopting a first spin state, called singlet spin state S, or a second spin state, called triplet spin state among the triplet spin state T0 or the triplet spin state T+/T−.

8 Claims, 31 Drawing Sheets

(56) References Cited

U.S. PATENT DOCUMENTS

| | | | |
|---|---|---|---|
| 2022/0198314 A1 | 6/2022 | Mortemousqu |
| 2022/0199889 A1 | 6/2022 | Mortemousqu |
| 2022/0351063 A1 | 11/2022 | Van Diepen |
| 2023/0197834 A1 | 6/2023 | Mortemousqu |
| 2024/0070513 A1 | 2/2024 | Shi |

OTHER PUBLICATIONS

Mortemousque, P.-A., et al., "Coherent control of individual electron spins in a two dimensional array of quantum dots," arxiv.org, Cornell University Library, Aug. 2018, XP081258368, 14 pages.
Jadot, B., et al., "Distant spin entanglement via fast and coherent electron shuttling," arxiv.org, Cornell University Library, Apr. 2020, XP081893699, 11 pages.
Botzem, T., et al., "Tuning methods for semiconductor spin-qubits," arxiv.org, Cornell University Library, Jan. 2018, 12 pages.
Bertrand, B., et al., "Quantum Manipulation of Two-Electron Spin States in Isolated Double Quantum Dots," Physical Review Letters 115, Aug. 2015, 5 pages.
Non-Final Office Action as issued in U.S. Appl. No. 18/084,872, dated Oct. 23, 2025.
Non-Final Office Action as issued in U.S. Appl. No. 18/084,934, dated Nov. 20, 2025.
Distant spin entanglement via fast and coherent electron shuttling Jadot et. al. (Year: 2020).
Chatte~ee, A., Stevenson, P., De Franceschi, S. et al. Semiconductor qubits in practice. Nat Rev Phys 3, 157-177 (2021).
QD Simes 2024 https://qdsim. readthedocs.io/en/stable/tutorials/ tutorialsmd/example_1_double_quantum_dot.html.

[Fig. 1]
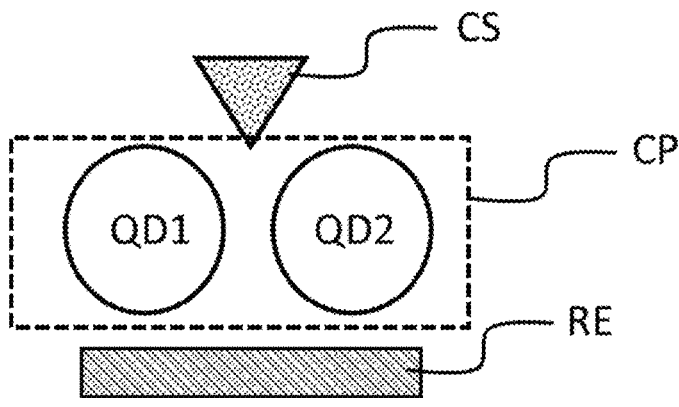
[Fig. 2]
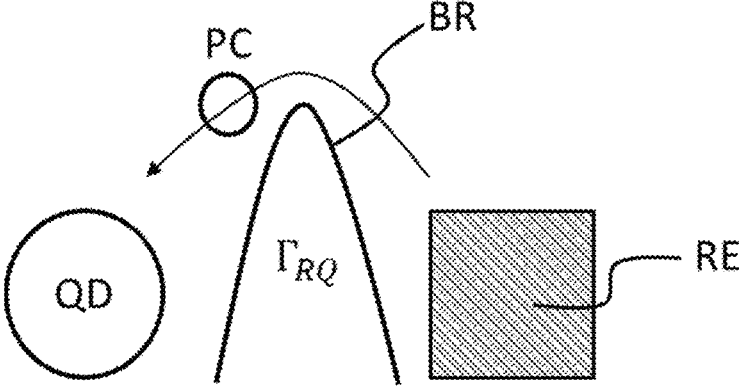

[Fig. 3]

[Fig. 4]
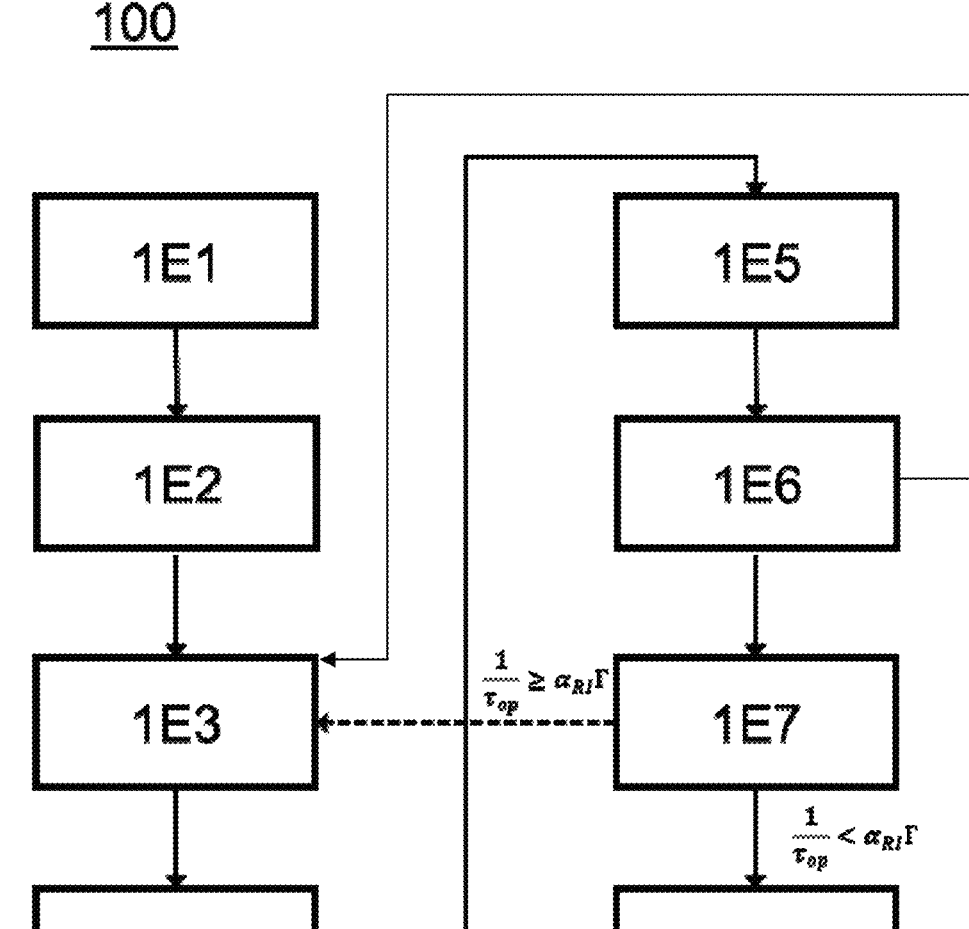

[Fig. 5]
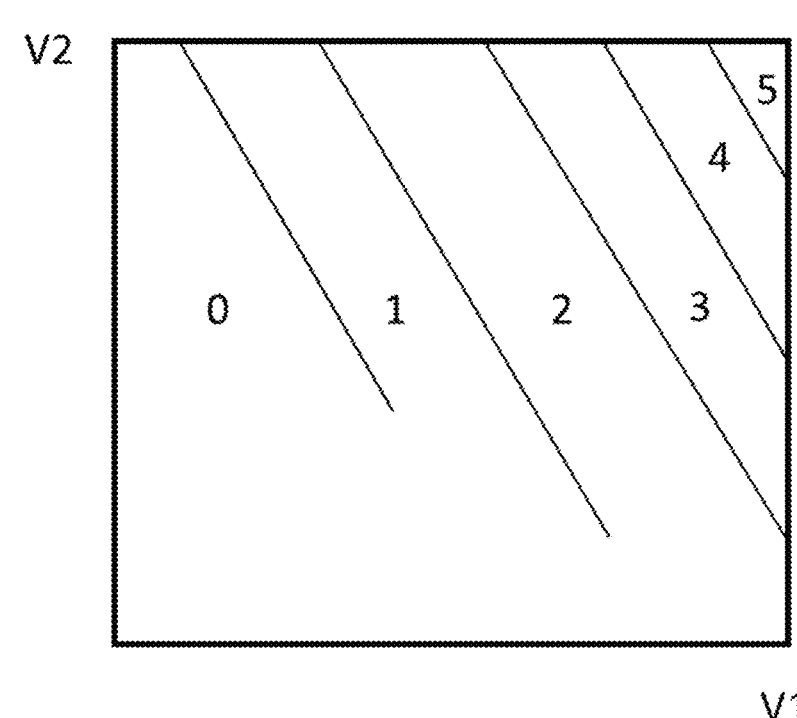
[Fig. 6]
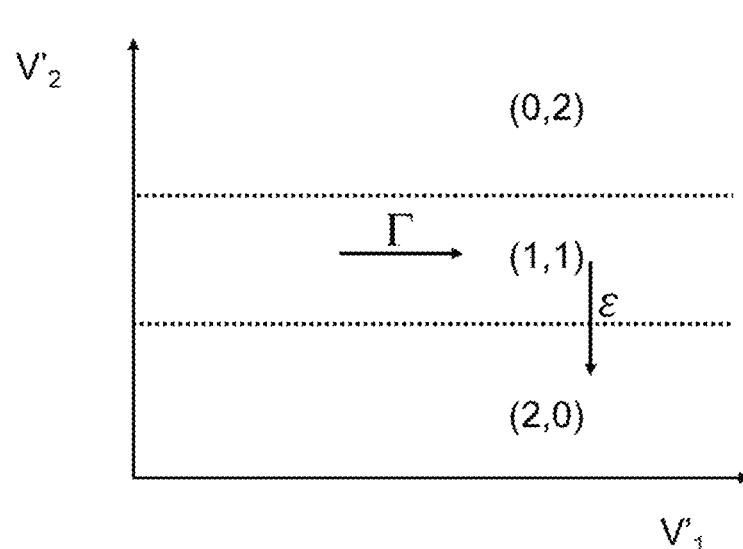

[Fig. 7]
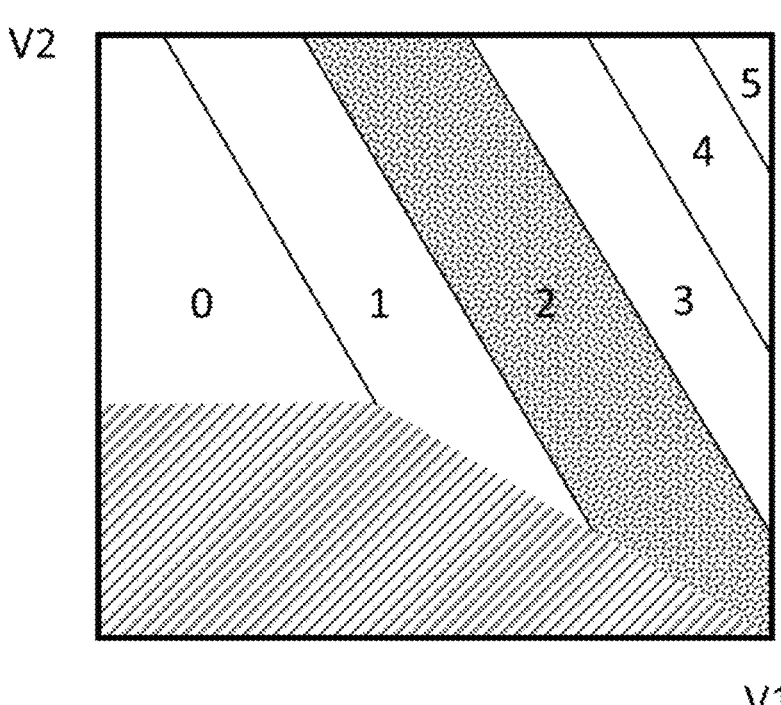
[Fig. 8]
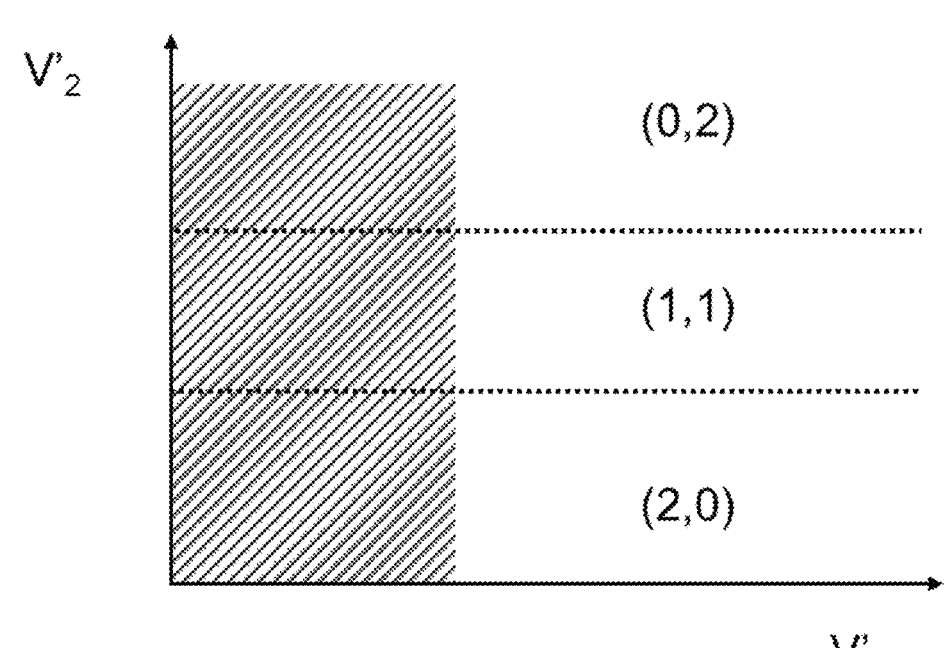

[Fig. 9A]
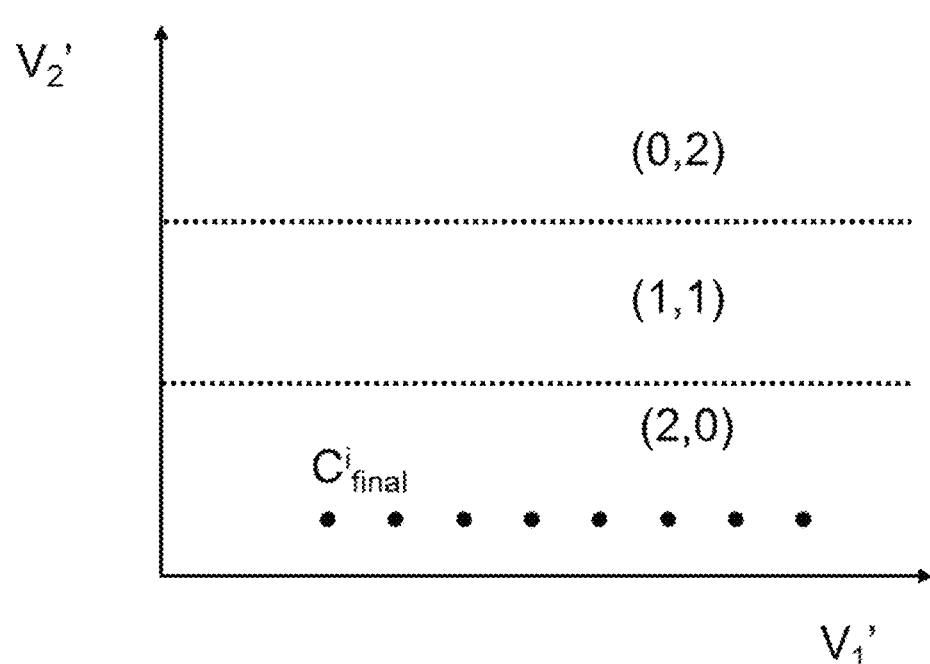
[Fig. 9B]
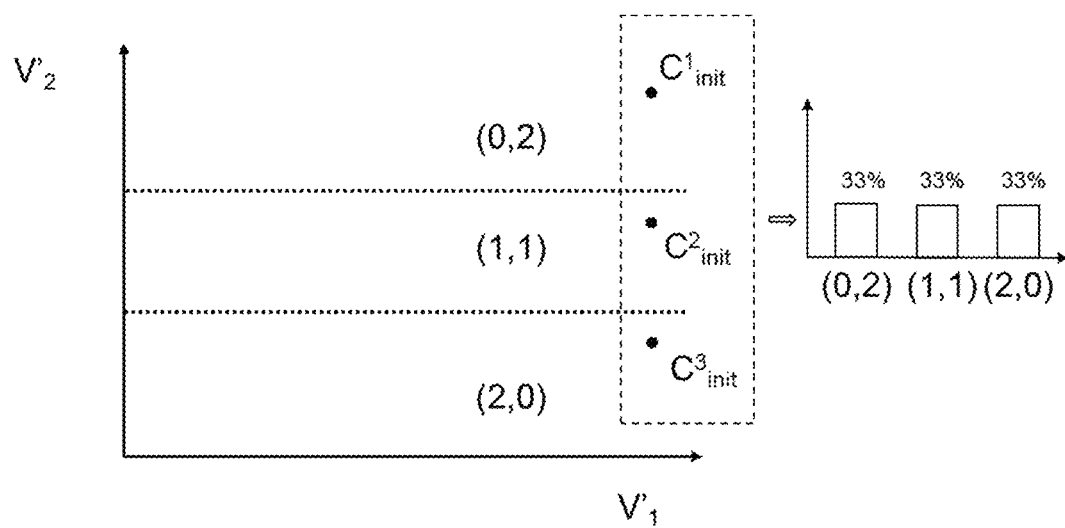

[Fig. 9C]
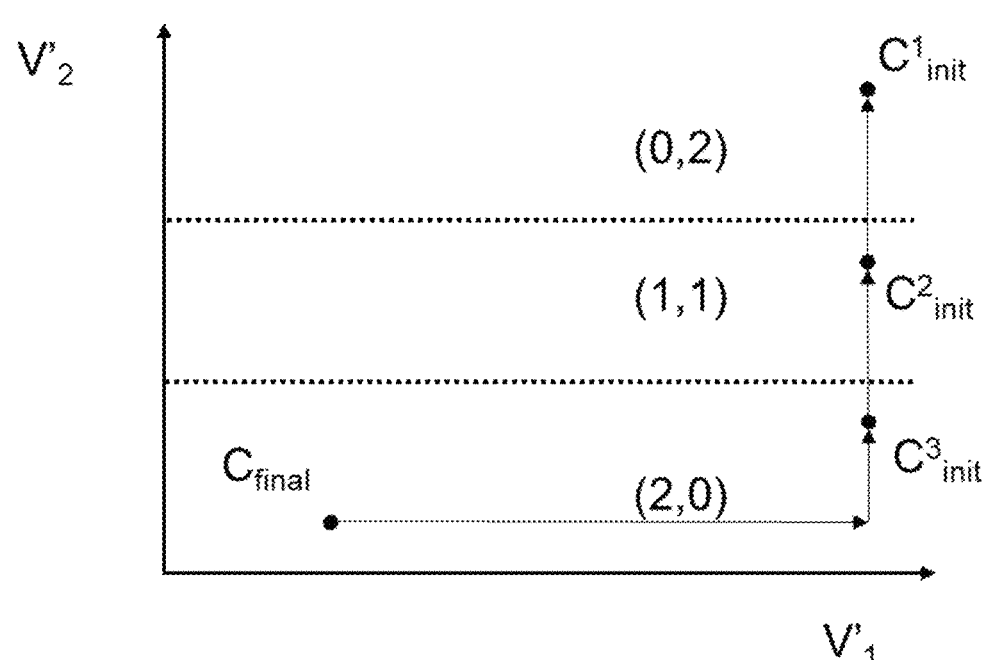
[Fig. 9D]
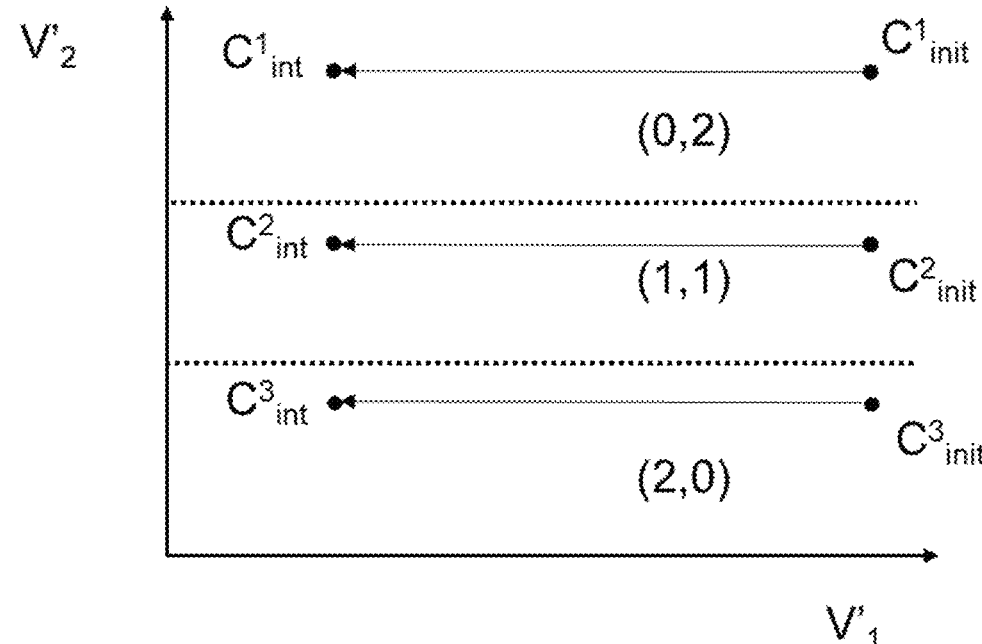

[Fig. 9E]
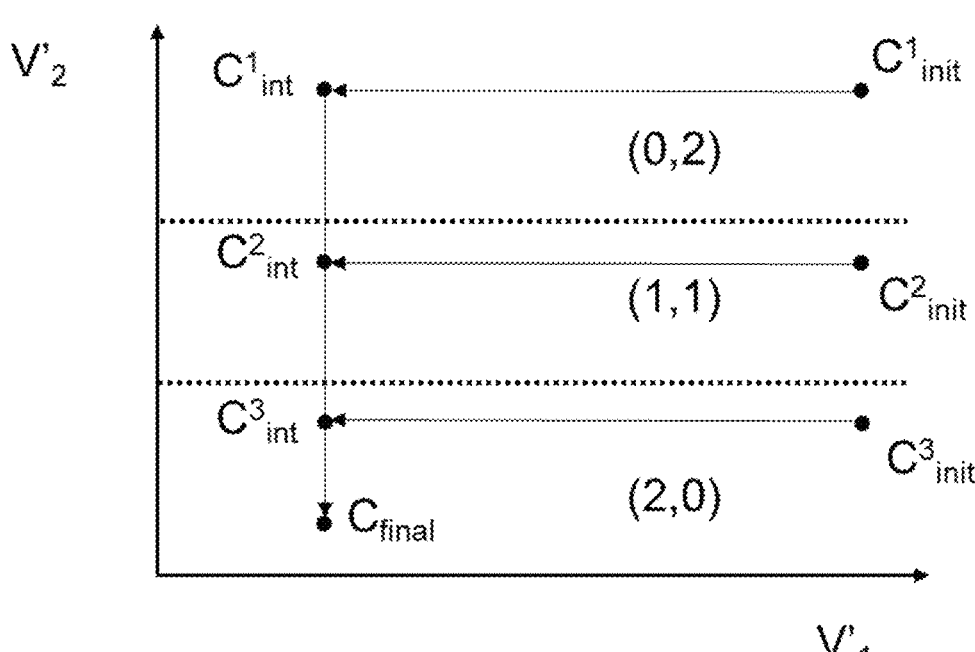
[Fig. 9F]
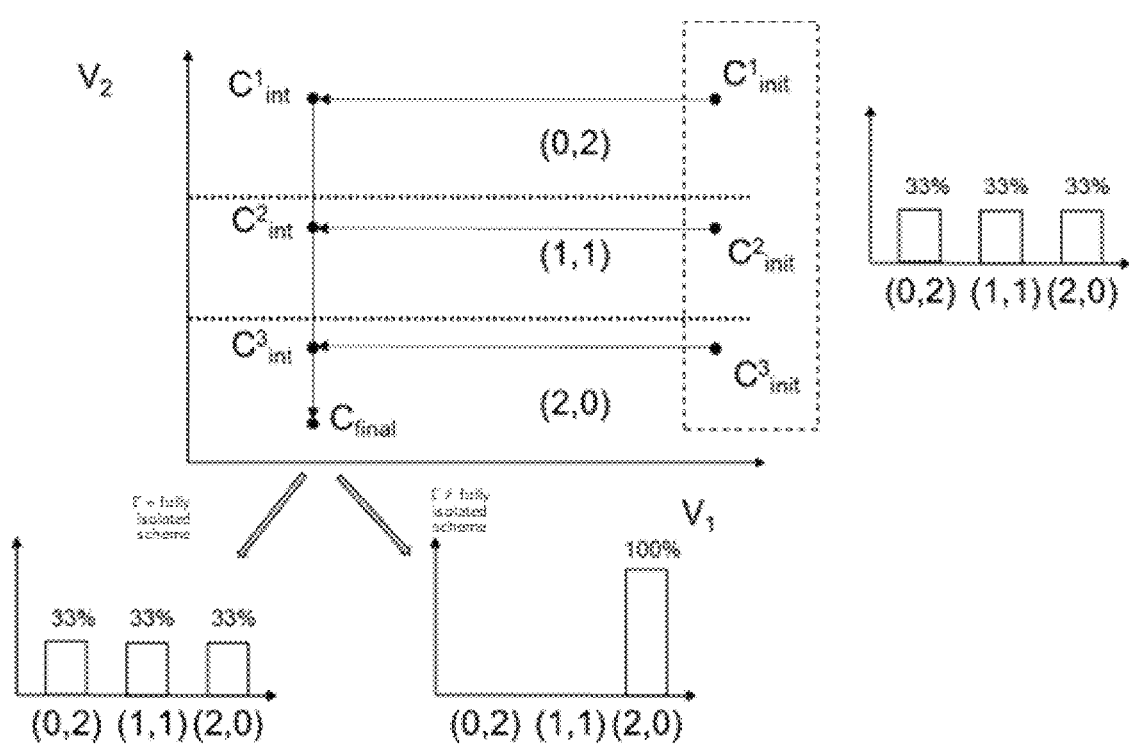

[Fig. 9G]
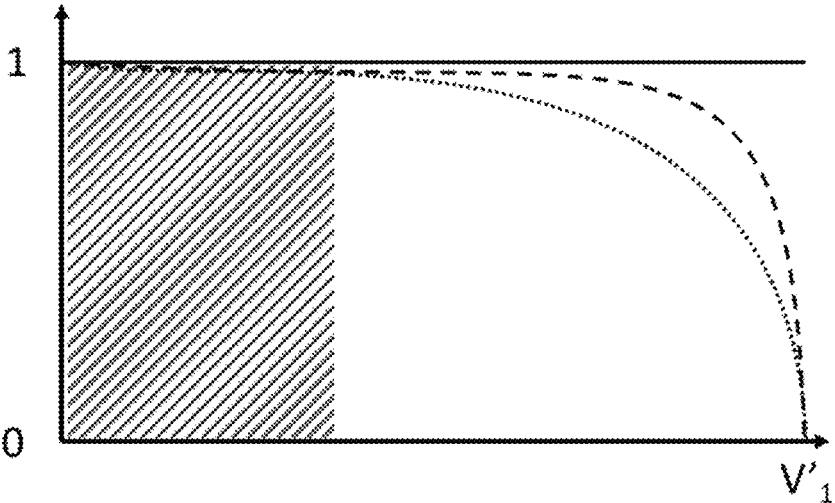
[Fig. 10]
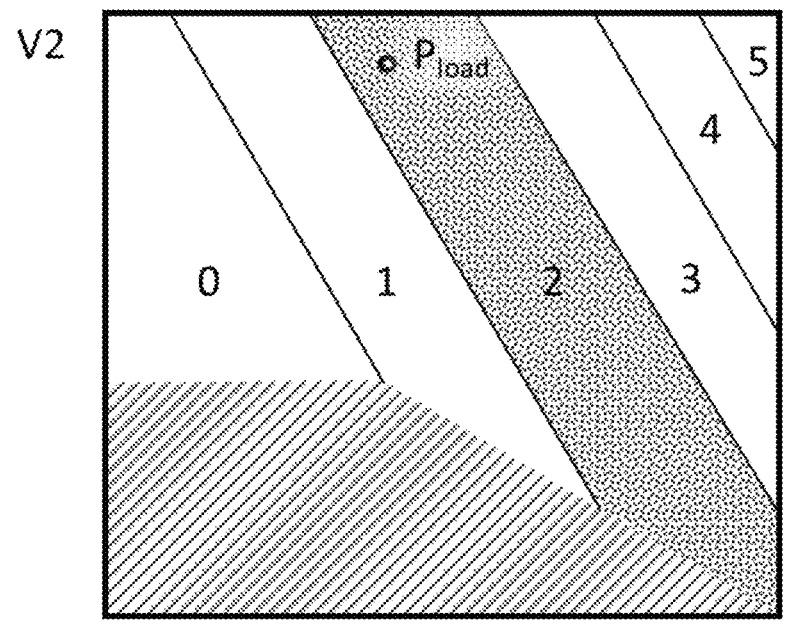

[Fig. 11]
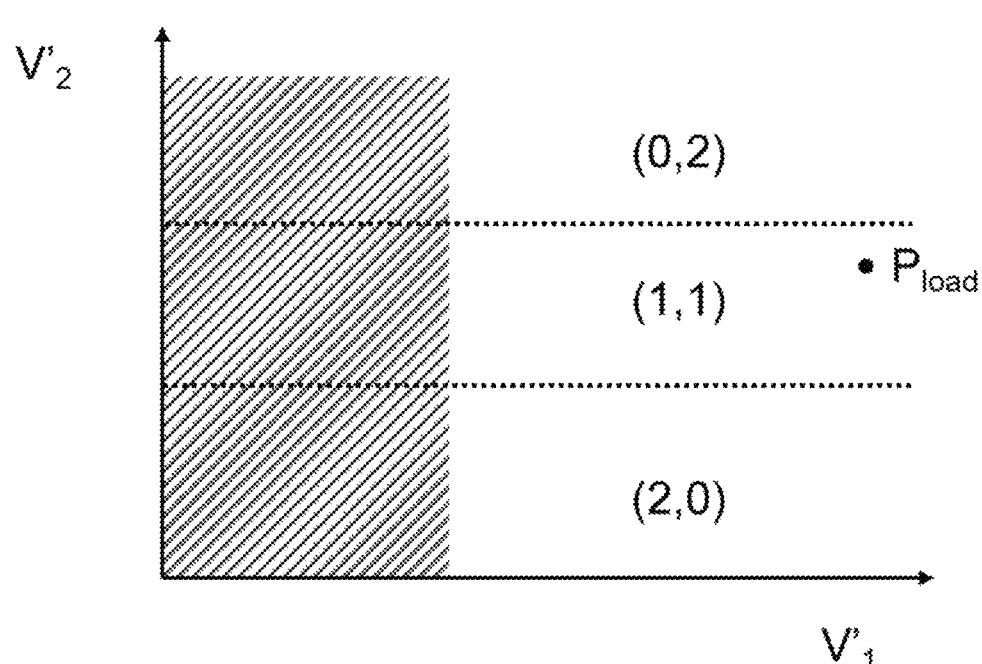
[Fig. 12]
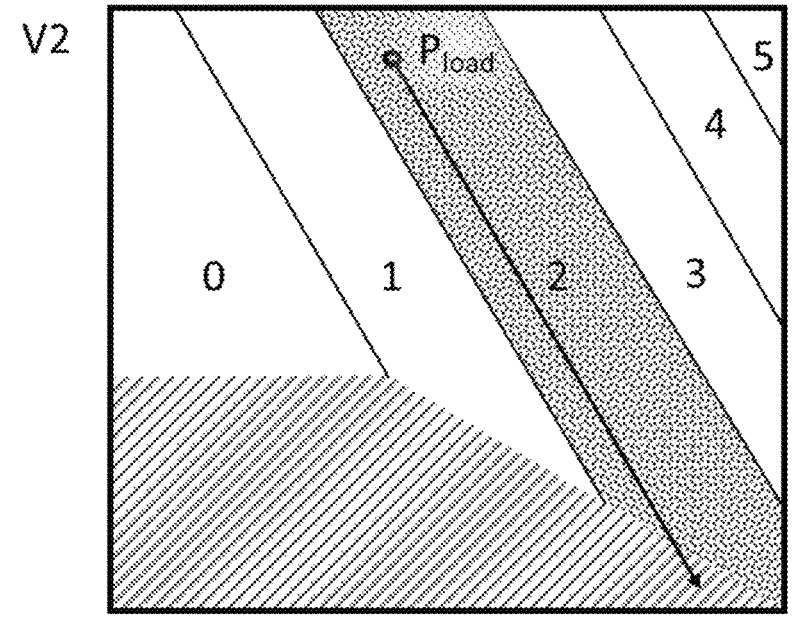

[Fig. 13]
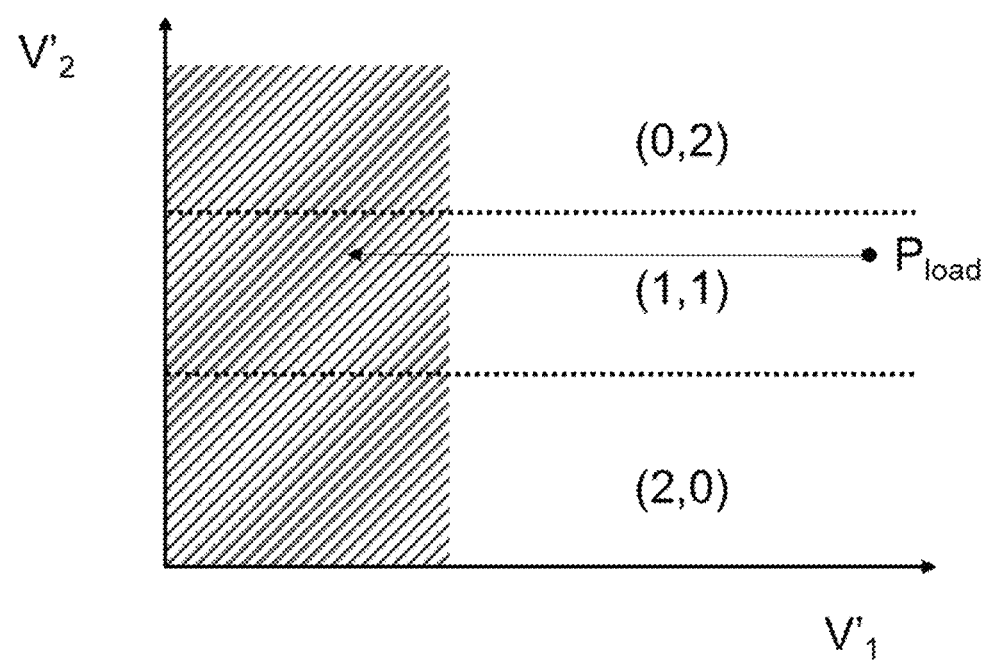
[Fig. 14]
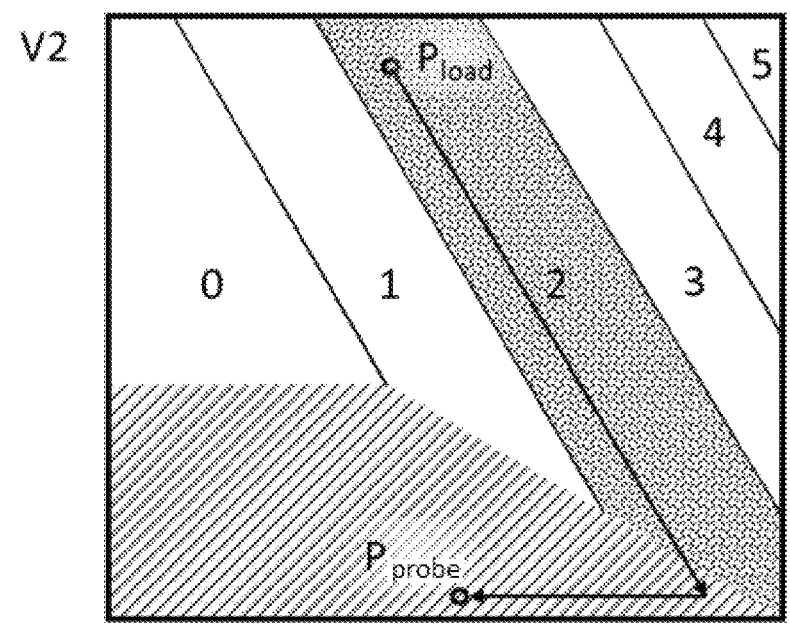

[Fig. 15]
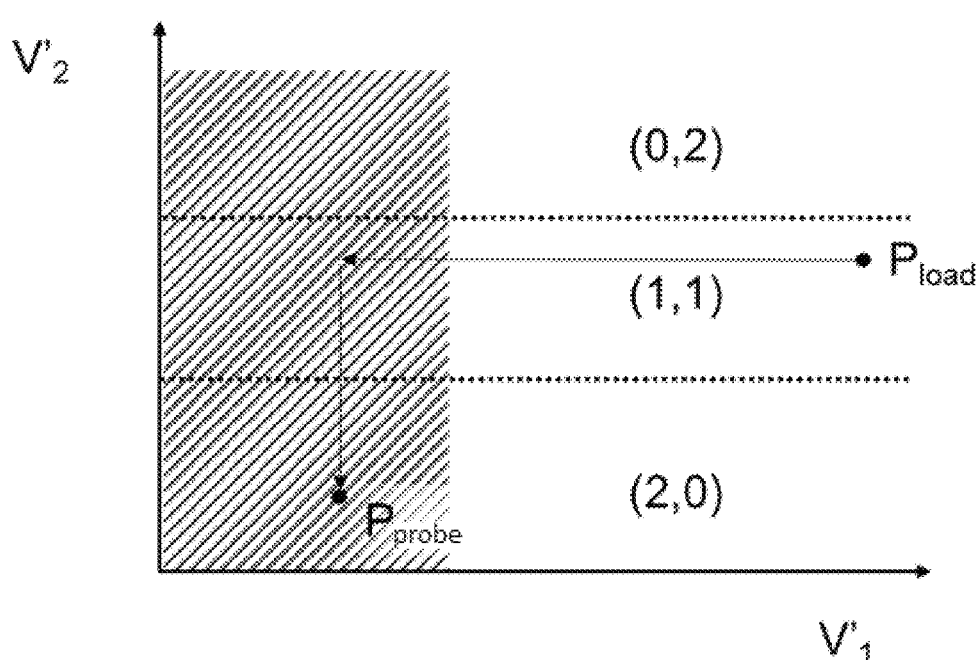
[Fig. 16]
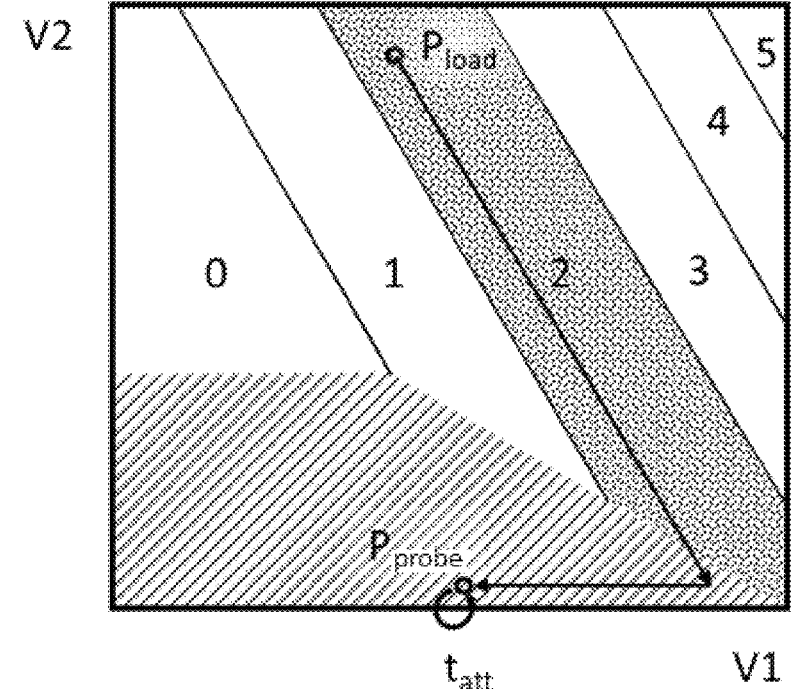

[Fig. 17]
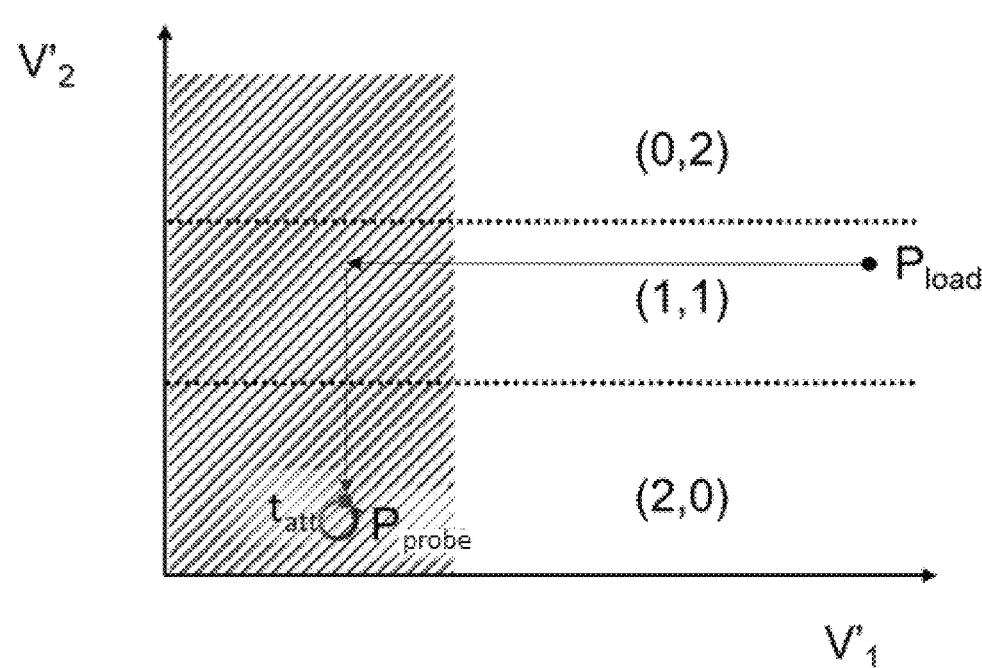
[Fig. 18]
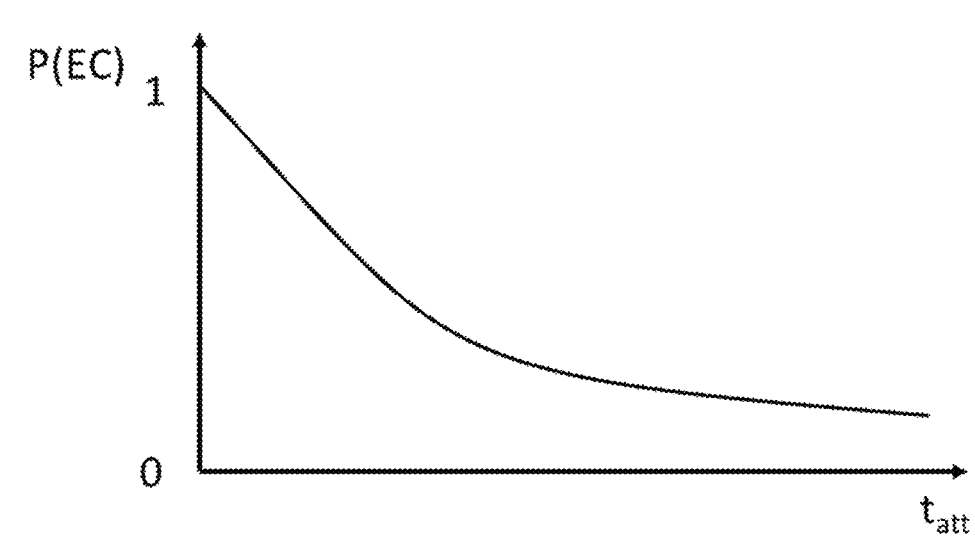

[Fig. 19]
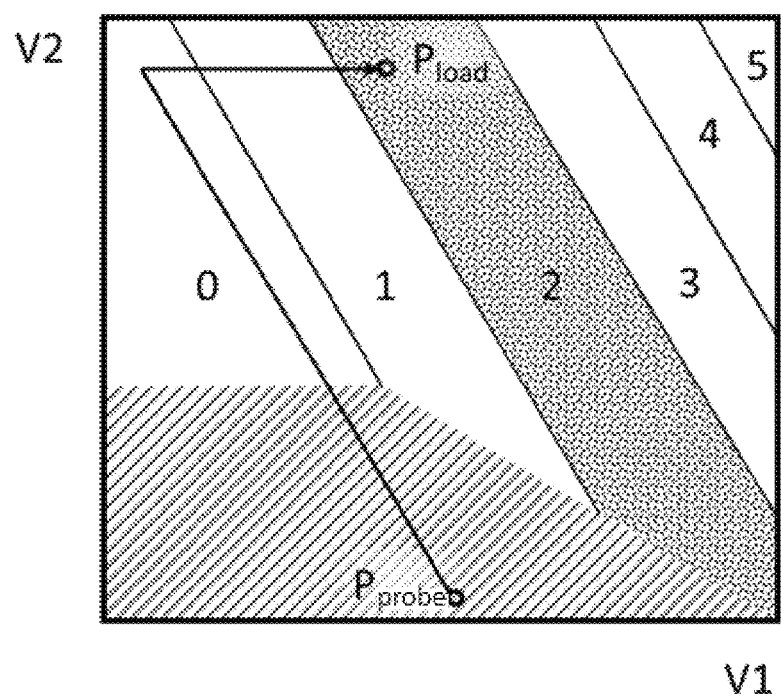
[Fig. 20]
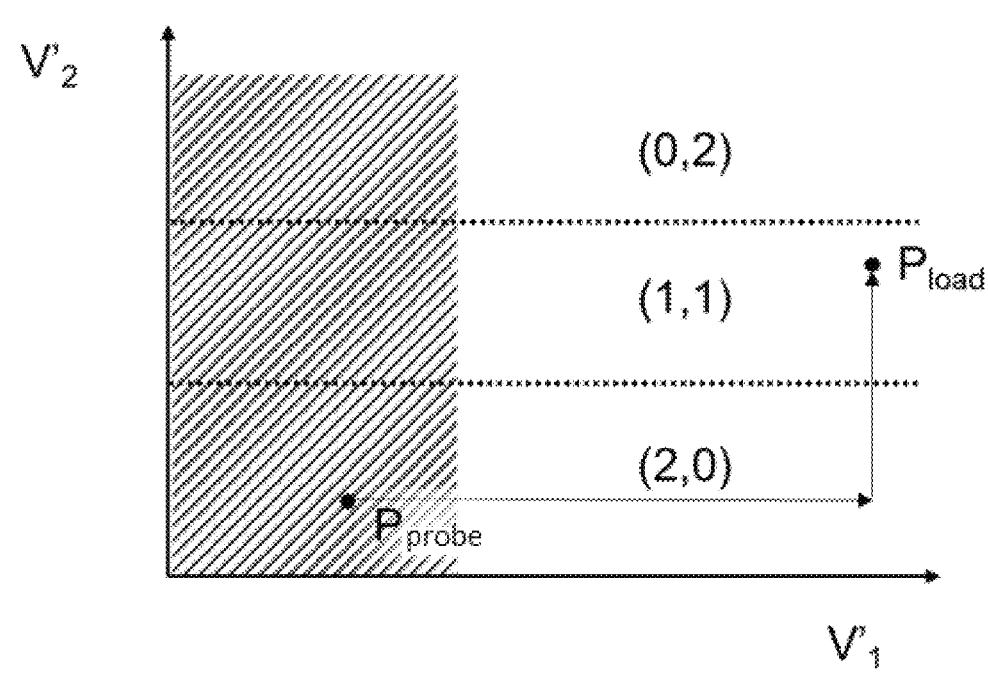

[Fig. 21]
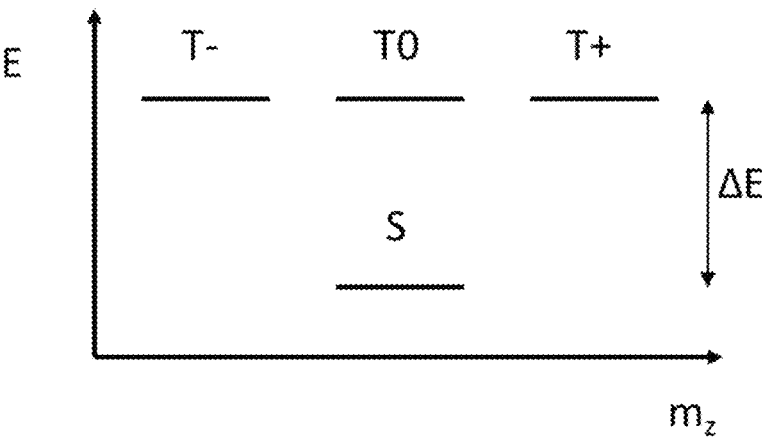
[Fig. 22]
<u>200</u>
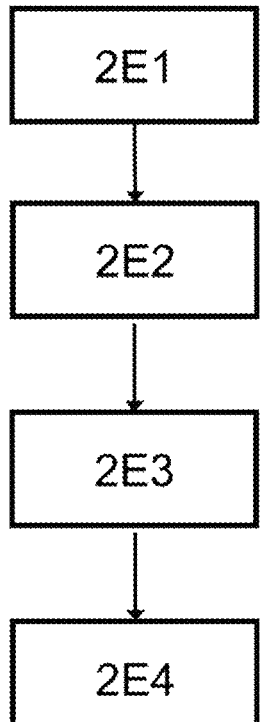

[Fig. 23]
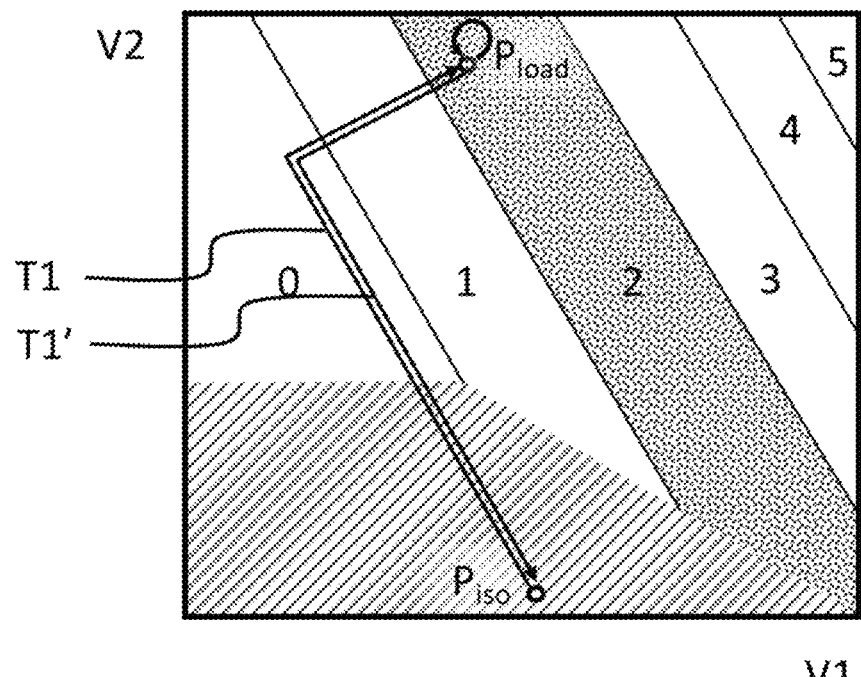
[Fig. 24]
<u>300</u>
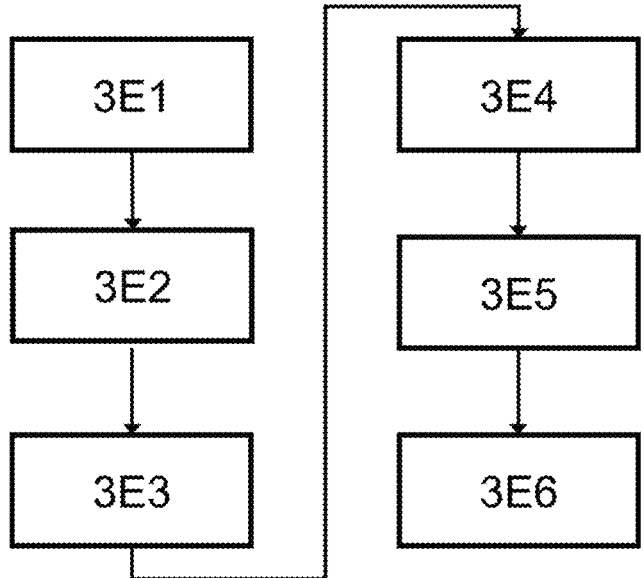

[Fig. 25A]

[Fig. 25B]
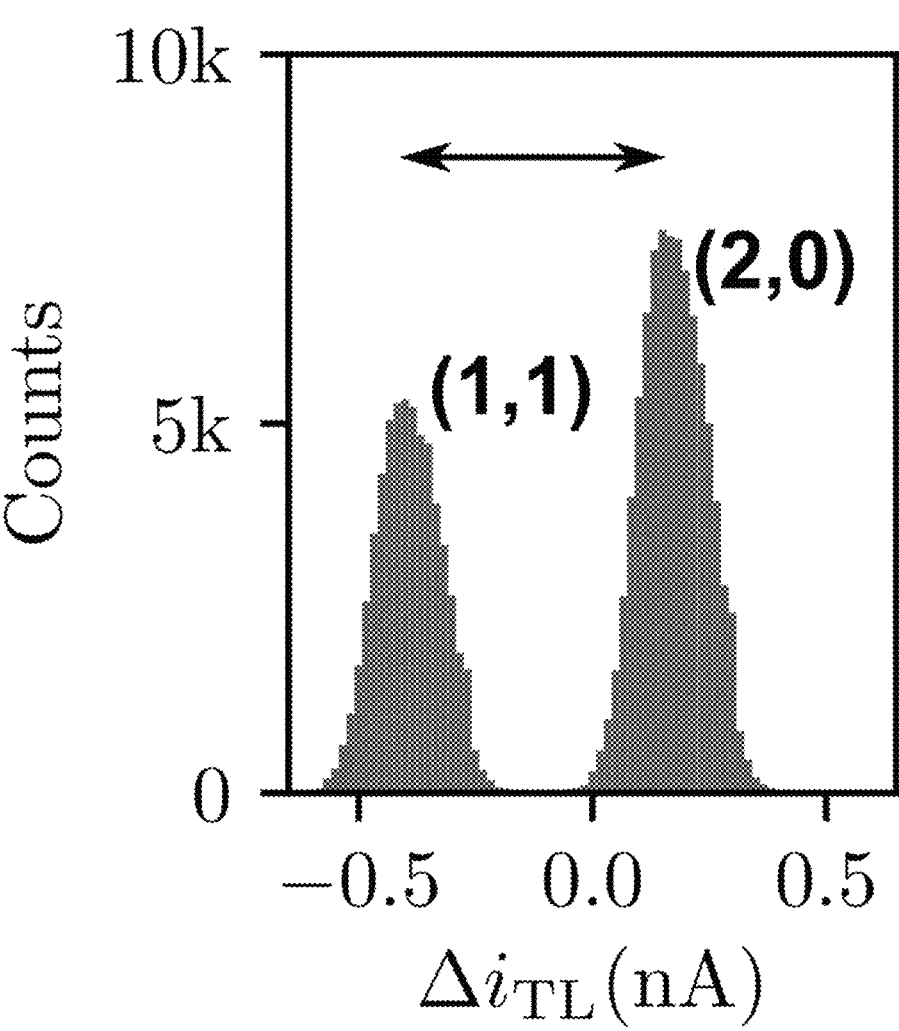

[Fig. 26]
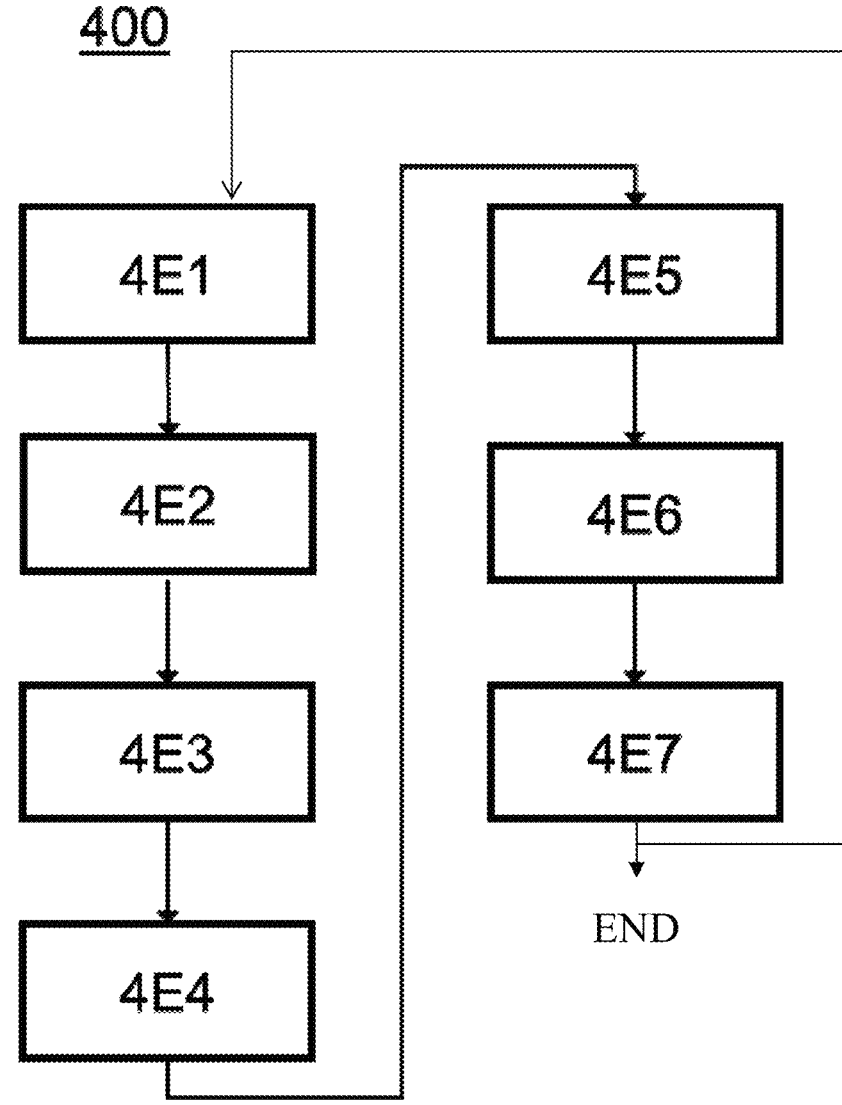

[Fig. 27]
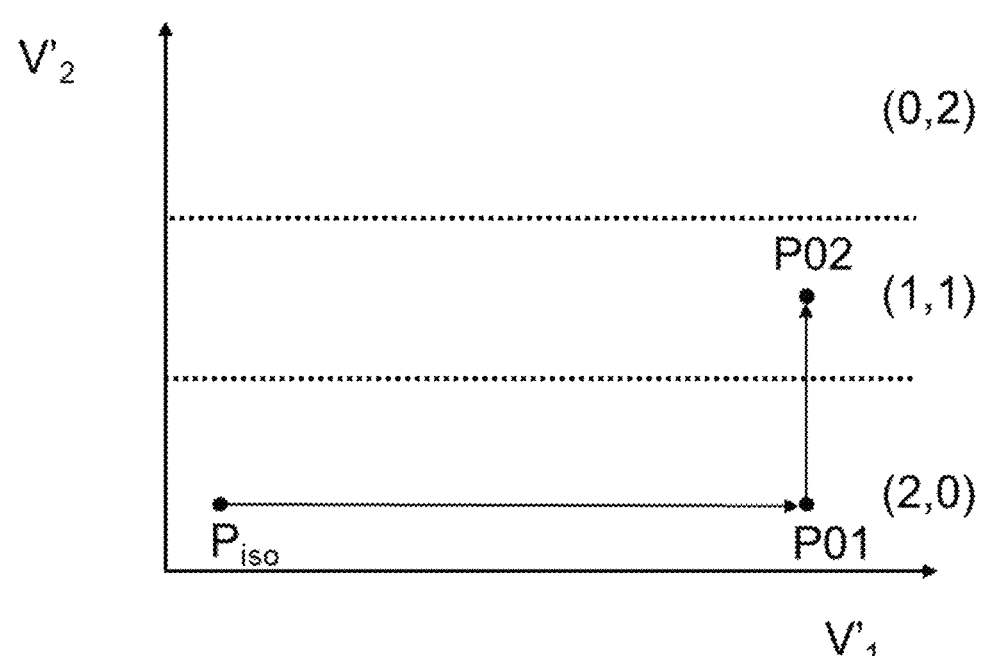
[Fig. 28]
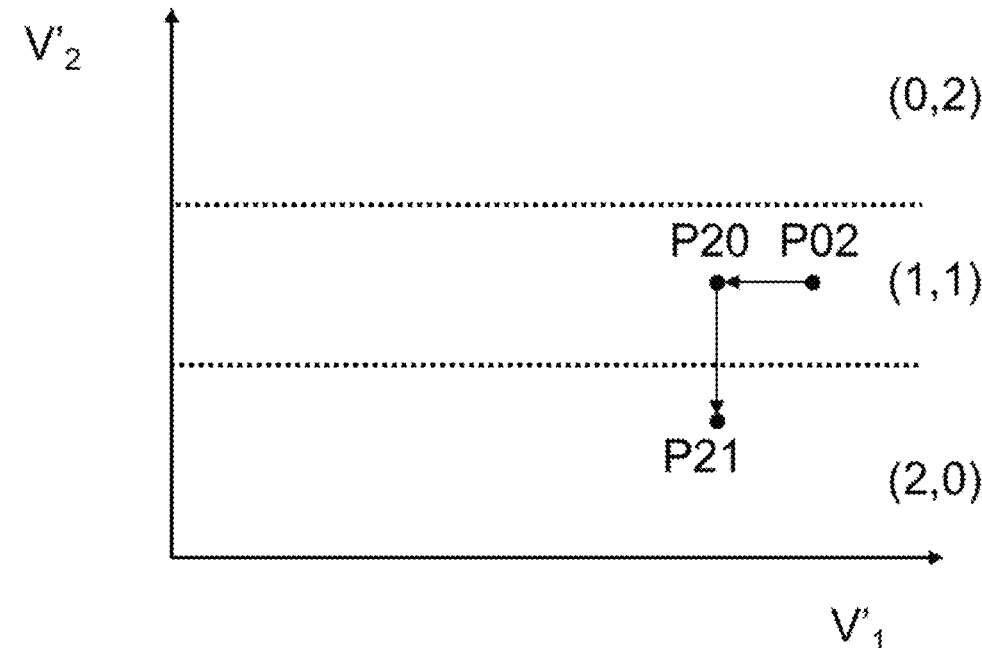

[Fig. 29]
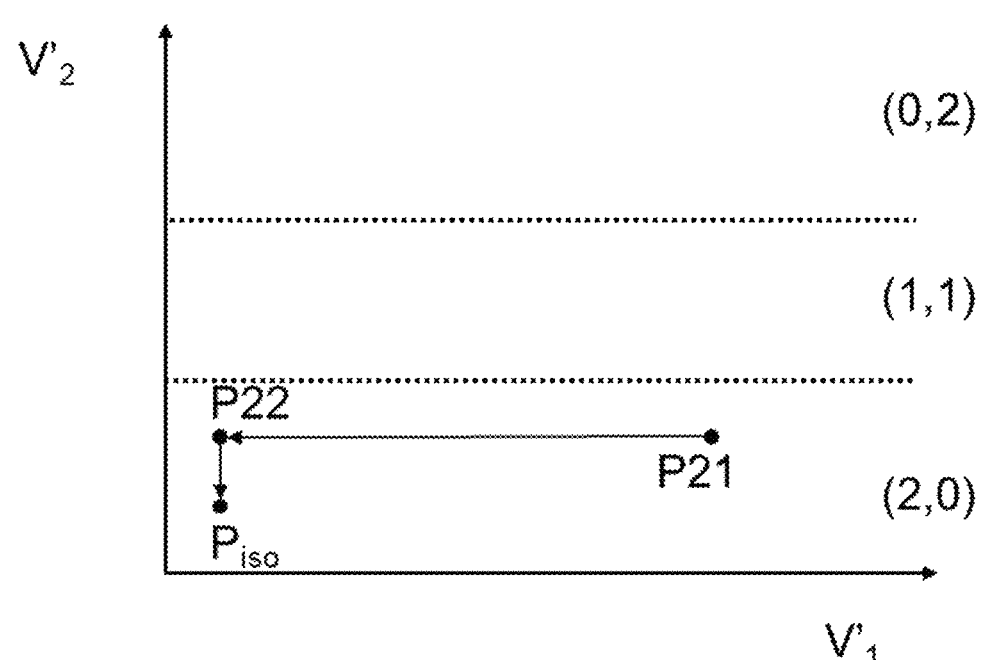
[Fig. 30]
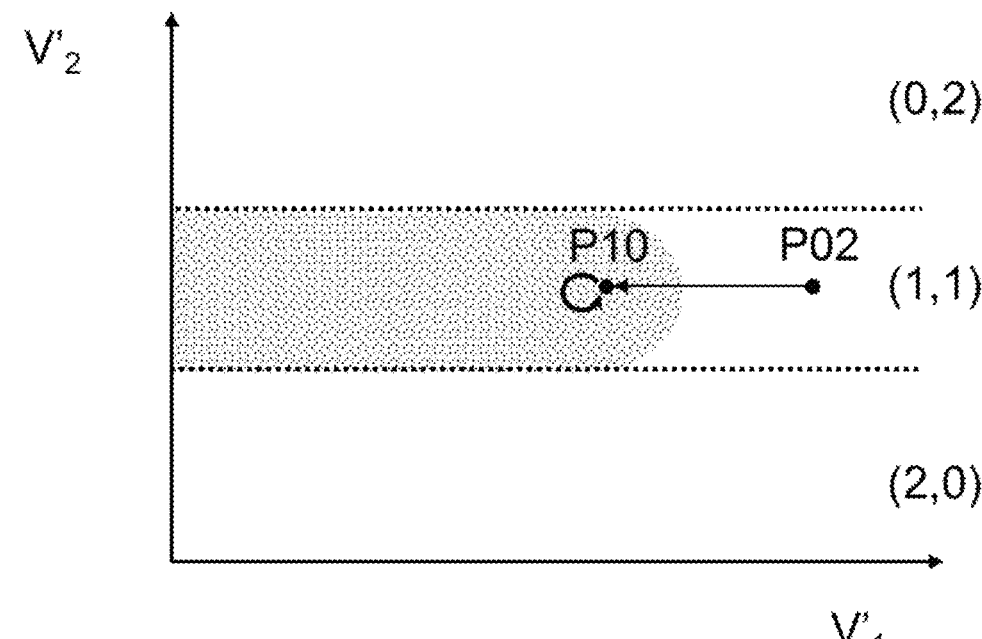

[Fig. 31]
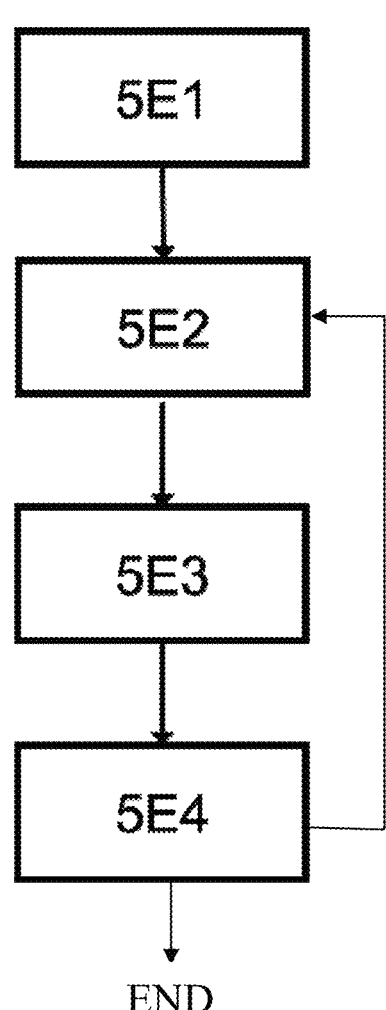
500
5E1
5E2
5E3
5E4
END

[Fig. 32]
600
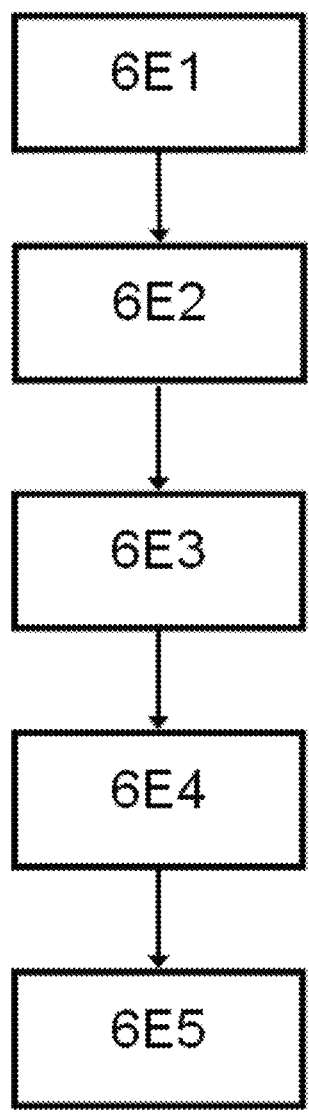

[Fig. 33]
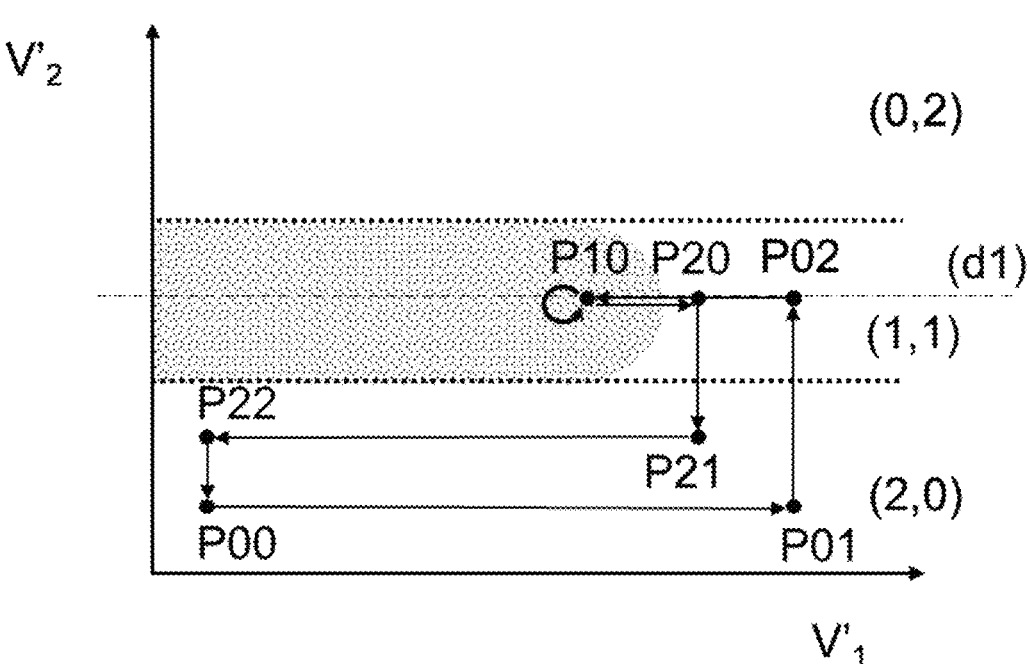
[Fig. 34]
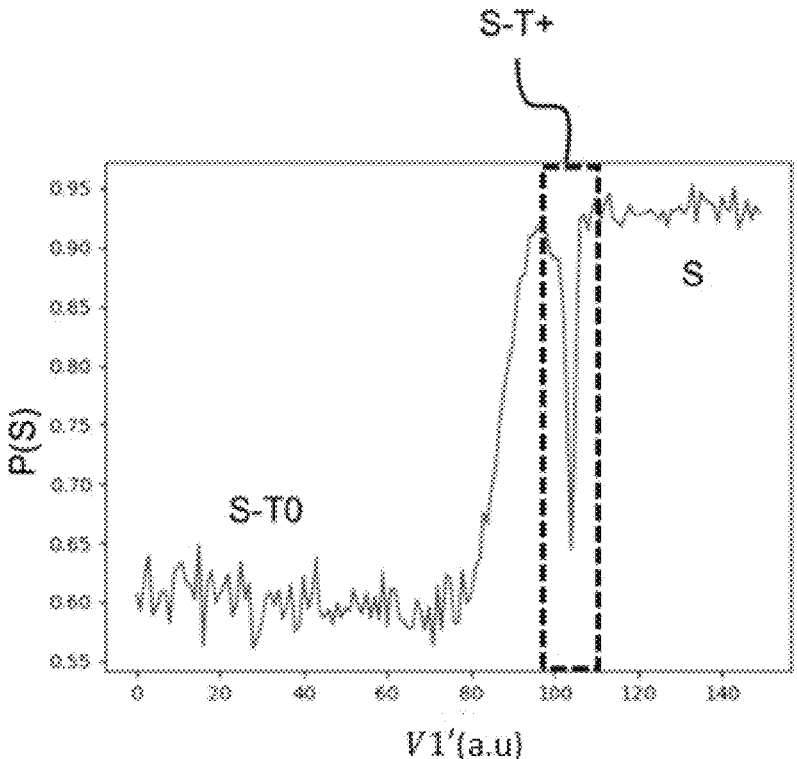

[Fig. 35]
<u>700</u>
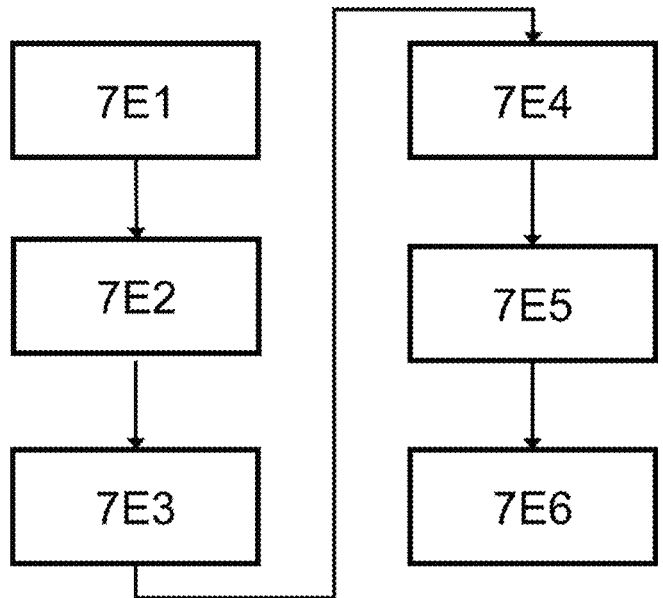
[Fig. 36]
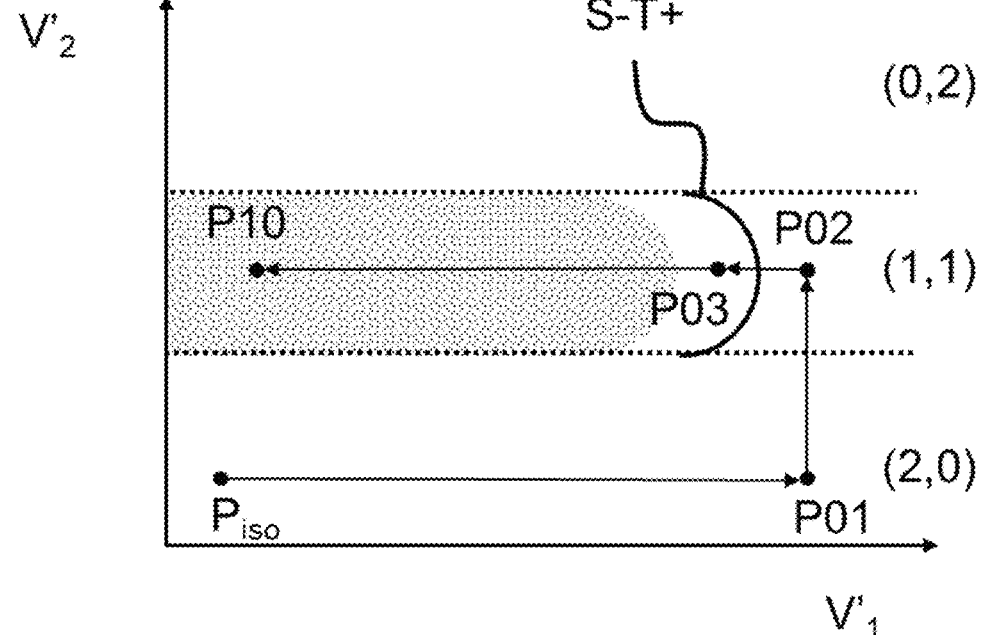

[Fig. 37]
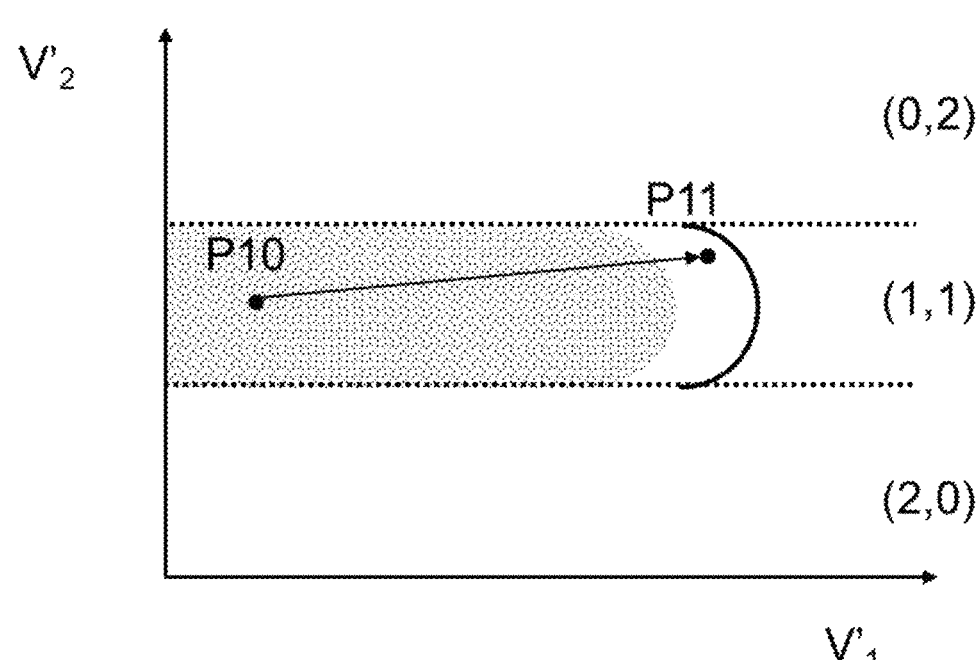
[Fig. 38]
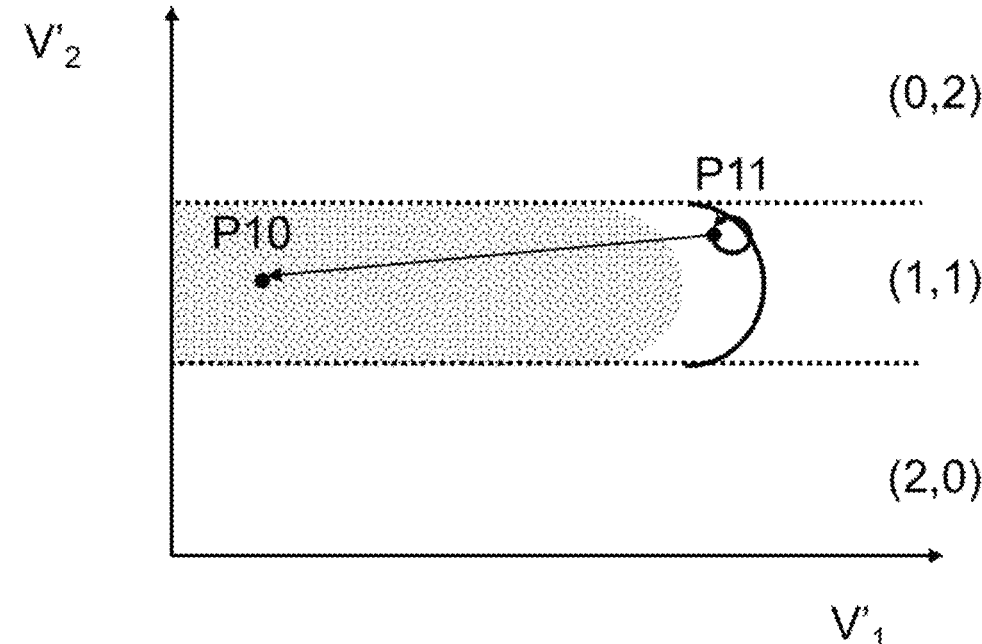

[Fig. 39]
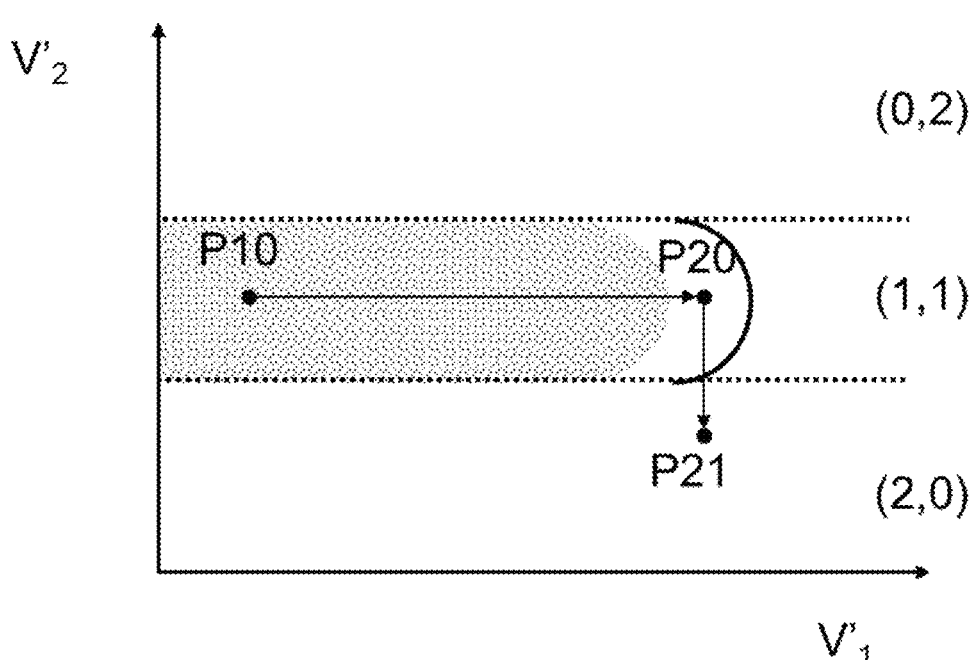
[Fig. 40]
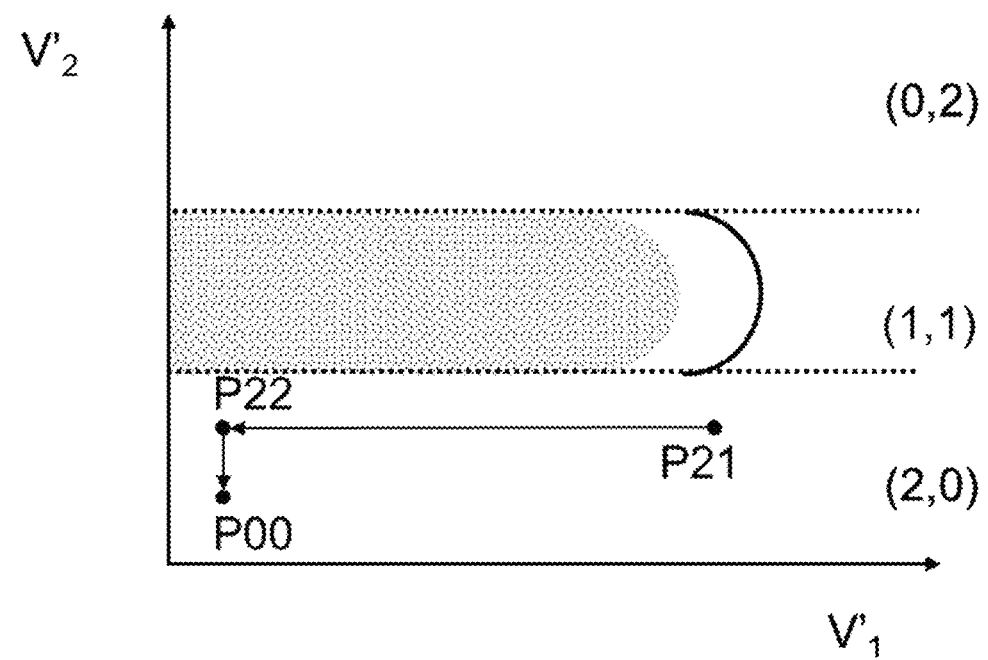

[Fig. 41]
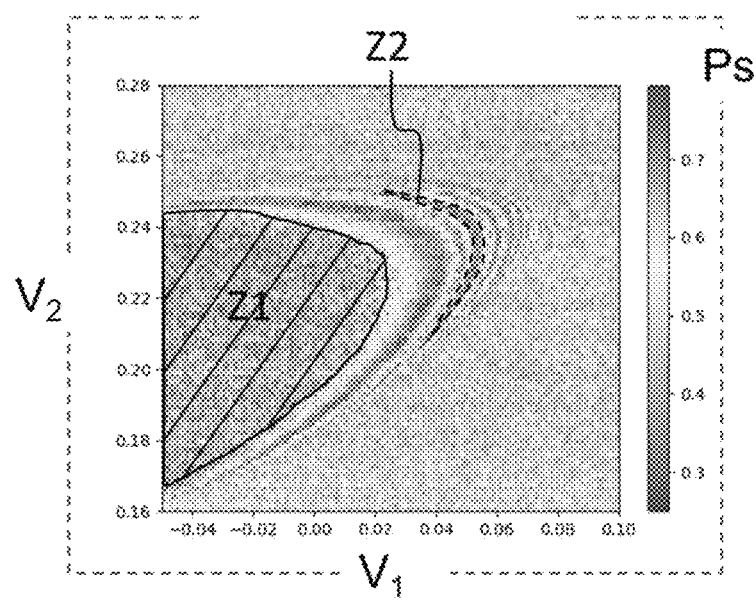
[Fig. 42]
<u>800</u>
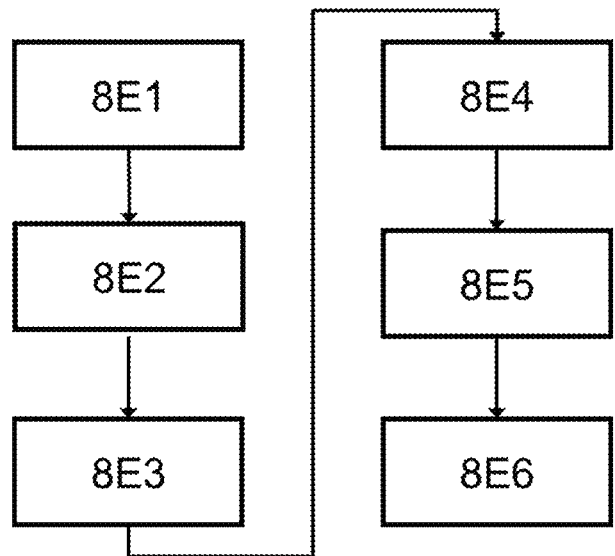

[Fig. 43]
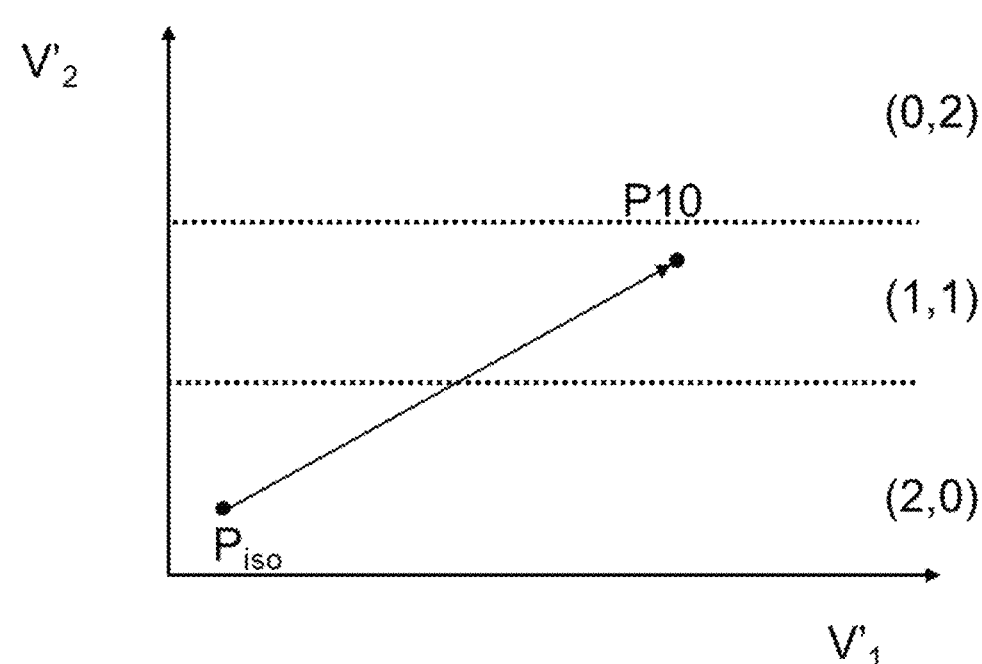
[Fig. 44]
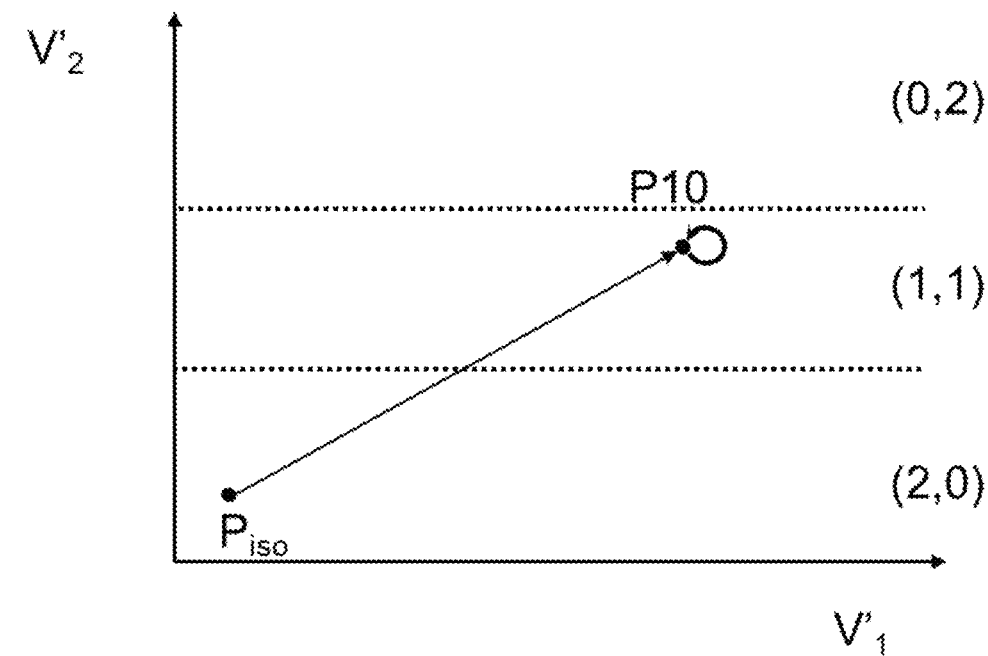

[Fig. 45]
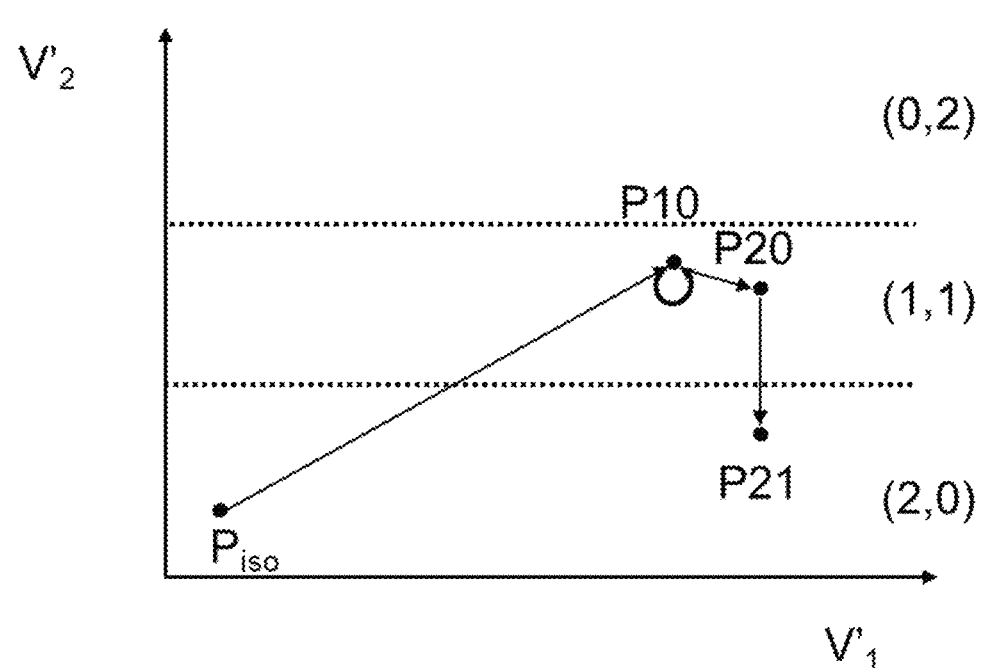
[Fig. 46]
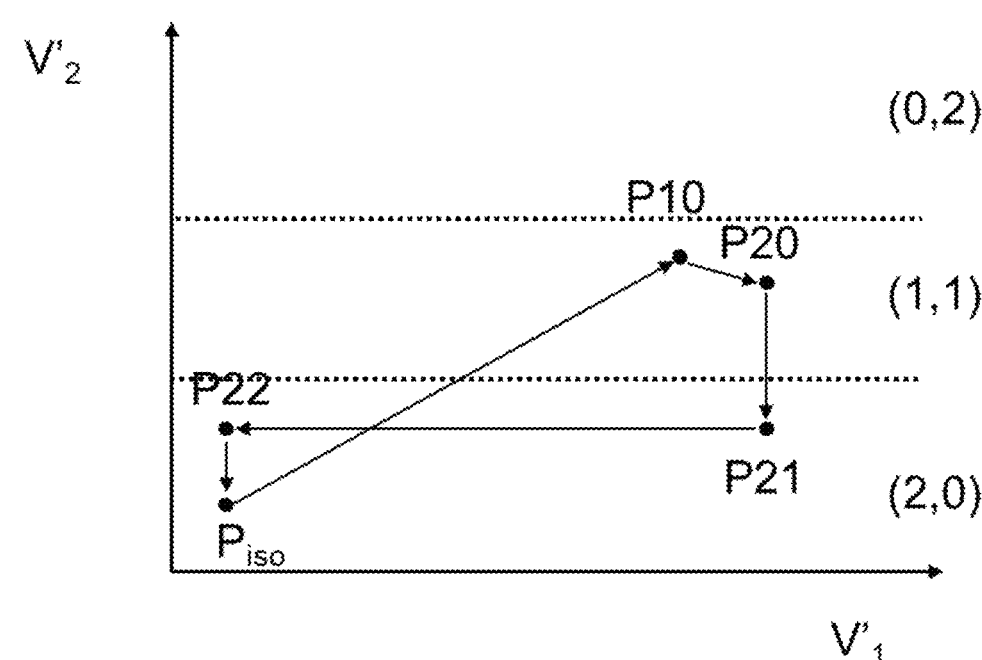

[Fig. 47]
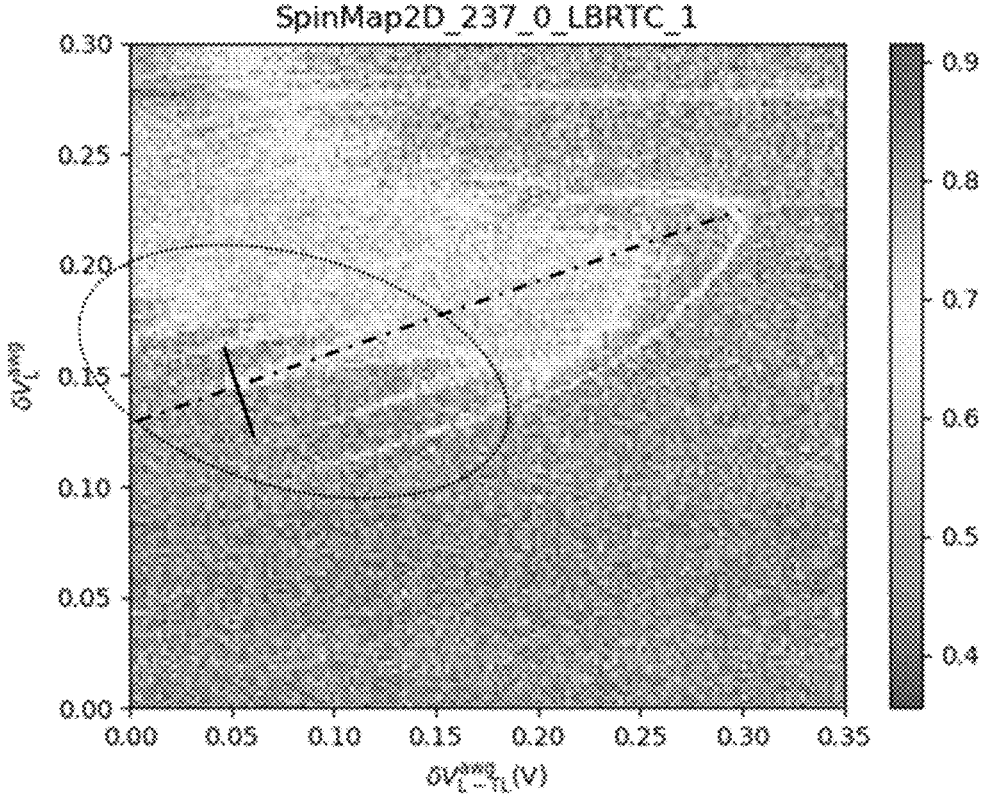
[Fig. 48]
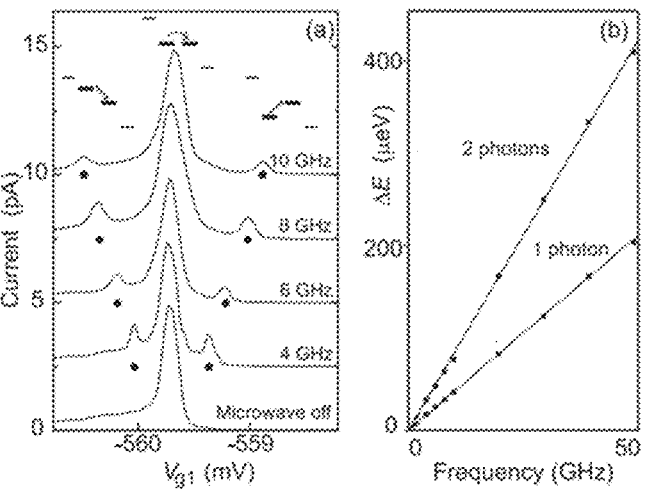

METHOD FOR DETERMINING A SPIN/CHARGE CONVERSION OPERATING POINT, METHOD FOR DETERMINING AN OPERATING POINT ASSOCIATED WITH CHARGING OF A SINGLET STATE AND SYSTEM THEREFOR

CROSS-REFERENCE TO RELATED APPLICATIONS

This application claims priority to French Patent Application No. 2114009, filed Dec. 20, 2021, the entire content of which is incorporated herein by reference in its entirety.

TECHNICAL FIELD OF THE INVENTION

The technical field of the invention is quantum computing.

The present invention relates to a method for determining an optimal spin/charge conversion operating point and an operating point associated with charging of two charged particles in a singlet state.

TECHNOLOGICAL BACKGROUND OF THE INVENTION

When it is desired to carry out quantum operations using a quantum device comprising an array of qubits including a plurality of quantum dots, it is known to implement a calibration procedure so as to identify different operating regimes of the quantum device and to determine the most adapted operating points according to the operations contemplated, but also the operating points for obtaining the most exploitable measurements (low noise, high contrast, etc.).

However, such a procedure is highly tedious and time consuming.

Furthermore, it is necessary to have a good knowledge of the physics underlying the quantum device used in order to be able to perform such a procedure.

In order to overcome at least some of these drawbacks, a first document (Botzem, T. et al; "Tuning Methods for Semiconductor Spin Qubits"; Phys. Rev. Applied, American Physical Society, 2018, 10, 054026) provides a method for partially automating this procedure. Specifically, the method proposed in this document allows the determination of the operating points related to charging of two charged particles into a pair of quantum dots. It also allows determination of the operating points associated with a characteristic property of the spin state of two charged particles: ST+ crossing. A second document (EP3214038) also provides partial automation of this procedure. In particular, like the previous document, the method provided allows determination of the operating points related to charging of two charged particles in a pair of quantum dots.

However, the methods provided in these two documents do not allow such a calibration to be carried out without prior knowledge of some operating parameters of the system. In other words, these methods cannot be implemented on a system that is a priori unknown. This is particularly true for the operating parameters relating to the initialisation of the spin states of the charged particles, but also reading of these spin states. This limitation also concerns the optimal operating points associated with the different quantum gates for which the methods of the state of the art require a reading procedure in order to implement a feedback loop.

In particular, this calibration is made difficult by the risk of the system changing charge state during the calibration phase. Especially, this instability of the charge state does not allow optimisation of the measurement parameters, for example the determination of the most adapted operating point for a so-called spin/charge conversion step (which allows conversion of a spin state into a charge state and thus the measurement of the spin state by a charge state measurement) or even the determination of an optimal operating point for charging of two charged particles in the singlet state into the system.

Therefore, there is a need for a method for determining the most adapted operating point to spin/charge conversion or even to charging of two charged particles in a singlet state into the system, while limiting the risks of changing the charge state of the system during calibration.

SUMMARY OF THE INVENTION

The invention offers a solution to the problems discussed above, by making it possible, using one or more operating points for which stability of the charge state is guaranteed for a given reference duration, to determine an optimal operating point for spin/charge conversion or even for charging of two charged particles in a singlet state.

For this, a first aspect of the invention relates to a method for determining an isolated operating point associated with an isolated regime of a system comprising a first subsystem and a second subsystem, said isolated operating point for which a passage of a charged particle from the first subsystem to the second subsystem and vice versa is forbidden for a reference duration, the first subsystem and/or the second subsystem containing zero, one or more charged particles, a tunnel coupling existing between the first subsystem and the second subsystem, said tunnel coupling allowing exchange of one or more charged particles between the first subsystem and the second subsystem and being modulated by a gate voltage applied to one or more gates configured to form a potential barrier between the first subsystem and the second subsystem, an operating point of the system being determined by the value assumed by each gate voltage, this tunnel coupling being further quantified by a tunnelling rate noted $\Gamma$, the method comprising:

a first step of determining a stability diagram of the system so as to determine a plurality of charge states assumed by the first subsystem as a function of the operating point of the system;

from this stability diagram, a second step of evaluating the operating points corresponding to an isolated regime of the first subsystem with respect to the second subsystem in which a passage of a charged particle from the first subsystem to the second subsystem and vice versa is forbidden even when such a passage is energetically authorised, the operating points not being in the isolated regime being considered in a non-isolated regime.

In addition, the method comprises, for a first charging operating point evaluated as being in the non-isolated regime during the evaluation step and corresponding to a first charge state of the first subsystem:

from the first charging operating point, a step of modifying the operating point so as to obtain a second operating point in a regime evaluated as the isolated regime in the evaluation step and corresponding to the first charge state;

from the second operating point, a step of modifying the operating point so as to obtain a third operating point, said third operating point being in a regime evaluated as being the isolated regime in the evaluation step and corresponding to a second charge state different from the first charge state;

at the third operating point, a waiting step for a predetermined waiting time;

at the third operating point, a step of determining the charge state of the first system.

In addition, the operating point of the system is reinitialised to the first charging operating point at the end of the step of determining the charge state of the first system, the preceding four steps being repeated for a plurality of waiting durations and a plurality of times for each of these waiting durations so as to determine a probability of measuring the first charge state as a function of the waiting time, determine, from this probability, the tunnelling rate Γ associated with the third operating point and, when the value of the tunnelling rate Γ is less than a predetermined value dependent on the reference duration, select the third operating point as the operating point in the isolated regime.

With the method according to the invention, it is possible to determine one or more operating points corresponding to a regime in which, during the characteristic time, no exchange of charged particles can take place between the first subsystem and the second subsystem. This regime is especially advantageous when it is desired to determine the charge state of at least one of the subsystems because it gives the guarantee that, during this characteristic time, the charge state in question will not change.

In addition to the characteristics just discussed in the preceding paragraph, the method according to the first aspect of the invention may have one or more of the following additional characteristics, considered individually or according to any technically possible combinations.

In one embodiment, the predetermined value is equal to $$\frac{1}{\alpha_{RI}\tau_{op}}$$

where $\tau_{op}$ is the reference duration and $\alpha_{RI}$ a tolerance coefficient.

In one embodiment, the system comprises a pair of quantum dots comprising a first quantum dot and a second quantum dot, the first quantum dot corresponding to the first system, and a reservoir of charged particles corresponding to the second subsystem, the isolated regime being then referred to as the partially isolated regime.

In one embodiment, the system comprises a pair of quantum dots corresponding to the first system, and a reservoir of charged particles corresponding to the second subsystem, the isolated regime being then referred to as the partially isolated regime.

In one embodiment, the system comprises a pair of quantum dots comprising a first quantum dot and a second quantum dot as well as a fixed number of charged particles, the first quantum dot corresponding to the first subsystem and the second quantum dot corresponding to the second subsystem, the isolated regime being then referred to as the fully isolated regime.

In one embodiment of this second alternative, a tunnel coupling exists between the pair of quantum dots and a reservoir of charged particles, the method comprising, prior to the first step of determining a stability diagram, a step of carrying out the method according to the first alternative so as to determine an operating point relating to the partially isolated regime of the pair of quantum dots, the subsequent steps of the method being carried out whilst the pair of quantum dots is in the partially isolated regime.

A second aspect of the invention relates to a method for determining at least one operating point associated with charging of two charged particles to a singlet state in a pair of two quantum dots of a system, the system also comprising a reservoir of charged particles and a charge state measurement means whose signal is a function of the charge state of the pair of quantum dots, the pair of quantum dots being separated from the reservoir of charged particles by a potential barrier, the pair of quantum dots being likely to adopt a plurality of charge states, said potential barrier and the charge state of the pair of quantum dots being modulated using a plurality of gate voltages, the value of said voltages defining an operating point of the system, and a sequence of changes in said voltages defining a path of said operating point, wherein two charged particles in the pair of quantum dots may assume a singlet spin state or a triplet spin state, the method comprising, from a reading operating point associated with a partially isolated regime in which, for a reference duration, no exchange of charged particles is possible between the pair of quantum dots and the reservoir of charged particles, and for a plurality of operating points, called charging operating points and associated with a charged state of two charged particles:

a step of modifying the operating point of the pair of quantum dots so as to adopt the charging operating point considered, the modification being made along a first path, called a charging path;

a step of waiting at the charging operating point for a predetermined duration;

a step of modifying the operating point of the pair of quantum dots so as to adopt the reading operating point, the modification being made along a second path reverse to the charging path, called a reading path;

a step of determining the charge state, this step being made at the reading operating point;

the charging operating point being associated with charging of a singlet state if the charge state determined is zero, the reference duration being greater than or equal to the duration required for modifying the operating point, measuring the signal of the measurement means and waiting at the charging operating point.

In addition to the characteristics just discussed in the preceding paragraph, the method according to the second aspect of the invention may have one or more of the following additional characteristics, considered individually or according to any technically possible combinations.

In one embodiment, the method comprises, beforehand, a step of determining an operating point in a partially isolated regime using a method according to a first aspect of the invention.

In one embodiment, modifying along the charging path (T1) comprises:

from the reading operating point, a sub-step of modifying the operating point so as to obtain a second operating point not associated with a partially isolated regime and associated with the same charge state as the reading operating point;

from the second operating point, a sub-step of modifying the operating point so as to obtain the charging operating point considered, the latter not being associated with a partially isolated regime and being associated with a charge state of two charged particles.

A third aspect of the invention relates to a method for determining a set of parameters of a means for measuring the charge state of a system comprising a first subsystem and a second subsystem, the first subsystem and the second subsystem being capable of containing one or more charged particles, the coupling between the first subsystem and the second subsystem characterising the possibility of exchanging one or more charged particles between the first subsystem and the second subsystem, the coupling being able to be modulated by means of a plurality of gate voltages, the value of said voltages defining an operating point of the system, the measurement means being configured to measure a signal as a function of the charge state of the first subsystem, the signal measured by the charge state measurement means being dependent on a plurality of measurement parameters.

The method according to a third aspect of the invention comprises, starting from a reading operating point associated with an isolated regime for which no exchange of charged particles is possible between the first subsystem and the second subsystem, and for a plurality of sets of measurement parameters:

a step of charging the first subsystem in a first charge state;

a step of measuring the signal of the charge state measurement means associated with this first charge state;

a step of charging the first subsystem in a second charge state different from the first charge state;

a step of measuring the signal of the charge state measurement means associated with this second charge state;

a step of subtracting the signal of the measurement means associated with the first charge state from the signal of the measurement means associated with the second charge state so as to obtain the difference between the two signals for the set of parameters considered.

The method then includes a step of selecting the set of parameters that yields the highest difference.

In addition to the characteristics just discussed in the preceding paragraph, the method according to a third aspect of the invention may have one or more of the following additional characteristics, considered individually or according to any technically possible combinations.

In one embodiment, the method comprises, beforehand, a step of determining the reading operating point using a method according to a first aspect of the invention, the reference duration being greater than or equal to the duration required to determine the charge state.

In one embodiment, the system comprises a pair of quantum dots corresponding to the first system and a reservoir of charged particles corresponding to the second subsystem, the isolated regime being referred to as the partially isolated regime.

In one embodiment, the system comprises a pair of quantum dots comprising a first quantum dot and a second quantum dot as well as a fixed number of charged particles, the first quantum dot corresponding to the first subsystem and the second quantum dot corresponding to the second subsystem, the isolated regime being referred to as the fully isolated regime.

A fourth aspect of the invention relates to a method for determining an optimal spin/charge conversion operating point in a system comprising a pair of quantum dots comprising a first quantum dot and a second quantum dot, the pair of quantum dots containing two charged particles and adopting a first charge state in which both charged particles are in the first quantum dot, a second charge state in which each quantum dot contains a charged particle, or a third charge state in which both charged particles are in the second quantum dot, the charge state being a function of the voltage applied to at least two gates, the value of these voltages defining an operating point of the pair of quantum dots; the charged particles adopting a first spin state, called the singlet spin state S, and a second spin state, called the triplet spin state, from among the triplet spin state T0, the triplet spin state T+/T−.

The method according to a fourth aspect of the invention comprises, for a plurality of conversion operating points:

a step of initialising the system in the singlet spin state using an operating point associated with charging of a singlet state in the pair of quantum dots, the operating point at the end of the initialisation step being associated with a first charge state;

a step of spin/charge conversion of the charge state of the system using a conversion operating point;

a step of measuring the signal measured by the charge state detection means for the charge state thus converted;

a step of initialising the system in a spin state that can assume either the singlet state or the triplet state T0 or T+/T− according to a set probability, known as the mixed spin state, using the operating point associated with charging of a singlet state in the pair of quantum dots;

a step of spin/charge conversion of the charge state of the system using the conversion operating point so as to obtain a mixed charge state;

a step of measuring the signal measured by the charge state detection means for the mixed charge state thus converted;

a step of determining the difference between the signal measured for the charge state associated with the singlet spin state and the signal measured for the charge state associated with the mixed spin state;

both measurement steps being carried out at an operating point associated with a fully isolated regime in which, for a reference duration, no exchange of charged particles is possible between the first quantum dot and the second quantum dot, the reference duration being greater than or equal to the time required for the implementation of the measurement step.

Furthermore, in the method according to a fourth aspect of the invention, the preceding steps are repeated a plurality of times for each plurality of operating points so as to establish a difference between the signal associated with the singlet state and the signal associated with the mixed state, the conversion operating point for obtaining the highest difference being considered the optimal spin/charge conversion operating point.

By "T+/T− triplet spin state", it is meant "T+ triplet spin state" when the g-factor is positive and "T− triplet spin state" when the g-factor is negative. A spin state that can assume either the singlet or the T0 or T+/T− triplet state according to a set probability", it is meant that when the method is implemented considering the triplet T0 state, the spin state can assume either the singlet or the triplet T0 state according to a set probability, and that when the method is implemented considering the T+/T− triplet state, the spin state can assume either the singlet or the T+/T− triplet state according to a set probability.

In addition to the characteristics just discussed in the preceding paragraph, the method according to a fourth aspect of the invention may have one or more of the following additional characteristics, considered individually or according to any technically possible combinations.

In one embodiment, the method comprises, beforehand, a step of determining an operating point associated with the fully isolated regime using a method according to a first aspect of the invention.

In one embodiment, the system also comprises a reservoir of charged particles, a tunnel coupling existing between the reservoir of charged particles and the pair of quantum dots, and the method further comprises a step of determining an operating point associated with the partially isolated regime using a method according to a first aspect of the invention, the reference duration associated with the partially isolated regime being greater than or equal to the duration required to implement the initialisation, spin/charge conversion and signal measurement steps.

In one embodiment, the method comprises, beforehand, a step of determining an operating point associated with charging a singlet state in a pair of quantum dots using a method according to a second aspect of the invention.

In one embodiment, the method comprises, beforehand, a step of determining an optimal set of parameters of a measurement means using a method according to a third aspect of the invention, the set of parameters thus determined being used in both measurement steps.

A fifth aspect of the invention relates to a method for determining an operating point associated with the optimal charging of a singlet state in a pair of quantum dots in a system, the system also comprising a reservoir of charged particles and charge state measurement means whose signal is a function of the charge state of the pair of quantum dots, the pair of quantum dots being separated from the reservoir of charged particles by a potential barrier, said potential barrier and the charge state of the pair of quantum dots being modulated using a plurality of gate voltages, the value of said voltages defining an operating point of the system, two charged particles in the pair of quantum dots adopting a singlet spin state or a triplet spin state, the method comprising, from a reading operating point associated with a partially isolated regime in which for a first reference duration, no exchange of charged particles is possible between the pair of quantum dots and the reservoir of charged particles, and for a plurality of operating points, called charging operating points and associated with a charge state of two charged particles, the method comprising:

A step of determining a plurality of operating points associated with charging a singlet state S in the pair of quantum dots, preferably using a method according to a second aspect of the invention;

A step of determining a spin/charge conversion operating point, preferably using a method according to a fourth aspect of the invention;

the method further comprising, for each charging operating point of the plurality of charging operating points:

a step of adiabatically charging the pair of quantum dots using the operating point considered;

a step of spin/charge converting the spin state of the charged particles in the pair of quantum dots using the spin/charge conversion operating point;

a step of determining the charge state of the pair of quantum dots so as to determine the spin state of the charged particles, determining the charge state being made in a fully isolated regime in which, for a second reference duration, no exchange of charged particles is possible between the quantum dots of the pair of quantum dots;

these three preceding steps being repeated a plurality of times for each charging operating point so as to determine, for each operating point, a statistic of the spin state measured, the first reference duration being greater than or equal to the time required for the implementation of the spin/charge conversion step and the charge state determination step, the second reference duration being greater than or equal to the time required to determine the charge state of the pair of quantum dots, the operating points for obtaining a probability of charging a singlet state greater than a threshold probability being considered as an optimal charging operating point of a singlet state.

In addition to the characteristics just discussed in the preceding paragraph, the method according to a fifth aspect of the invention may have one or more of the following additional characteristics, considered individually or according to any technically possible combinations.

In one embodiment, the method comprises, beforehand, a step of determining an operating point associated with the fully isolated regime using a method according to a first aspect of the invention.

In one embodiment, the method comprises, beforehand, a step of determining an optimal set of parameters of a measurement means using a method according to a third aspect of the invention, the set of parameters thus determined being used in both measurement steps.

In one embodiment, the method comprises, beforehand, a step of determining an optimal spin/charge conversion operating point using a method according to a fourth aspect of the invention, the spin/charge conversion operating point thus determined being used in the spin/charge conversion step.

A sixth aspect of the invention relates to a method for determining an oscillation period between a first spin state and a second spin state of two charged particles in a pair of quantum dots of a system, the system also comprising a reservoir of charged particles, the pair of quantum dots being separated from the reservoir of charged particles by a potential barrier, said potential barrier and the charge state of the pair of quantum dots being able to be modulated by a plurality of gate voltages, the value of said voltages defining an operating point of the system, the charged particles being able to assume a plurality of spin states, the plurality of spin states can be described in a first basis or in a second basis different from the first basis, the method comprising:

a step of initialising the system in a first operating point for which the first basis is an eigenbasis of the spin states of both charged particles;

from the first operating point, a step of modifying the operating point so as to reach a second operating point for which the second basis is an eigenbasis of the spin states, this transition causing a rotation between the first spin state and the second spin state;

a waiting step for a predetermined duration at the second operating point during which the rotation between the first spin state and the second spin state continues in a coherent manner;

a step of spin/charge converting the spin state of both charged particles, the conversion being made using a spin blocking operating point and making it possible to associate with the first spin state a first charge state and with the second spin state a second charge state different from the first charge state;

a step of determining the charge state of the pair of quantum dots, determining being made at a reading operating point associated with a fully isolated regime in which, for a reference duration, no exchange of charged particles is possible between the first quantum dot and the second quantum dot of the pair of quantum dots;

the five preceding steps being repeated for a plurality of waiting times and a plurality of times for each waiting time so as to determine the time course of the first spin state or the second spin state, a static magnetic field being present during the entire method, the reference duration being greater than or equal to the time required for the implementation of the waiting step, the conversion step and the charge state determination step.

In addition to the characteristics just discussed in the preceding paragraph, the method according to a sixth aspect of the invention may have one or more of the following additional characteristics, considered individually or according to any technically possible combinations.

In one embodiment, the method comprises, beforehand, a step of determining a reading operating point in a fully isolated regime, said operating point being determined using a method according to a first aspect of the invention.

In one embodiment, the method comprises, beforehand, a step of determining an optimal set of parameters of a measurement means using a method according to a second aspect of the invention, the set of parameters thus determined being used in the step of determining the charge state.

In one embodiment, the method comprises, beforehand, a step of determining a spin blocking operating point using a method according to a third aspect of the invention.

In one embodiment, the first spin state is the singlet spin state S and the second spin state is the triplet spin state T0.

In one embodiment, the first spin state is the singlet spin state S and the second spin state is the triplet spin state T+ or T−.

A seventh aspect of the invention relates to a method for characterising the exchange interaction between two charged particles for implementing a target quantum gate using a pair of quantum dots of a system, the system also comprising a reservoir of charged particles, the pair of quantum dots being separated from the reservoir of charged particles by a potential barrier, said potential barrier and the charge state of the pair of quantum dots being able to be modulated by a plurality of gate voltages, the value of said voltages defining an operating point of the system, the method comprising from a first operating point associated with a fully isolated regime and a charge state (1,1), for a plurality of operating points to be characterised:

- a step of non-adiabatically modifying the operating point so as to obtain the operating point to be characterised;
- a step of waiting at the operating point to be characterised for a predetermined duration being a function of the target quantum gate;
- a step of non-adiabatically modifying the operating point so as to return to the first operating point;
- a spin/charge conversion step using a conversion operating point;
- a step of determining the charge state using a reading operating point in the fully isolated regime;
- the preceding steps being repeated a plurality of times for each operating point to be characterised, the method further comprising, for each operating point to be characterised, a step of determining the probability of measuring a singlet state and thus determining, for each operating point, the exchange interaction associated with the quantum gate considered.

In addition to the characteristics just discussed in the preceding paragraph, the method according to a seventh aspect of the invention may have one or more of the following additional characteristics, considered individually or according to any technically possible combinations.

In one embodiment, the method further comprises:

a step of selecting the operating points for which the exchange interaction is compatible with the target quantum gate;

for each operating point selected, a step comprising a plurality of implementations of the target quantum gate so as to determine the fidelity measured for the operating point considered;

a step of selecting the operating point for which the exchange interaction makes it possible to obtain the highest fidelity, so-called the optimal operating point.

In one embodiment, the method according to the preceding claim comprises, beforehand, a step of determining an operating point associated with the fully isolated regime using a method according to a first aspect of the invention.

In one embodiment, the method comprises, beforehand, a step of determining an optimal set of parameters of a measurement means using a method according to a third aspect of the invention, the set of parameters thus determined being used in both measurement steps.

An eighth object of the invention relates to a method for determining the conversion factor between a voltage applied to the gates of a system and the tunnel coupling $T_{QD}$ between both quantum dots of the pair of quantum dots, the system comprising a pair of quantum dots including a first quantum dot and a second quantum dot, the tunnel coupling $T_{QD}$ between both quantum dots (QD1,QD2) of the pair (CP) of quantum dots (QD) being modulated using a plurality of gates, a set of voltages applied to the gates of the plurality of gates defining an operating point of the system, the pair of quantum dots being in one charge state from the charge state (2,0), the charge state (1,1) and the charge state (0,2), and both charged particles (CP) adopting either a singlet spin state S or a triplet spin state T+/T−, the method comprising:

a step of initialising the system in a reading operating point associated with the fully isolated regime and the charge state (2,0) and in a singlet spin state S;

a step of modifying the operating point so as to reach an operating point to be characterised, said modifying being non-adiabatically performed so as to cause a coherent oscillation from the singlet spin state S to the triplet spin state T+/T−;

a step of waiting at the operating point to be characterised for a randomly selected duration within the interval $$\left[\frac{1}{f_{Rabi}^{max}}, \frac{1}{f_{Rabi}^{min}}\right]$$

so as to allow the spin state to oscillate freely in a coherent manner where $f_{Rabi}^{max}$ is the maximum oscillation speed between the singlet spin state S and the triplet spin state T+/T− and $f_{Rabi}^{min}$ is the minimum oscillation speed between the singlet spin state S and the triplet spin state T+/T−;

a spin/charge conversion step using a conversion operating point;

a step of determining the charge state using the reading operating point $P_{iso}$ in the fully isolated regime in which, for a reference duration, no exchange of charged particles is possible between the quantum dots of the pair of quantum dots;

the foregoing steps being repeated for a plurality of operating points P10 to be characterised and a plurality of times for each such operating point so as to determine, for each such operating point, the probability of measuring a singlet state S; the method then comprising:

a step of identifying the crossing line of the singlet spin state S and the triplet spin state T+/T−;

the preceding steps being repeated for a plurality of operating points located on a line perpendicular to the crossing line and for which the potential difference between both quantum dots of the pair of quantum dots is zero and passing through said crossing line, and for a plurality of magnetic fields so as to characterise the course of the position of the crossing as a function of the magnetic field; the method then comprising:

a step of determining, from this course, the conversion factor between the voltage applied to the gates of the system and the tunnel coupling $\Gamma_{QD}$ between both quantum dots of the pair of quantum dots.

By "T+/T− triplet spin state", it is meant "T+ triplet spin state" when the g-factor is positive and "T− triplet spin state" when the g-factor is negative.

A ninth object of the invention relates to a method for determining the conversion factor between a voltage applied to the gates of a system and the potential difference between a first quantum dot and a second quantum dot of a pair of quantum dots, the system comprising a pair of quantum dots containing two charged particles and having a first quantum dot and a second quantum dot, a tunnel coupling existing between the first quantum dot and the second quantum dot, the potential difference of the first quantum dot and the second quantum dot being modulated using a plurality of gates, a set of voltages applied to the gates of the plurality of gates defining an operating point of the system, the pair of quantum dots being in one charge state from of the charge state (2,0), the charge state (1,1) and the charge state (0,2), and both charged particles adopting either a "ud" spin state or a "du" spin state with u representing an "up" spin state and the d representing a "down" spin state, or a singlet spin state S in a ground state or a plurality of excited states, or a triplet spin state T0 or a triplet spin state T+/T−, the method comprising:

a step of initialising the system in a reading operating point associated with the fully isolated regime and the charge state (2,0) and in a singlet spin state S;

a step of modifying the operating point so as to reach an operating point to be characterised, said modifying being non-adiabatically performed so as to cause a coherent oscillation of the singlet spin state as a function of the tunnel coupling between the first quantum dot and the second quantum dot;

a step of waiting, under microwave excitation, at the operating point to be characterised for a randomly chosen duration within the interval $$\left[\frac{1}{f_{Rabi}^{max}}, \frac{1}{f_{Rabi}^{min}}\right]$$

so as to allow the spin state to oscillate freely in a coherent manner where $f_{Rabi}^{max}$ is the maximum oscillation speed between the singlet spin state S and the triplet spin state T0 and/or the triplet spin state T+/T− and $f_{Rabi}^{min}$ is the minimum oscillation speed between the singlet spin state S and the triplet spin state T0 and/or the triplet spin state T+/T−;

a spin/charge conversion step using a conversion operating point;

a step of determining the charge state using the reading operating point $P_{iso}$ in the fully isolated regime in which, for a reference duration, no exchange of charged particles is possible between the quantum dots of the pair of quantum dots;

the foregoing steps being repeated for a plurality of operating points P10 to be characterised and a plurality of times for each such operating point so as to determine, for each such operating point, the probability of measuring a singlet state S, the method then comprising:

a step of identifying at least one line of excited states;

the preceding steps being repeated for a plurality of operating points (P10) located on a line perpendicular to the spin excitation line and passing through said excitation line and for a plurality of frequencies so as to characterise the microwave excitation and its course as a function of the microwave frequency applied to the system; the method then comprising:

a step of determining, from this course, the conversion factor between the voltage applied to the gates of the system and the potential difference E between both quantum dots of the pair of quantum dots.

In one embodiment, the charge energy is a parameter of the system and the method comprises, after the step of determining the conversion factor, a step of determining, from this conversion factor, the charge energy of the system and the energies associated with the excited states.

A tenth object of the invention relates to the characterisation of a system comprising a reservoir of charged particles, a pair of quantum dots including a first quantum dot and a second quantum dot, the pair of quantum dots being likely to adopt a plurality of charge states, the system also comprising a means for measuring said charge state, the first quantum dot being separated from the second quantum dot by a first potential barrier, the pair of quantum dots being separated from the reservoir of charged particles by a second potential barrier, the first potential barrier, the second potential barrier and the charge state of the pair of quantum dots being modulated using a plurality of gate voltages, the value of said voltages defining an operating point of the system, the charged particles being likely to adopt a plurality of spin states, the method comprising at least one of the following steps:

A step of determining an operating point corresponding to a partially isolated regime of the system, preferably using a method according to a first aspect of the invention;

A step of determining an operating point corresponding to a fully isolated regime of the system, preferably using a method according to a first aspect of the invention;

A step of determining an operating point associated with charging of two charged particles in the pair of quantum dots in the singlet state, preferably using a method according to a second aspect of the invention;

A step of determining a set of parameters of the charge state measurement means for obtaining the highest difference between a first signal associated with a first charge state and a second signal associated with a second charge state, preferably using a method according to a third aspect of the invention;

A step of determining the spin/charge conversion operating point for obtaining the highest difference between the signal measured for the singlet spin state and the signal measured for the triplet spin state, so-called an optimal operating point, preferably using a method according to a fourth aspect of the invention;

A step of determining an operating point associated with the optimal charging of two charged particles in a singlet state, preferably using a method according to a fifth aspect of the invention;

A step of determining the gradient of the magnetic field along a first axis dBz or a second axis dBx from the oscillation period between a first spin state and a second spin state, said period preferably being determined using a method according to a sixth aspect of the invention;

A step of determining the exchange interaction between a charged particle in the first quantum dot and a charged particle in the second quantum dot, preferably using a method according to a seventh aspect of the invention;

A step of determining the conversion factor between a voltage applied to the gates of the system and the tunnel coupling between the first quantum dot and the second quantum dot, preferably using a method according to an eighth aspect of the invention;

A step of determining the conversion factor between a voltage applied to the gates of the system and the potential difference between the first quantum dot and the second quantum dot, preferably using a method according to a ninth aspect of the invention.

An eleventh aspect of the invention relates to a system comprising a first subsystem and a second subsystem, the first subsystem and/or the second subsystem containing zero, one or more charged particles, a tunnel coupling existing between the first subsystem and the second subsystem, said tunnel coupling allowing exchange of one or more charged particles between the first subsystem and the second subsystem and being modulated by a gate voltage applied to one or more gates configured to form a potential barrier between the first subsystem and the second subsystem, the system also comprising a means for measuring the charge state of the first subsystem and/or the second subsystem, the system also comprising means configured to execute the steps of a method according to a first or a third aspect of the invention.

A twelfth aspect of the invention relates to a computer program comprising program code instructions which cause the system according to the eleventh aspect of the invention to execute the steps of the method according to a first or third aspect of the invention when said program is executed by a computer.

A thirteenth aspect of the invention relates to a computer-readable medium on which the computer program according to a twelfth aspect of the invention is recorded.

The invention and its different applications will be better understood upon reading the following description and examining the accompanying figures.

BRIEF DESCRIPTION OF THE FIGURES

The figures are set forth by way of indicating and in no way limiting purposes of the invention.

FIG. 1 shows a schematic representation of a system according to the invention.

FIG. 2 shows a schematic representation of the coupling between the pair of quantum dots and a reservoir of charged particles.

FIG. 3 shows a schematic representation of the coupling between both quantum dots of a pair of quantum dots.

FIG. 4 shows a flow chart of a method according to a first aspect of the invention.

FIG. 5 shows a schematic representation of a stability diagram of a pair of quantum dots.

FIG. 6 shows a schematic representation of a stability diagram of both quantum dots of the pair of quantum dots.

FIG. 7 shows a schematic representation of a stability diagram of a pair of quantum dots highlighting the partially isolated regime region and the region associated with charging of two charged particles.

FIG. 8 shows a schematic representation of a stability diagram of both quantum dots of the pair of quantum dots, highlighting the region associated with the fully isolated regime.

FIG. 9A to FIG. 9G show a schematic representation of a method for determining the operating points associated with the fully isolated regime.

FIG. 10 shows a schematic representation of the position of a charging point of two charged particles in a stability diagram of the pair of quantum dots.

FIG. 11 shows a schematic representation of the position of a quantum dot charging point in a quantum dot stability diagram of the pair of quantum dots.

FIG. 12 to FIG. 17 show a schematic representation of operating point modifications in a method according to a first aspect of the invention.

FIG. 18 shows a schematic representation of the course of the probability of measuring a first charge state as a function of a waiting time.

FIG. 19 and FIG. 20 show a schematic representation of a system reinitialisation to the charging operating point.

FIG. 21 shows a schematic representation of the spin states of two charged particles in a pair of quantum dots.

FIG. 22 shows a flow chart of a method according to a second aspect of the invention.

FIG. 23 shows a schematic representation of charging in a method according to a second aspect of the invention.

FIG. 24 shows a flow chart of a method according to a third aspect of the invention.

FIG. 25A shows a curve representing the signal measured by the charge state measurement means for two different charge states.

FIG. 25B shows a curve representing the difference in the signal measured by the charge state measurement means for two different charge states.

FIG. 26 shows a flow chart of a method according to a fourth aspect of the invention.

FIG. 27 to FIG. 30 show a schematic representation of the method steps according to a fourth aspect of the invention.

FIG. 31 shows a flow chart of a method according to a fifth aspect of the invention.

FIG. 32 shows a flow chart of a method according to a sixth aspect of the invention.

FIG. 33 shows a schematic representation of the steps of a method according to a sixth aspect of the invention.

FIG. 34 shows a measurement of the course of the probability of measuring a singlet spin state as a function of a gate voltage.

FIG. 35 shows a flow chart of a method according to a seventh aspect of the invention.

FIG. 36 to FIG. 40 show a schematic representation of the steps of a method according to a seventh aspect of the invention.

FIG. 41 shows a probability map of measuring a singlet state obtained using a method according to the seventh aspect of the invention.

FIG. 42 shows a flow chart of a method according to an eighth aspect of the invention.

FIG. 43 to FIG. 46 show a schematic representation of the steps of a method according to an eighth aspect of the invention.

FIG. 47 shows a probability map of measuring a singlet state obtained using a method according to the eighth aspect of the invention.

FIG. 48 shows a measurement of the course of the excitation as a function of the frequency applied.

DETAILED DESCRIPTION

The figures are set forth by way of indicating and in no way limiting purposes of the invention.

Unless otherwise specified, a same element appearing in different figures has a single reference.

It will be noted that the figures all illustrate the case where the charged particles are electrons. However, this choice mainly influences the orientation of the axes without modifying the teachings provided by these illustrations for a case where charged particles are holes for example. Similarly, all the examples given relate to a negative g-factor where the S-T+ crossing is of interest. However, in the case of a positive g-factor, the term "S-T+ crossing" should be replaced by "S-T− crossing", "T+" should be replaced by "T−" and "T−" should be replaced by "T+".

In this description, reference is made to adiabatic and non-adiabatic modifications.

When this notion is used with reference to two spin states (e.g. ST+ or ST0 anti-crossing), then it refers to the Landau-Zenner transitions well known to those skilled in the art that can occur at the anti-crossing between the two states considered. In this context, by adiabatic, it is meant that the probability of remaining in the ground state is greater than or equal to 0.99 (99%), preferably greater than or equal to 0.999 (99.9%), or even greater than or equal to 0.9999 (99.99%). Similarly, by non-adiabatic, it is meant that the probability of transiting to the excited state is greater than or equal to 0.99 (99%), preferably greater than or equal to 0.999 (99.9%), or even greater than or equal to 0.9999 (99.99%).

When this notion is used in reference to the tunnel coupling between two systems, then it refers to the transition of a charged particle from one system to the other. More particularly, in the case of the transfer of a charged particle into a quantum dot from a reservoir of charged particles, if, for the charged particle, two states are possible in the quantum dot (for example singlet and triplet), these two states being separated in energy, if the tunnel coupling is large compared to the rise time of the pulse allowing transfer (that is the modification of the operating point), then only the ground state will be created, if the tunnel coupling is small compared to this rise time, then both states can be created. Thus, by analogy with the Landau-Zenner transition, a modification in the operating point relative to a tunnel coupling is referred to as adiabatic when, during this modification, the probability of creating a ground state is greater than or equal to 0.99 (99%), preferably greater than or equal to 0.999 (99.9%). Similarly, a change in the operating point with respect to a tunnel coupling is referred to as non-adiabatic when, during this change, the probability of creating a ground state is substantially (that is within 10%, preferably within 5%, or even within 1%) identical to the probability of creating an excited state.

Of course, these notions are known to the person skilled in the art and are only mentioned for information purposes. In the same way, when the notion of adiabatic or non-adiabatic modification or charging is discussed, the description will generally set out to which quantities of the system it refers. It is clear that a person skilled in the art will be able to identify relevant quantities of the system, and these clarifications are therefore provided for instructional purposes only.

Introduction

In order to facilitate understanding of the invention, it may be useful to introduce a series of definitions which will be used in the remainder of this description. But for this, it is convenient to first introduce the system SYS to which these definitions apply.

System According to the Invention

As illustrated in [FIG. 1], the system according to the invention SYS comprises at least one reservoir RE of charged particles PC, a pair CP of quantum dots QD containing zero, one or more charged particles PC, the charged particles PC carrying a spin. Furthermore, the operating regime of the system SYS can be modulated with a plurality of gate voltages. For example, the tunnel coupling between the pair CP of quantum dots QD and the reservoir (s) can be modulated using a first gate voltage V1 and a second gate voltage V2, the value of these two voltages V1,V2 defining an operating point Pi of the system SYS. Similarly, the tunnel coupling between the two quantum dots QD of the pair CP of quantum dots QD can be modulated using a third gate voltage V1' and a fourth gate voltage V2'. Each set of values of these different voltages is associated with an operating point of the system SYS. In other words, an operating point defines the set of values of the voltages applied to the gates of the system SYS. The operating point of the system can therefore be modified by modifying one or more of the voltages applied to the gates of the system SYS.

Because of the influence of gates on each other (known as "cross-talk"), a combination of gate voltages is usually necessary in order to modulate the tunnel couplings discussed above. However, for the sake of simplification and because taking into account these cross-talk effects is a matter of daily practice for the skilled artisan, the simplified situation previously discussed will generally be used in the following description.

The system SYS according to the invention also comprises a means for measuring CS the charge state of the pair CP of quantum dots QD, generating a signal being a function of the charge state of the pair CP of quantum dots QD. This measurement means CS may for example comprise one or more electrometers.

Partial Isolation Regime

By partial isolation regime, it is meant all operating points where the pair CP of quantum dots QD is isolated from the reservoir(s) RE of charged particles PC. Thus, in the partial isolation regime, the number of charged particles PC within the pair CP of quantum dots QD is fixed, but the number of charged particles PC within a quantum dot QD can vary within the limits set by the number of charged particles PC in the pair CP of quantum dots QD. More generally, this is referred to as partial isolation, partial insulation or partially isolated regime.

In order to clarify this term of partial isolation (or partial isolation regime), the reader may refer to [FIG. 2] where a quantum dot QD is represented, separated from a reservoir RE of charged particles PC by a potential barrier BR characterised by a parameter $T_{RQ}$ known in the art as the tunnelling rate. The quantum dot QD is considered isolated from the reservoir RE of charged particles PC for a given operation if the characteristic duration associated with said operation $\tau_{op}$ is such that:

$$\frac{1}{\tau_{op}} \gg \Gamma_{RQ} \qquad \text{[Math. 1]}$$

For example, $$\frac{1}{\tau_{op}} > \alpha_{RI} \times \Gamma_{RQ} \qquad \text{[Math. 2]}$$

where $\alpha_{RI}$ is a coefficient to define the error tolerance. In one exemplary embodiment, $\alpha_{RI}=100$. In other words, the definition of the partially isolated regime is relative to a reference duration. The way to verify that such a condition is fulfilled will be detailed in the following.

Full Isolation Regime

By full isolation regime, it is meant all operating points where the quantum dots QD of the pair CP of quantum dots QD are isolated from each other and are isolated from the reservoir(s) RE of charged particles PC when such a reservoir RE is present. Thus, in the full isolation regime, the number of charged particles PC within each quantum dot QD of the pair CP of quantum dots QD is fixed. More generally, this will be referred to as the full isolation, full insulation or fully isolated regime. It may be useful to note that the full isolation regime assumes the partial isolation regime: indeed, the number of charged particles PC in each quantum dot QD and thus at the level of the pair CP of quantum dots QD is fixed.

Figure 3:
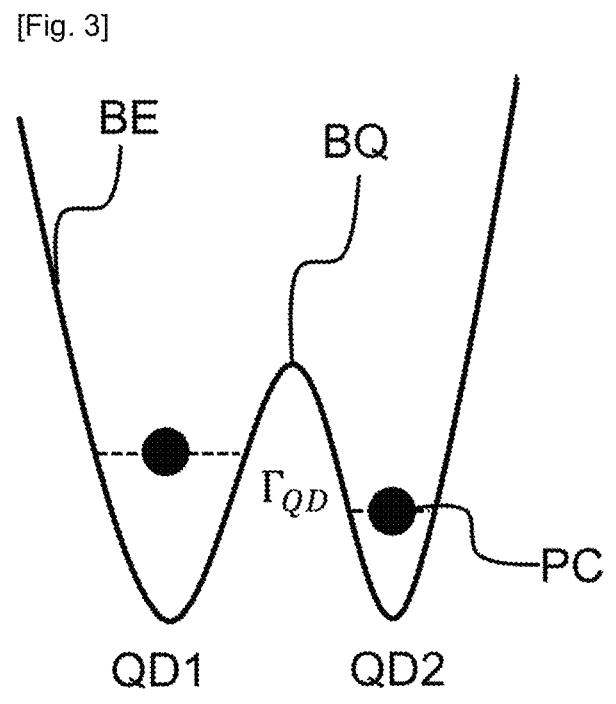

In order to clarify this term of full isolation (or full isolation regime), the reader may refer to [FIG. 3] in which both quantum dots QD1,QD2 of the pair CP of quantum dots QD separated from each other by a potential barrier BQ characterised by a parameter $\Gamma_{QD}$ known in the art as the tunnelling rate are represented. Both quantum dots QD1, QD2 are considered to be in a fully isolated regime for a given operation if the characteristic duration associated with said operation $\tau_{op}$ is such that:

$$\frac{1}{\tau_{op}} \gg \Gamma_{QD} \qquad \text{[Math. 3]}$$

For example, $$\frac{1}{\tau_{op}} > \alpha_{RI} \times \Gamma_{QD} \qquad \text{[Math. 4]}$$

Where, as previously, $\alpha_{RI}$ is a coefficient to define the error tolerance. In one exemplary embodiment, $\alpha_{RI}=100$. In other words, the definition of the fully isolated regime is relative to a reference duration. The way to verify that such a condition is met will be detailed in the following.

Interest of these Two Regimes

The interest of these two operating regimes in the implementation of quantum devices such as the system SYS according to the invention is to the credit of the inventors of the present invention and the way of characterising them described above is one of the original components of the invention. More particularly, the invention takes advantage of these operating regimes in order to determine the position of the operating points necessary for the implementation of one or more quantum gates using a system SYS according to the invention.

Generalisation

It is possible to examine both previous isolation regimes in a more general way, considering that it is a question of isolating a first subsystem from a second subsystem. In the case of the partially isolated regime, the first subsystem is the pair CP of quantum dots QD, or a quantum dot QD1 of the pair CP of quantum dots QD, and the second subsystem is the reservoir RE of charged particles PC. In the case of the fully isolated regime, the first system is the first quantum dot QD1 and the second system is the second quantum dot QD2 (or vice versa, the reference to first or second quantum dot being only a notational convention). Of course, each of these regimes has its own specificities, which will be explained in the following.

Method for Determining an Operating Point in Isolated Regime

A first aspect of the invention illustrated in [FIG. 4] relates to a method 100 for determining an isolated operating point associated with an isolated regime of a system SYS comprising a first subsystem CP,QD1 and a second subsystem RE,QD2, said isolated operating point for which a passage of a charged particle (PC) from the first subsystem (CP,QD1) to the second subsystem (RE,QD2) and vice-versa is forbidden for a reference duration (that is, the duration for which the system can be considered to be in an isolated regime), the first subsystem CP,QD1 and the second subsystem RE,QD2 containing zero, one or more charged particles PC, a tunnel coupling existing between the first subsystem CP,QD1 and the second subsystem RE,QD2, said tunnel coupling allowing exchange of one or more charged particles PC between the first subsystem CP,QD1 and the second subsystem RE,QD2.

In other words, the method 100 according to the invention makes it possible to determine an operating point of the system SYS, so-called an isolated operating point, for which the first subsystem CP,QD1 is isolated from the second subsystem RE,QD2, that is an operating point for which, for the reference duration, a charged particle PC cannot pass from the first subsystem PC,QD1 to the second subsystem RE,QD2 (and vice-versa) even when such a transition is energetically possible.

As already mentioned, the first subsystem CP,QD1 and the second subsystem RE,QD2 are separated from each other by a potential barrier and the tunnel coupling between these two subsystems can be modulated by means of a plurality of gate voltages, this coupling being furthermore characterised by a tunnelling rate noted F. Also, the tunnel coupling is a function of the operating point of the system SYS itself determined by the value assumed by each gate voltage of the plurality of gate voltages. Furthermore, it is possible to modify the operating point Pi of the system SYS, and thus the tunnel coupling between the two subsystems, by modifying one or more of these gate voltages.

According to the definitions given in the introduction, when the first subsystem is the pair CP of quantum dots QD or a quantum dot QD1 of the pair CP of quantum dots QD and the second subsystem is the reservoir RE of charged particles PC, then the isolated regime previously discussed corresponds to the partially isolated regime. When the first subsystem is a quantum dot QD1 of the pair CP of quantum dots QD, the exchange of charged particles PC takes place only between the reservoir RE and the quantum dot QD1 considered of the pair CP of quantum dots QD.

Similarly, when the first subsystem is the first quantum dot QD1 of the pair CP of quantum dots QD and the second subsystem is the second quantum dot QD2 of the pair CP of quantum dots QD, then the isolated regime discussed above corresponds to the fully isolated regime.

Determining a Stability Diagram of the System

The method 100 according to a first aspect of the invention comprises a first step 1E1 of determining a stability diagram of the system SYS so as to determine a plurality of charge states assumed by the first subsystem CP,QD1 as a function of the operating point considered. The concept of a stability diagram is well known to those skilled in the art and will therefore not be detailed here. Only brief reminders will be made for each (partially or fully isolated) regime.

When the Isolated Regime Corresponds to the Partially Isolated Regime

In one embodiment, the isolation considered is a partial isolation. In this regime, the stability diagram of the system SYS according to the invention is a representation of the charge state of the pair CP of quantum dots QD when the first subsystem CP,QD1 is the pair CP of quantum dots QD or of a quantum dot QD1 when the first subsystem CP,QD1 is a quantum dot QD1 of the pair CP of quantum dots QD. In the following, for illustration purposes, the first subsystem is the pair CP of quantum dots QD. In this case, no distinction is made in the stability diagram between the distribution of the charged particle(s) PC within the pair CP of quantum dots QD (this will be different in the case of a stability diagram when the isolated regime corresponds to the fully isolated regime). Such a stability diagram is set forth in [FIG. 5].

In this [FIG. 5], the stability diagram represents the charge state of the pair CP of quantum dots QD as a function of a first voltage V1 and a second voltage V2. In a simplified way, the first voltage V1 mainly controls the electrostatic potential within the pair of quantum dots QD CP, while the second voltage V2 mainly controls the potential barrier separating the reservoir(s) RE of charged particles PC from the pair of quantum dots QD CP. In other words, the second voltage V2 controls the parameter $T_{RQ}$ introduced previously and relating to the tunnel coupling between the reservoir RE and the pair CP of quantum dots QD. As mentioned in the introduction, the situation is generally more complicated due to the cross-talk between the gates, which is highlighted in [FIG. 5] by the presence of black oblique lines. These black oblique lines materialise charge state changes of the pair CP of quantum dots QD. Charge states are identified by numbers indicating the number of charged particles PC in the pair CP of quantum dots QD. The interruption of the lines in the lower part of the stability diagram reflects the isolation of the pair CP of quantum dots QD from the reservoir(s) RE: the charged particles PC can no longer be exchanged and the charge state of the pair CP of quantum dots QD is therefore set in this region of the stability diagram (hence the absence of the black oblique lines showing changes in the charge state)

This regime thus corresponds to the partial isolation regime: the pair of quantum dots QD is isolated from the reservoir(s) RE of charged particles PC, but are not necessarily isolated from each other. For more detail, the reader may refer to the paper Bertrand et al, Quantum Manipulation of Two-Electron Spin States in Isolated Double Quantum Dots, Physical Review Letters, 2015, 115, 096801.

When the Isolated Regime Corresponds to the
Fully Isolated Regime

In one embodiment, the isolation considered is full isolation. More particularly, considering again [FIG. 3], in a pair CP of quantum dots QD1,QD2, it is possible to distinguish the potential barrier BQ between both quantum dots QD1,QD2 which will allow modulation of the tunnel coupling between the latter from the external potential barrier BE which ensures the partially isolated regime of the pair CP of quantum dots QD1,QD2 with respect to the reservoirs RE of charged particles PC. Stated differently, it is possible to establish a tunnel coupling between two quantum dots QD1,QD2 of the pair CP of quantum dots QD1,QD2 by modulating the potential barrier BQ that separates them while maintaining a partially isolated regime with the reservoir(s) RE of charged particles PC.

The operating regime of the pair CP of quantum dots QD1,QD2 can be characterised by means of two parameters: the gap between the energy levels NE of each charged particle PC contained in each quantum dot QD1,QD2, noted E and the value of the parameter $T_{QD}$ associated with the potential barrier BQ which separates both quantum dots QD1,QD2 (and thus both charged particles PC contained in both quantum dots QD1,QD2). Both can be modified by applying voltages to control gates to obtain the most adapted configuration for the desired manipulation. The parameterisation of these two properties for quantum manipulation is a technique well known to those skilled in the art. Such a parameterisation is, for example, described in the documents cited in the introduction and will therefore not be repeated here for the sake of brevity.

It is possible to represent the value of these two parameters in a stability diagram as illustrated in [FIG. 6]. In this example, the parameter $\Gamma_{QD}$ can be modulated with the third gate voltage V1', the modification corresponding to a shift of the system along the x-axis in the stability diagram. In the same way, the parameter ε can be modulated using the fourth gate voltage V2', the modification in this parameter corresponding to a shift along the y-axis in the stability diagram. Thus, in this representation, two points with the same abscissa correspond to two configurations with an identical potential barrier $\Gamma_{QD}$ between both quantum dots QD1,QD2, while two points with the same ordinate correspond to two configurations with an identical E value. In other words, unlike the stability diagram in [FIG. 5], cross-talk has not been represented.

Furthermore, the charge state associated with the ground state of each configuration has been represented in the stability diagram of [FIG. 6]. More particularly, in this diagram (and more generally in the following description), the charge state of the pair CP of quantum dots QD is denoted $(x_1, x_2)$ with $x_1$ the charge state of the first quantum dot QD1 and $x_2$ the charge state of the second quantum dot QD2. It is worth noting that the pair CP of quantum dots QD is in the partially isolated regime upon making the stability diagram in [FIG. 6]. Also, the total number of charged particles PC in the pair CP of quantum dots QD1,QD2 is set. Furthermore, in the stability diagram, only the case where the charge state of the pair CP of quantum dots QD is equal to two is shown. In other words, the charge state of the pair CP of quantum dots QD can assume the following charge states: (2,0), (1,1) and (0,2).

Evaluating the Operating Points Corresponding to an Isolated Regime

The method 100 according to the invention then comprises, on the basis of this stability diagram, a second step 1E2 of evaluating the operating points corresponding to an isolated regime, the evaluation being defined as a determination of the operating points corresponding to the isolated regime not involving a determination of the tunnelling rate $\Gamma$. The term evaluation is used here to make it clear that there is a more accurate method (described in the following) for determining these operating points. In addition, the reference duration for evaluating the isolation regime is set by the method used to make the stability diagram and this reference duration does not necessarily correspond to the reference duration mentioned in the preamble. However, the evaluation of the position of these operating points from the stability diagram provides a good approximation.

When the Isolated Regime Corresponds to the Partially Isolated Regime

In one embodiment, the isolation considered is a partial isolation. As illustrated in [FIG. 7], from the stability diagram of [FIG. 3], it is possible to identify a first region which corresponds to a regime in which the pair CP of quantum dots QD is partially isolated (shown as hatched in [FIG. 7]) and a second region in which the pair CP of quantum dots QD can be charged with or discharged from charged particles PC via the reservoir(s) RE (region outside the hatched region). Within this second region, it is possible to identify a zone where two charged particles PC are present in the pair CP of quantum dots QD (shown as dashed lines in [FIG. 7]).

It is therefore possible, from such a diagram, to estimate the position of the operating points Pi corresponding to the partially isolated regime of the pair CP of quantum dots QD and the operating points Pi corresponding to charging of two charged particles PC in the pair CP of quantum dots QD.

When the Isolated Regime Corresponds to the Fully Isolated Regime

In one embodiment, the isolation considered is full isolation. As illustrated in [FIG. 8], from the stability diagram of [FIG. 5], it is possible to determine a region that corresponds to the fully isolated regime, for example by examining stochasticity of the transition lines marking the change of a charge state. When such a transition occurs in the fully isolated regime, these lines tend to disappear (although they are still shown in the figures for the sake of clarity).

When it is desired to be dispensed with the coarse aspect of evaluating stochasticity of the charge state change lines, it is possible to contemplate a more precise evaluation as will be described now.

Firstly, a plurality of final operating points $C^i_{final}$ is selected, each final operating point $C^i_{final}$ corresponding to a different value of the first parameter $\Gamma_{QD}$ from the other final operating points $C^i_{final}$ of the plurality of final operating points $C^i_{final}$ so as to cover all the values of the first parameter $\Gamma_{QD}$ that the pair CP of quantum dots QD1, QD2 can assume or, at least, that it is desired to characterise. Moreover, the charge state in the ground state is known for each final configuration.

Such a plurality of final operating points $C^i_{final}$ is illustrated in [FIG. 9A] (eight final operating points $C^i_{final}$ in this example). In the example given, all final operating points $C^i_{final}$ are associated with the same charge state (2,0). However, a final operating point can be associated with any of the three charge states that the pair CP of quantum dots QD1, QD2 can assume.

Furthermore, for each final operating point $C^i_{final}$ of the plurality of final operating points $C^i_{final}$, a plurality of initial operating points $C^i_{init}$ will be considered. This plurality of initial operating points $C^i_{init}$ corresponds to a known distribution of charge states. For example, if the plurality of initial operating points $C^i_{init}$ comprises twelve operating points, it will be possible to choose a charge distribution in which four initial operating points $C^i_{init}$ correspond to a charge state (2,0), four initial operating points $C^i_{init}$ correspond to a charge state (1,1) and four initial operating points $C^i_{init}$ correspond to a charge state (0,2). An example of three initial operating points $C^i_{init}$ is given in [FIG. 9B] where each initial operating point $C^i_{init}$ corresponds to a given charge state different from the other two initial operating points $C^i_{init}$. It is possible to associate, with these three initial operating points $C^i_{init}$, a distribution of initial charge states as illustrated in FIG. 9B on the right in which, for example, each charge state is associated with a probability of 33%. In order to have an estimate of the position of the operating points associated with the fully isolated regime, for each of the initial operating points $C^i_{init}$, the sub-steps that will be described now are implemented.

First of all, a sub-step of initialising the pair CP of quantum dots QD1, QD2 in a first operating point corresponding to the initial operating point $C^i_{init}$ considered is implemented. At the end of this initialisation substep, the pair CP of quantum dots QD1,QD2 is in the ground charge state associated with the initial operating point $C^i_{init}$. For example, in [FIG. 9B], the charge state of the pair of quantum dots at the initialisation substep is (0,2) for the first initial operating point $C^1_{init}$, (1,1) for the second initial operating point $C^1_{init}$ and (2,0) for the third initial operating point $C^1_{init}$.

In one embodiment illustrated in [FIG. 9C] for three initial operating points $C^i_{init}$, the initialisation substep is implemented from the final operating point $C_{final}$ considered and comprises:

a first phase of increasing the first parameter $\Gamma_{QD}$ to the value relative to the initial operating point desired, the value of the second parameter $\varepsilon$ being not modified during this first phase;

A second phase of varying the second parameter $\varepsilon$ to the value relative to the initial operating point desired, the value of the first parameter $\Gamma_{QD}$ being not modified during this second phase.

As illustrated in [FIG. 9D], a substep of decreasing the first parameter $\Gamma_{QD}$ (that is an increase in the tunnel barrier separating the first quantum dots QD1 from the second quantum dots QD2) is then implemented, the pair CP of quantum dots QD1, QD2 being in a second operating point, called the intermediate operating point $C^i_{int}$, at the end of this substep, the value of the first parameter $\Gamma_{QD}$ of the intermediate operating point $C^i_{int}$ being equal to the value of the first parameter $\Gamma_{QD}$ of the final operating point $C^i_{final}$ considered.

It is useful to note that only the value of the first parameter $\Gamma_{QD}$ is modified and therefore the value of the second parameter $\varepsilon$ of the intermediate operating point $Cl_{int}$ is equal to the value of the second parameter $\varepsilon$ of the initial operating point $C^i_{init}$. Also, the ground charge state associated with the intermediate operating point $C^i_{int}$ is identical to the ground charge state associated with the initial operating point $C^i_{init}$. In other words, the charge state of the pair of quantum dots QD1,QD2 is not modified in this substep. For example, in [FIG. 9D], the charge state of the pair CP of quantum dots QD1,QD2 after the step of decreasing the first parameter $\Gamma_{QD}$ is (0,2) for the first operating point $C^1_{int}$, (1,1) for the second intermediate operating point $C^2_{int}$ and (2,0) for the third intermediate operating point $C^3_{int}$.

As illustrated in [FIG. 9E], a sub-step of varying the second parameter $\varepsilon$ is then implemented, the value of the first parameter $\Gamma_{QD}$ being maintained during this sub-step, the system SYS being in a third operating point corresponding to the final operating point $C_{final}$ considered at the end of this sub-step. It is useful to note that, during this sub-step, the value of the first parameter $\Gamma_{QD}$ is not modified and that therefore the potential barrier separating both quantum dots QD1, QD2 of the pair CP of quantum dots QD1, QD2 is not modified. On the other hand, since the value of the parameter $\varepsilon$ parameter is modified, the ground charge state associated with the final operating point $C_{final}$ may be different from the ground charge state associated with the initial operating point $C^i_{init}$ (and in which the system is located at the end of the initialisation sub-step).

It is possible to examine two cases: the first case where the value of the first parameter $\Gamma_{QD}$ in this sub-step corresponds to the fully isolated regime and the second case where the value of the first parameter $\Gamma_{QD}$ in this step does not correspond to the fully isolated regime. These two cases are depicted in [FIG. 9F].

In the first case, no charge transfer is possible between first quantum dot QD1 and the second quantum dot QD2. Hence, even if the final operating point $C_{final}$ is associated with a ground charge state different from the ground charge state associated with the initial operating point $C^i_{init}$, this charge state is not modified during the substep of variation of the second parameter $\varepsilon$. For example, in [FIG. 9F], the charge state of the pair CP of quantum dots QD1,QD2 at the end of the second sub-step of varying the parameter $\varepsilon$ is (0,2) for the system initially (that is at the beginning of the second substep 2E3 of varying the parameter $\varepsilon$) at the first intermediate operating point $C^1_{int}$, (1,1) for the system initially at the second intermediate operating point $C^2_{int}$ and (2,0) for the system initially at the third intermediate operating point $C^3_{int}$. From the above, it appears that in this first case, the initial distribution of the charge states will be maintained. In other words, the probability associated with a charge state in the initial state is equal to the probability associated with said charge state in the final state.

In the second case, a charge transfer is possible between the first quantum dot QD1 and the second quantum dot QD2. Hence, if the final operating point $C_{final}$ is associated with a ground charge state different from the ground charge state associated with the initial operating point $C^i_{init}$, the latter is modified in the sub-step of varying the second parameter $\varepsilon$. For example, in [FIG. 9F], the charge state of the system at the end of the sub-step of varying the second parameter $\varepsilon$ is (2,0) whatever the intermediate operating point $C^i_{int}$ (and therefore the initial operating point) considered. It is clear from the above that, in this second case, the initial distribution of the charge states will not be maintained. In other words, the probability associated with a charge state in the initial state is different from the probability associated with said charge state in the final state.

In order to be able to establish the charge state of the system at the final operating point $C_{final}$, a sub-step of determining the charge state of the system at the final operating point $C_{final}$ is therefore implemented.

As previously mentioned, these sub-steps are performed for a plurality of initial operating points $C^i_{init}$. It is therefore possible to build up a statistic of the charge states measured at the final operating point $C_{final}$ so as to determine a distribution of the charge states measured at the final operating point $C_{final}$ (and thus the probability associated with each charge state at the final operating point). For this, a sub-step of determining the distribution of the charge states measured at the final operating point $C_{final}$ is implemented.

As already detailed, if the value of the first parameter $\Gamma_{QD}$ corresponds to a fully isolated regime, then the distribution of charge states measured at the final operating point $C_{final}$ will be substantially identical to the initial distribution of charge states. Also, a sub-step of comparing the initial charge state distribution to the charge state distribution measured at the final operating point $C_{final}$ is implemented, the value of the first parameter $T_{QD}$ of the final operating point $C_{final}$ corresponds to a fully isolated regime if the two distributions are substantially identical to each other.

In one embodiment, the initial distribution and the final distribution are substantially identical if, for each charge state, the probability associated with that charge state for the initial operating point is identical to the probability associated with that charge state for the final operating point. In one embodiment, the initial probability is identical to the final probability when the difference in absolute value between both probabilities is less than or equal to 10% of the initial value, or even less than 1% of the initial value, or even less than or equal to 0.1% of the initial value.

Furthermore, as these different sub-steps are repeated for a plurality of final operating points $C^i_{final}$ and therefore for a plurality of values of the first parameter $T_{QD}$, it is possible to evaluate position of the fully isolated regime of the pair CP of quantum dots QD1, QD2.

From statistics thus obtained, it is then possible to determine, for a given final operating point and therefore a given charge state, for example (2,0), the probability that the charge state associated with the initial operating point is maintained (that is measured during the sub-step of determining the charge state of the pair of quantum dots at the final operating point $C_{final}$) as a function of the value of the first parameter $T_{QD}$. Such a probability is illustrated in [FIG. 9G] for the three different initial charge states. From this curve, it is then possible to determine values of the corresponding first voltage V1' to obtain values of the first parameter $\Gamma_{QD}$ corresponding to a fully isolated regime and illustrated by the hatched zone in [FIG. 8] and [FIG. 9G]. As a reminder, the parameter $\Gamma_{RQ}$ is considered to correspond to a fully isolated regime if $$\frac{1}{\tau_{op}} \gg \Gamma_{QD} \qquad \text{[Math. 5]}$$

For example, $$\frac{1}{\tau_{op}} > \alpha_{RI} \times \Gamma_{QD} \qquad \text{[Math. 6]}$$

where $\alpha_{RI}$ is a coefficient for defining the error tolerance and $\tau_{op}$ is the reference duration for which the pair CP of quantum dots QD should be considered as being in the fully isolated regime. In one exemplary embodiment, $\alpha_{RI}$=100.

Selecting an Operating Point Outside the Isolated Regime

Once the estimate of the position of the isolated regime has been made, it is possible to determine a first operating point $P_{load}$ evaluated as being outside this isolated regime, that is in a regime for which an exchange of charged particles PC can take place between the first sub-system CP/QD1 and the second sub-system RE/QD2. It is also possible to associate a charge state, called the first charge state, with this first operating point $P_{load}$.

When the Isolated Regime Corresponds to the Partially Isolated Regime

In one embodiment, the isolation considered is partial isolation. In this embodiment, as illustrated in [FIG. 10], the first operating point $P_{load}$ is associated with a charge state of 2.

When the Isolated Regime Corresponds to the Fully Isolated Regime

In one embodiment, the isolation considered is full isolation. In this embodiment, as illustrated in [FIG. 11], the first operating point $P_{load}$ is associated with a charge state of (1,1), each quantum dot QD1,QD2 of the pair CP of quantum dots QD containing a charged particle PC.

First Modification of the Operating Point at a Constant Charge State

The method 100 according to the invention comprises, starting from the first operating point $P_{load}$, a step 1E3 of modifying the operating point so as to obtain a second operating point in a regime evaluated as being the isolated regime during the evaluation step 1E2 and corresponding to the first charge state.

When the Isolated Regime Corresponds to the Partially Isolated Regime

As illustrated in [FIG. 12], for the embodiment where the isolation considered is partial isolation, during this step 1E3 the operating point is modified from the first operating point $P_{load}$ so as to obtain a second operating point, this second operating point being associated, like the first operating point $P_{load}$, with a charge state of 2.

When the Isolated Regime Corresponds to the Fully Isolated Regime

As illustrated in [FIG. 13], for the embodiment where the isolation considered is full isolation, during this step 1E3 the operating point is modified from the first operating point $P_{load}$ so as to obtain a second operating point, this second operating point being associated, like the first operating point $P_{load}$, with a charge state of (1,1).

Second Modification of the Operating Point Associated with a Change in Constant Charge State The method 100 according to the invention then comprises, starting from the second operating point, a step 1E4 of modifying the operating point so as to obtain a third operating point $P_{probe}$, said third operating point $P_{probe}$ being in a regime evaluated as being the isolated regime during the evaluation step 1E2 and corresponding to a second charge state different from the first charge state. It will be noted that as the operating point remains in a regime estimated to be an isolated regime in this step, the real charge state of the first subsystem CP,QD1 may be different from the charge state associated with the third operating point $P_{probe}$, that is the second charge state associated with the ground state of the system for this operating point $P_{probe}$ (and referred to in the stability diagram). It is the regime of this third operating point $P_{probe}$ that is sought to be characterised, that is to determine whether this third operating point $P_{probe}$ is associated with an isolated regime.

When the Isolated Regime Corresponds to the Partially Isolated Regime

As illustrated in [FIG. 14], for the embodiment where the isolation considered is partial isolation, during this step 1E4 the operating point is modified from the second operating point so as to obtain a third operating point $P_{probe}$ corresponding to the charge state 0 different from the first charge state 2.

When the Isolated Regime Corresponds to the Fully Isolated Regime

As illustrated in [FIG. 15], for the embodiment where the isolation considered is full isolation, during this step 1E4 the operating point is modified from the second operating point so as to obtain a third operating point $P_{probe}$ corresponding to the charge state (2,0) different from the first charge state (1,1).

Waiting at the Third Operating Point

The method 100 according to the invention also comprises, at the third operating point $P_{probe}$, a step 1E5 of waiting for a predetermined duration noted $t_{att}$.

When the Isolated Regime Corresponds to the Partially Isolated Regime

As illustrated in [FIG. 16], for the embodiment where the isolation considered is partial isolation, during this step 1E5, the operating point remains at the third operating point $P_{probe}$ corresponding to the charge state 0 different from the first charge state 2 for the waiting time $t_{att}$.

When the Isolated Regime Corresponds to the Fully Isolated Regime

As illustrated in [FIG. 17], for the embodiment where the considered isolation is full isolation, during this step 1E5, the system remains at the third operating point $P_{probe}$ corresponding to the charge state (2,0) different from the first charge state (1,1) for the waiting time $t_{att}$.

Determining the Charge State

The method 100 according to the invention also comprises at the third operating point $P_{iso}$, a step 1E6 of determining the charge state of the first system CP,QD1.

Where the Isolated Regime Corresponds to the Partially Isolated Regime

For the embodiment where the isolation considered is partial isolation, during this step 1E6, the charge state of the pair CP of quantum dots is determined.

When the Isolated Regime Corresponds to the Fully Isolated Regime

For the embodiment where the isolation considered is full isolation, during this step 1E6, the charge state of the first quantum dot QD1 (and/or the second quantum dot QD2) is determined.

Repetition for a Plurality of Waiting Times

In the method 100 according to the invention, at the end of the determination of charge state of the first subsystem, the operating point of the system SYS is reinitialised to the first operating point $P_{load}$. Reinitialising is preferably done by applying the reverse modifications of those that brought the operating point from the first operating point $P_{load}$ to the second operating point $P_{probe}$.

In addition, the preceding four steps 1E3-1E6 are repeated for a plurality of waiting times and a plurality of times for each of these waiting times so as to determine the probability of measuring the first charge state as a function of the waiting time and thus determine the tunnelling rate T associated with the third operating point $P_{probe}$.

In other words, for each waiting time, a statistic of the charge state measured will be built up so that the probability of measuring the first charge state after the waiting time considered can be determined. And then, this operation is repeated for a plurality of waiting times so that the probability of measuring the first charge state can be determined as a function of the waiting time.

The course of this probability is illustrated in [FIG. 18] where the probability associated with the first charge state is denoted P(EC). In addition, the decrease of this probability allows determination of the tunnelling rate T associated with the potential barrier separating the two subsystems. From this decrease, it is therefore possible to determine the tunnelling rate T associated with the third operating point $P_{probe}$.

When the Isolated Regime Corresponds to the Partially Isolated Regime

For the embodiment where the isolation considered is partial isolation, the path of the operating point upon reinitialisation is illustrated in [FIG. 19]. Furthermore, in this embodiment, the probability measured as a function of waiting time is the probability of measuring the pair of quantum dots in charge state 2.

When the Isolated Regime Corresponds to the Fully Isolated Regime

For the embodiment where the isolation considered is full isolation, the path of the operating point upon reinitialisation is illustrated in [FIG. 20]. Furthermore, in this embodiment, the probability measured as a function of waiting time is the probability of measuring the first quantum dot in charge state 1 (or, stated differently, the pair of quantum dots in charge state (1,1)). Once the value of the parameter $\Gamma$ is known, it is suitable to determine whether this corresponds to an isolated regime for the reference duration or whether it is necessary to examine a new operating point.

Conditionally Determining a New Third Operating Point

For this, the method 100 according to the invention comprises, when the value of the tunnelling rate $\Gamma$ is such that $$\frac{1}{\tau_{op}} \geq \alpha_{RI}\Gamma$$

with $\tau_{op}$ the reference duration and $\alpha_{RI}$ a tolerance coefficient, a step 1E7 of determining a new third operating point $P_{iso}$, steps 1E3-1E6 for determining the tunnelling rate T associated with this new third operating point $P_{probe}$ being again implemented.

Indeed, when the previous relationship is verified, it means that the third operating point $P_{probe}$ cannot be associated with an isolated regime for the reference duration $T_{op}$ considered. In other words, steps 1E3-1E6 for determining the tunnelling rate T may be reiterated a plurality of times until a third operating point $P_{probe}$ associated with an isolated regime is obtained for the reference duration $\tau_{op}$ considered. More generally, all the operating points associated with the same tunnelling rate $\Gamma$ as the operating point thus determined or with a lower tunnelling rate may be considered as operating points associated with the isolated regime.

Conditionally Determining the Isolated Regime of the Third Operating Point

In a complementary manner, the method 100 according to the invention comprises, when the value of the tunnelling rate $\Gamma$ is such that $$\frac{1}{\tau_{op}} < \alpha_{RI}\Gamma,$$

a step 1E8 of selecting the third operating point $P_{probe}$ as the operating point in the isolated regime. Moreover, all the operating points associated with a tunnelling rate $\Gamma$ equal to or lower than that of the third operating point thus selected may also be associated with an isolated regime.

Indeed, when the previous relationship is verified, it means that the third operating point $P_{probe}$ can be associated with an isolated regime for the reference duration $\tau_{op}$ considered.

Results

At the end of the method 100 according to the invention, an operating point associated with an isolated regime for the reference duration $\tau_{op}$ has been determined. Furthermore, from the position of this operating point, it is possible to determine a plurality of other operating points having a tunnelling rate less than or equal to the operating point thus determined and which may therefore also be associated with an isolated regime. As will become apparent in the following, the knowledge of such an operating point can be used to better characterise the different operating regimes of a system SYS according to the invention.

Method for Determining an Operating Point Associated with Charging of Two Charged Particles in the Singlet State

Reminder as Regards Magnetic Properties of a Two-Charged Particle System

Reminders that will be given here deal with notions that are well known to the skilled person in the art and are only introduced here to facilitate understanding of the invention by a non-initiated person.

When two charged particles PC are coupled to each other (this is called an exchange interaction), they form four spin states: a singlet state and three triplet states. An energy representation of these states is given in [FIG. 21]. In the following, S corresponds to the singlet state, T– corresponds to the triplet state with a z-component (denoted $m_z$) equal to –1, T0 corresponds to the triplet state with a zero z-component and T+ corresponds to the triplet state with a z-component equal to +1 (this is the notation generally used in the art). The difference in energy noted $\Delta E$ which separates the triplet states from the singlet state is much greater than the operating temperature of a system SYS according to the invention and this energy cannot therefore be supplied by thermal agitation. Because of this difference, there are operating points Pi for which charging of two charged particles PC can only take place with the proviso that the charged particles PC adopt a singlet state S in the pair CP of quantum dots QD.

In order to determine the operating points for charging two charged particles PC in the singlet state S, a second aspect of the invention illustrated in [FIG. 22] relates to a method 200 for determining at least one operating point (in general, a plurality of such operating points are determined) associated with charging of two charged particles PC in the singlet state in a pair CP of quantum dots QD of a system according to the invention from an operating point, known as the reading operating point $P_{iso}$, associated with the partially isolated regime with respect to a reference duration greater than or equal to the duration required to modify the operating point, to the measurement of the signal of the measurement means and to waiting (these steps will be described in the following). This operating point is intended to be used for reading the charge state of the pair CP of quantum dots QD.

Determining the Reading Operating Point

In one embodiment, the reading operating point $P_{iso}$ is already known and has been determined by a method according to the invention or any other method. It is therefore not necessary to determine it.

On the other hand, when the latter is not known, the method 200 comprises a step of determining an operating point in a partially isolated regime $P_{iso}$ in which, for the reference duration, no exchange of charged particles PC is possible between the pair CP of quantum dots QD and the reservoir RE of charged particles PC. This operating point $P_{iso}$ will be referred to in the following description of the method 200 as the reading operating point.

In one embodiment, the reading operating point $P_{iso}$ is determined using a method 100 according to a first aspect of the invention in which the pair CP of quantum dots QD or a quantum dot QD1 of the pair CP of quantum dots QD is the first subsystem and in which the reservoir RE of charged particles PC is the second subsystem, the first charge state corresponds to the presence of two charged particles PC in the pair CP of quantum dots QD or in the quantum dot QD1 of the pair CP of quantum dots QD, the operating point $P_{iso}$ thus determined being designated as the charge state reading operating point.

Of course, this is only a particular embodiment and any method for identifying a reading operating point $P_{iso}$ in the partially isolated regime can be used.

The method 200 then comprises, starting from the reading operating point $P_{iso}$ thus determined and for a plurality of operating points, known as charging operating points $P_{load}$, associated with a charge state of two charged particles PC, the following steps 2E1-2E4.

The method 200 according to the invention comprises a step 2E1 of modifying the operating point of the pair CP of quantum dots QD so as to adopt the charging operating point $P_{load}$ considered, the modification being made along a first path, called the charging path T1.

This step of modifying the operating point 2E1 is followed by a step 2E2 of waiting at the charging operating point $P_{load}$ for a predetermined duration. In one embodiment, the predetermined duration is chosen to be large (e.g. ten times larger or even one hundred times larger) compared to the speed required to travel the charging path and the reading path.

Then, the method 200 comprises a step 2E3 of modifying the operating point of the pair CP of quantum dots QD so as to adopt the reading operating point $P_{iso}$, the modification being made in a second path T1' which is the reverse of the charging path T1, called the reading path. By reverse path, it is meant that the second path corresponds to the first path for which the time's arrow is reversed.

This step is itself followed by a step 2E4 of determining the charge state of the pair of quantum dots or the quantum dot of the pair of quantum dots QD, determining the charge state taking place at the reading operating point $P_{iso}$.

Operating Points Associated with Charging Two Charged Particles in the Singlet State The charging operating point $P_{load}$ is associated with charging of a singlet state S if the charge state determined is zero. Otherwise, it is associated with charging of a triplet state (T–, T0 or T+). Indeed, if the charging operating point $P_{load}$ corresponds to charging of two particles in the triplet spin state, their charging is necessarily non-adiabatically made (with respect to the tunnel coupling between the reservoir of charged particles PC and the pair CP of quantum dots QD1). Therefore, the tunnel time from the reservoir RE of charged particles PC to the pair CP of charged particles QD is long (in other words the tunnel coupling between the pair CP of charged particles QD and the reservoir RE of charged particles PC is weak) compared to the travel time T1. The waiting time at $P_{load}$ ensures that the charged particles PC are charged regardless of their spin state. On the other hand, if the charging operating point $P_{load}$ corresponds to charging of two charged particles in the triplet spin state, then the charged particles PC will not be exchanged with the reservoir RE of charged particles PC during the reverse path T1' (they will be if $P_{load}$ corresponds to charging of two charged particles PC in the singlet spin state). Hence, reading the charge state zero (0) in the pair CP of quantum dots QD after the sequence indicates that the charging operating point $P_{load}$ corresponds to charging of two charged particles in the singlet spin state, and reading a charge state of one (1) or two (2) indicates that the charging operating point $P_{load}$ corresponds to charging of two charged particles in the triplet spin state.

Also, by means of the steps previously described, it is possible to determine the charging operating points of the plurality of charging operating points associated with charging of two charged particles in the singlet state S. Furthermore, the reference duration associated with the operating point in the partially isolated regime is greater than or equal to the time required to modify the operating point, measure the signal of the measurement means and wait.

Defining the Charging T1 and Reading T1' Paths

In one embodiment illustrated in [FIG. 23], travelling the path T1 comprises, starting from the reading operating point $P_{iso}$, a sub-step of modifying the operating point so as to obtain a second operating point not associated with a partially isolated regime and associated with the same charge state as the reading operating point $P_{iso}$. This path also comprises, starting from the second operating point, a sub-step of modifying the operating point so as to obtain the charging operating point $P_{load}$ considered.

In the same embodiment, travelling the path T1' comprises, starting from the charging operating point $P_{load}$ considered, a sub-step of modifying the operating point so as to obtain the third operating point and then, starting from the third operating point, a sub-step of modifying the operating point so as to return to the reading operating point $P_{iso}$.

Thus, the path T1' in [FIG. 23] corresponds to the path T1 travelled in the reverse direction. In other words, the path T1' corresponds to the path T1 travelled from the charging operating point $P_{load}$ by reversing the time's arrow.

Results

At the end of the method 200 according to a second aspect of the invention, at least one operating point, preferably a plurality of operating points, associated with charging of two charged particles PC in a singlet state is known (it will be shown in the following that this position can be further refined).

Method for Determining a Set of Parameters of a Charge State Reading Means

As shown in the previous paragraphs and confirmed in the following paragraphs, charge state measurement is an important aspect in the implementation of quantum dots for quantum computing applications. It may therefore be of interest to optimise parameters of the charge state measurement means.

However, in the current state of the art, such optimisation is hardly contemplatable. Indeed, the position of the reading operating point is often related to the operating point whose charge state is sought to be characterised. It is therefore necessary to characterise each of the reading operating points, which is impossible in practice (the time required being too great). In this respect, it is useful to remember that the time associated with reading the charge state is often longer than the time associated with the other procedures (modifications to the operating point, spin/charge conversion, etc.).

However, by using an isolation regime for which the charge state is virtually guaranteed not to change, it is possible to use the same reading operating point regardless of the operating point whose charge state is sought to be characterised. It then becomes possible to optimise the reading parameters for the reading operating point chosen (and associated with an isolated regime). For example, the measurement parameter(s) can be chosen from the gate voltage of an electrometer used for the measurement, the integration time of the signal measured, the signal amplification, the signal filtering (filtering type, cut-off frequencies, etc.).

Thus, the isolated regime according to the invention also makes it possible to optimise operating parameters of the reading means CS for determining the charge state of the first subsystem or the second subsystem.

For this, a third aspect of the invention illustrated in [FIG. 24] relates to a method 300 for determining a set of parameters of a means for measuring CS the charge state of a system SYS comprising a first subsystem CP,QD1 and a second subsystem RE,QD2, wherein the first subsystem CP,QD1 and the second subsystem RE,QD2 may contain zero, one or more charged particles PC, a tunnel coupling existing between the first subsystem CP,QD1 and the second subsystem RE,QD2, said tunnel coupling allowing exchange of one or more charged particles PC between the first subsystem CP,QD1 and the second subsystem RE,QD2 and being modulated by a gate voltage applied to one or more gates configured to form a potential barrier between the first subsystem CP,QD1 and the second subsystem RE,QD2 an operating point of the system SYS being determined by the value assumed by each gate voltage, the measurement means CS being configured to measure a signal being a function of the charge state of the first subsystem CP/QD1, the signal measured by the charge state measurement means being dependent on a plurality of measurement parameters.

Determining the Reading Operating Point

In order to implement this method, it is necessary to have a reading operating point $P_{iso}$ associated with an isolated regime for which passage of a charged particle PC from the first subsystem CP,QD1 to the second subsystem RE,QD2 and vice versa is forbidden for a reference duration.

In one embodiment, the reading operating point $P_{iso}$ is already known and has been determined by a method 100 according to the invention or any other method. It is therefore not necessary to determine it. This is especially the case when, for example, the operating points associated with charging a singlet state have been determined.

On the other hand, when the latter is not known, the method 300 according to the invention firstly comprises a step 3E1 of determining the reading operating point $P_{iso}$, said reading operating point $P_{iso}$ being determined using a method 100 according to a first aspect of the invention, the reference duration being greater than or equal to the duration required to determine the charge state. The reading operating point $P_{iso}$ thus selected is that for which optimisation of the parameters of the charge state measurement means CS will be made.

Once the reading operating point $P_{iso}$ is known, the method 300 comprises, starting from this reading operating point $P_{iso}$ and for a plurality of sets of measurement parameters, the following steps.

Measuring the Signal Associated with a First Charge State

The method 300 comprises a step 3E2 of charging the first subsystem CP/QD1 in a first charge state followed by a step 3E3 of measuring the signal of the charge state measurement means associated with this first charge state.

At the end of these two steps 3E2, 3E3, the signal of the charge state measurement means CS corresponding to the first charge state for the set of parameters considered is known.

Measuring the Signal Associated with a Second Charge State Different from the First Charge State The method 300 then comprises a step 3E4 of charging the first subsystem CP/QD1 in a second charge state different from the first charge state followed by a step 3E5 of measuring the signal of the measurement means CS of the charge state associated with this second charge state.

At the end of these two steps 3E4, 3E5, the signal of the measurement means CS of the charge state corresponding to the first charge state for the set of parameters considered is known.

Determining the Difference Between the Two Signals Measured

Once a signal has been measured for each charge state, it is possible to measure the difference between these two signals. For this, the method 300 comprises a step 3E6 of subtracting the signal of the measurement means SC associated with the first charge state from the signal of the measurement means SC associated with the second charge state so as to obtain the difference between the two signals for the set of parameters considered.

Figure 25A:
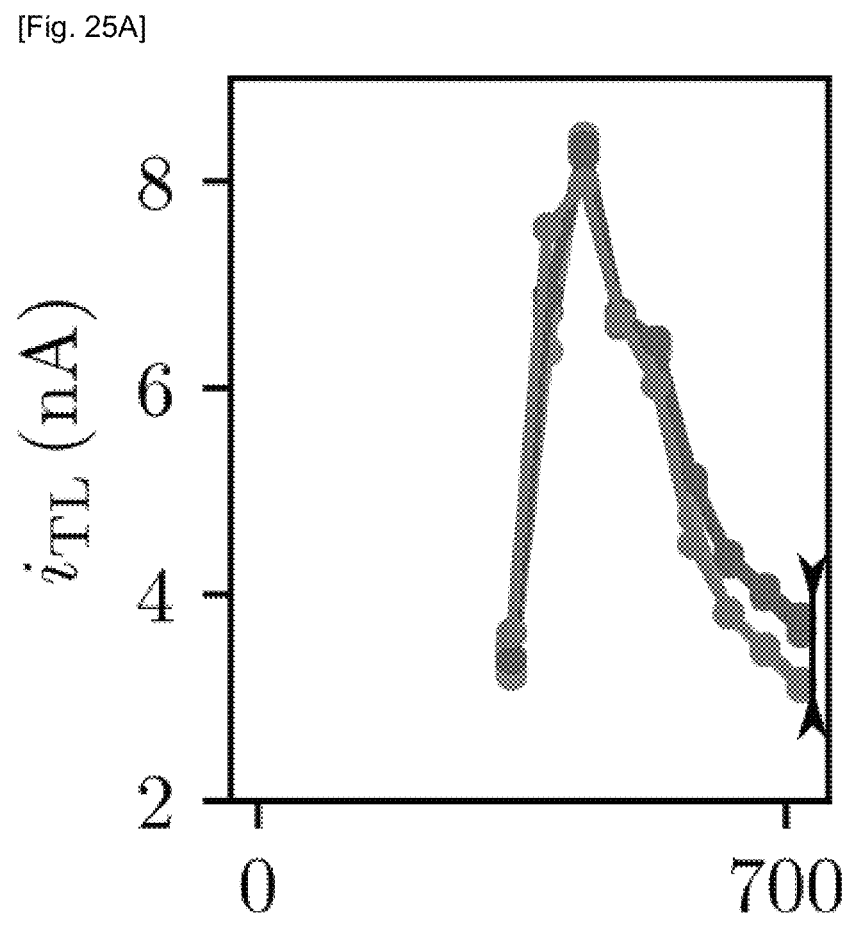

FIG. 25A shows several curves measured for the first and second charge state as a function of at least one parameter. The maximum difference is highlighted by the two black arrows on either side of the curve. [FIG. 25B] shows the statistics obtained for the first charge state (here (1,1)) and the second charge state (here (2,2)) for a given set of parameters. The difference obtained (here in current) for this set of parameters from the statistic is schematically highlighted by the black arrow in the upper part of the graph.

Selecting the Optimal Set of Parameters

In the method 300 according to the invention, the preceding steps 3E2-3E6 are repeated for a plurality of set of parameters of the measurement means SC. In this way, it is possible to determine the optimal set of parameters, that is the set of parameters that allows the highest difference between the two measured signals to be obtained. For this, the method then comprises a step 3E7 of selecting the set of parameters for obtaining the highest difference.

In one embodiment the set of parameters comprises the reading operating point $P_{iso}$ and these steps are repeated for a plurality of reading operating points $P_{iso}$, with the reading operating point $P_{iso}$ for obtaining the highest difference being retained in the selected set of parameters.

Partially Isolated Regime

In one embodiment, the system SYS comprises a pair CP of quantum dots QD or a quantum dot QD1 of the pair CP of quantum dots QD corresponding to the first system and a reservoir RE of charged particles PC corresponding to the second subsystem. In this embodiment, the isolated regime associated with the reading operating point $P_{iso}$ is the partially isolated regime.

Fully Isolated Regime

In one embodiment, the system SYS comprises a pair CP of quantum dots QD comprising a first quantum dot QD1 and a second quantum dot QD2 as well as a fixed number of charged particles PC, the first quantum dot QD1 corresponding to the first subsystem and the second quantum dot QD2 corresponding to the second subsystem. In this embodiment, the isolated regime associated with the reading operating point $P_{iso}$ is the fully isolated regime.

Method for Determining an Optimal Spin/Charge Conversion Operating Point

In order to access the spin state of the charged particles PC within a system SYS according to the invention, it is known to resort to a spin/charge conversion step. This conversion is generally done by means of an operating point, referred to in the following as the conversion operating point.

However, as already mentioned in the case of the reading operating point, in the state of the art, the position of the reading operating point is often related to the spin/charge conversion operating point. It is therefore impossible in practice to characterise each of the conversion operating points.

On the other hand, by using a full isolation regime for which the charge state is virtually guaranteed not to change over the reference duration considered, it is possible to use the same reading operating point regardless of the spin/charge conversion operating point considered. It then becomes possible to optimise this spin/charge conversion operating point, for example by determining the spin/charge conversion operating point for optimising the difference in the measured signal for two different spin states.

To this end, a fourth aspect of the invention illustrated in [FIG. 26] relates to a method 400 for determining an optimal spin/charge conversion operating point. However, before detailing the method 400 in question, it is suitable to clarify the notion of eigenbases in the context of the system SYS according to the invention. As a reminder, this notion is well known to the person skilled in the art.

Eigenbases of the Spin States of Two Charged Particles

When it is sought to characterise the spin state of a system, it is necessary to resort to a basis that it is possible to be choose arbitrarily. However, for a given operating point, among the infinite number of possible bases, it is possible to identify a particular base, called the eigenbasis. The notions of eigenvectors and eigenbasis are well known to those skilled in the art and will therefore not be detailed here.

In the system SYS according to the invention, it is possible to identify two eigenbases depending on the operating regime and the charge state of the pair CP of quantum dots QD. When the system SYS is in the fully isolated regime and each quantum dot contains one charged particle (that is each charged particle is in a quantum dot and the quantum dots are not coupled), the eigenbasis for describing the spin state of two charged particles is the basis (u,d), (d,u), (u,u) and (d,d), where "d" stands for "spin down" and "u" for "spin up". When both charged particles PC are in the same quantum dot QD1,QD2 or the system SYS is in the partially isolated regime (stated differently each charged particle PC is in a quantum dot QD1,QD2 and the quantum dots QD1,QD2 are strongly coupled), the eigenbasis for describing the spin state of two charged particles PC is the basis S, T−, T0, T+ already introduced.

Initialising the Spin State to the Singlet State

The method 400 according to the invention comprises a step 4E1 of initialising the system into the singlet spin state S using an operating point associated with charging of a singlet state in the pair CP of quantum dots QD, the operating point at the end of the initialisation being associated with a first charge state.

In one embodiment, the operating point associated with charging of two charged particles PC in a singlet state S is known and may have been determined using a method 200 according to the invention or any other method.

An exemplary embodiment of this initialisation step is illustrated in [FIG. 27]. In this example, the first charge state is the charge state (1,1). However, at the end of the singlet state charging, the system is in a second charge state different from the first charge state, in this case charge state (2,0). The path illustrated in [FIG. 27] therefore aims to pass from a singlet spin state and a charge state (2,0) to a singlet spin state and a charge state (1,1).

In this exemplary embodiment, the initialisation comprises a sub-step of increasing, from a first operating point $P_{iso}$ corresponding to the fully isolated regime and to the charge state (2,0), the parameter $\Gamma_{QD}$ relating to the potential barrier separating both quantum dots QD1, QD2 so as to bring the system into a second operating point P01 corresponding to the same charge state, but in which both quantum dots QD1, QD2 of the pair CP of quantum dots QD1, QD2 are coupled. This sub-step is followed by a sub-step of modifying, from the second operating point P01, the parameter ε relating to the potential difference between both quantum dots QD1, QD2 so as to bring the system into a third operating point P02 corresponding to the charge state (1,1), the change of charge state taking place adiabatically (with respect to the tunnel coupling between the first quantum dot QD1 and the second quantum dot QD2 at the second operating point P01) when moving from the second operating point P01 to the third operating point P02 in such a way as to maintain the singlet state.

In one embodiment, the method 400 comprises, prior to the initialisation step 4E1, a step of determining the operating point associated with charging of two charged particles in a singlet state, for example using a method 200 according to the invention (but any other method may be used).

Converting the Singlet State and Measuring the Charge State

The method then comprises a step 4E2 of spin/charge converting the charge state of the system using a conversion operating point P21 followed by a step 4E3 of measuring the signal measured by the charge state detection means for the charge state thus converted.

Continuing with the same exemplary embodiment, the spin/charge conversion step is illustrated in [FIG. 28]. In this example, the spin/charge conversion comprises a sub-step of modifying, from the third operating point P02, the parameter $\Gamma_{QD}$ so as to reach a fourth operating point P20 having a value of the parameter $\Gamma_{QD}$ equal to the value of the parameter $\Gamma_{QD}$ of the conversion operating point P21, the modification being non-adiabatically made in comparison with the parameter $\Gamma_{QD}$. It then comprises a sub-step of modifying, from the fourth operating point P20, the parameter ε so as to reach the conversion operating point P21, the modification of the parameter ε being adiabatically made in comparison with the parameter $\Gamma_{QD}$. It is during this second sub-step that the charge state will be modified if the charged particles are in the first spin state (here the singlet state) and will remain unchanged if the charged particles PC are in the second spin state (here a triplet spin state). In one particular exemplary embodiment, the conversion also comprises a waiting sub-step at the conversion operating point.

Still according to the same exemplary embodiment, the measurement step is illustrated in [FIG. 29]. More particularly, the measurement of the charge state comprises a sub-step of modifying, from the conversion operating point P21, the parameter $\Gamma_{QD}$ so as to reach a sixth operating point P22 having a value of the parameter $\Gamma_{QD}$ equal to the parameter value $\Gamma_{QD}$ of the first operating point P00. In other words, the movement is along the charge degeneracy lines. This also means that if the conversion operating point P21 is indeed in a Pauli blocking region, then this displacement takes place in this same region up to the region corresponding to the full isolation regime, which ensures that the charge state measured subsequently is representative of the charge state (and therefore the spin state) as it was at the conversion operating point.

Measuring the charge state also includes a sub-step of modifying, from the sixth operating point P21, the parameter ε so as to reach the first reading operating point $P_{iso}$ (and thus a value of the parameter ε equal to the value of the parameter ε of the first operating point). Finally, it includes a sub-step of measuring the signal associated with the charge state of the pair CP of quantum dots QD.

Thus, the conversion step converts the singlet spin state into a charge state and the measurement step makes it possible to determine the signal associated with the charge state and thus with the singlet spin state S. The signal measured can thus be used as a reference in evaluating the conversion operating point considered.

Initialising the Spin in a Statistical Mixture

The method then includes a step 4E4 of initialising the system in a spin state that can assume either the singlet state or the triplet state with a set probability, the so-called mixed spin state, using an operating point associated with charging a singlet state in a pair CP of quantum dots QD. For example, the probability of being in the singlet state is equal to the probability of being in the triplet state (and equal to 50%). Of course, other probability distributions are possible. A method for obtaining such a statistical mixture will be set forth in the following, but other methods known to the person skilled in the art can be used to obtain such a mixed spin state.

The essential difference with the previous initialisation state consists in obtaining a statistical mixture of a singlet spin state S and a triplet spin state. This statistical mixture can for example be obtained by randomising the spin state.

In the scope of the same example as previously, as illustrated in [FIG. 30], this randomisation is performed from the third operating point P02. The latter is located outside the isolated regime and the eigenbasis for describing the spin state of the charged particles PC consists of the vectors S, T−, T0 and T+ introduced previously. Moreover, at this operating point P02, the spin state of the charged particles PC is known and equal to the singlet state S.

In one exemplary embodiment, when the singlet spin state S and the triplet spin state T0 are concerned, the initialisation comprises, from this third operating point, a step of modifying the parameter $\Gamma_{QD}$ so as to reach a randomisation operating point P10 associated with the same charge state as the third operating point and associated with the fully isolated regime (greyed zone in [FIG. 30]), this modification being made non-adiabatically (with respect to the energy gap at the anti-crossing of the singlet spin state S and the triplet spin state T0). The operating point thus obtained being in the fully isolated regime, the eigenbasis for describing the spin state of the charged particles becomes the basis (u,u), (d,u), (u,d) and (d,d). This non-adiabatic transition from a first eigenbase to a second eigenbase will introduce an oscillation of the spin state between the singlet state S and the triplet state T0, this oscillation having a so-called Rabi oscillation frequency noted $f_{Rabi}$. For a given system, this frequency is not known with precision, but it is possible to provide a minimum value noted $f_{Rabi}{}^{min}$ and a maximum value noted $f_{Rabi}{}^{max}$.

As previously mentioned, this is only an example for the singlet spin state S and the triplet spin state T0, but can be adapted without difficulty to the singlet spin state S and the triplet spin state T+ pair or to the singlet spin state S and the triplet spin state T+ pair. For the record, the Rabi frequency associated with the ST+ pair depends on the transverse magnetic field gradient, while the Rabi frequency associated with the ST0 pair depends on the longitudinal magnetic field gradient.

Still in the same example, in order to obtain a statistical mixing of the singlet S and triplet T0 states over a large number of iterations of the initialisation step, in this exemplary embodiment, the latter comprises a sub-step of waiting at the randomisation operating point P10 for a randomly chosen duration in the interval $$\left[ \frac{1}{f_{Rabi}^{max}}, \frac{1}{f_{Rabi}^{min}} \right].$$

At the end of this waiting time, a sub-step of modifying the parameter $\Gamma_{QD}$ is implemented so as to reach the fourth operating point. As previously mentioned, the two preceding paragraphs only illustrate the example relating to the singlet S and triplet T0 spin states, but this example, it can be adapted without difficulty to the pair of singlet S spin state and triplet T+ spin state or to the pair of singlet S spin state and triplet T+ spin state.

Converting the Mixed State and Measuring the Charge State

The method 400 then includes a step 4E5 of converting the spin/charge state of the system using the conversion operating point P21 so as to obtain a mixed charge state followed by a step 4E6 of measuring the signal measured by the charge state detection means for the mixed charge state thus converted. The conversion step thus converts the mixed spin state into a mixed charge state and the measurement step makes it possible to determine the signal associated with the mixed charge state and thus with the mixed spin state. Of course, the notion of mixed state only appears statistically and results from a large number of measurements in which both charged particles PC are either in the singlet state or in the triplet state, this distribution being made according to the known probability law previously discussed.

In the same example, the conversion and measurement sub-steps are identical to those implemented within the scope of adiabatic charging.

Determining the Difference

The method 400 then includes a step 4E7 of determining the difference between the measured signal for the charge state associated with the singlet spin state and the measured signal for the charge state associated with the mixed spin state. In other words, during this step, the difference between a singlet state and a mixed state is determined, this difference indirectly measuring the difference between the signal measured for a singlet state and the signal measured for a triplet state.

Measuring in the Fully Isolated State

As previously indicated, in the method 400 according to the invention, the two measurement steps 4E3, 4E6 are carried out at an operating point associated with the fully isolated regime $P_{iso}$ in which, for the reference duration, no exchange of charged particles PC is possible between the first quantum dot QD1 and the second quantum dot QD2. Moreover, the reference duration is chosen to be greater than or equal to the time required to implement the measurement step (4E3, 4E6).

In one embodiment, the reading operating point $P_{iso}$ is already known and has been determined by a method 100 according to the invention or any other method.

On the other hand, when the latter is not known, the method 400 according to the invention comprises first of all a step of determining an operating point corresponding to an isolated regime of the system SYS, known as the reading operating point $P_{iso}$, said reading operating point $P_{iso}$ being determined using a method 100 according to a first aspect of the invention for the reference duration considered.

Making a Statistic for Several Conversion Operating Points and Determining the Optimal Conversion Operating Point Furthermore, in the method 400 according to the invention, the preceding steps 4E1-4E7 are repeated a plurality of times for each plurality of operating points so as to establish a difference between the signal associated with the singlet state and the signal associated with the mixed state, the conversion operating point P21 allowing the highest difference to be obtained being considered as the optimal conversion point P21. It is this statistic that makes it possible to obtain a mixed spin state (singlet S and T0) to be compared with a singlet spin state in order to determine the conversion operating point P21 for obtaining the highest difference.

Method for Determining an Operating Point Associated with the Optimal Charging of a Singlet State in a Pair of Quantum Dots Once an optimal spin/charge conversion operating point has been determined, it may be advantageous to use this to refine the position of the operating points associated with charging of two charged particles PC in a singlet spin state into the pair CP of quantum dots QD.

For this, a fifth aspect of the invention illustrated in [FIG. 31] relates to a method 500 for determining an operating point associated with optimal charging of two charged particles PC in a singlet state in a pair of quantum dots from a reading operating point $P_{iso}$ associated with a partially isolated regime in which, for a first reference duration, no exchange of charged particles PC is possible between the pair CP of quantum dots QD and the reservoir RE of charged particles PC.

Determining a Plurality of Operating Points Associated with Charging a Singlet State As the method 500 aims to optimise the previously determined singlet state charging operating points, it comprises a step 5E1 of determining a plurality of operating points associated with charging of a singlet state S in the pair CP of quantum dots QD, for example using a method 200 according to a second aspect of the invention (but any other method may be used).

Adiabatic Charging

The method 500 then comprises, for each singlet state charging operating point thus determined, a step 5E2 of adiabatically charging the pair of quantum dots using the operating point considered. This adiabatic charging step 5E2 is carried out in the same way as the adiabatic charging previously described and illustrated in [FIG. 19].

Spin/Charge Conversion

The method then includes a step 5E3 of spin/charge converting the spin state of the charged particles PC in the pair CP of quantum dots QD using a spin/charge conversion operating point.

The spin/charge conversion operating point can be known in advance.

When this spin/charge conversion operating point is not known, the method 500 comprises a step of determining a spin/charge conversion operating point using a method 400 according to a third aspect of the invention. Of course, this is only a particular embodiment and this spin/charge conversion operating point could also be determined by other methods.

Determining the Charge State

The method 500 then includes a step 5E4 of determining the charge state of the pair CP of quantum dots QD. Since this step 5E4 has been preceded by a spin/charge conversion, this determination of the charge state allows access to the spin state of the charged particles. Moreover, this determination of the charge state is done in a fully isolated regime in which, for a second reference duration, no exchange of charged particles PC is possible between the quantum dots QD1, QD2 of the pair CP of quantum dots QD.

Making a Statistic

In order to make, for each operating point, a statistic of the spin state measured, the previous three steps 5E2-5E4 are repeated a plurality of times for each charging operating point. Furthermore, the first reference duration is greater than or equal to the time required to implement the spin/charge conversion step and the charge state determination step, and the second reference duration is greater than or equal to the time required to determine the charge state of the pair CP of quantum dots QD. In addition, the operating points for obtaining a probability of charging a singlet state greater than a threshold probability are considered as the optimal charging operating point of two charged particles PC in a singlet state. In one exemplary embodiment, the operating points retained are the operating points for which the probability of charging a singlet spin state S is greater than or equal to 0.9, preferably 0.99, or even 0.9999.

Results

The method according to a fifth aspect of the invention allows the position of the operating points associated with charging of a singlet spin state to be refined.

Method for Determining the Oscillation Period Between a First Spin State and a Second Spin State As has just been shown, under some conditions it is possible to induce a coherent rotation between a first spin state and a second spin state of two charged particles. The determination of the frequency of such a rotation allows to determine parameters of the system SYS such as the gradient dBz or the gradient dBx. It is therefore interesting to induce such a rotation and then to characterise the parameters related thereto. For this, a fifth aspect of the invention illustrated in [FIG. 32] relates to a method 600 for determining the oscillation period between a first spin state and a second spin state of two charged particles PC contained in the pair CP of quantum dots QD.

Step of Initialising the System

The method 600 comprises a step 6E1 of initialising the system SYS to a first operating point for which the first basis is an eigenbasis of the spin states of both charged particles PC.

Characterising the S-T0 or S-T+ Oscillations

In a first embodiment, the first spin state is the singlet state and the second spin state is the triplet state T0. In a second embodiment, the first spin state is the singlet state and the second spin state is the triplet state T+.

In one exemplary embodiment, for both of these embodiments, the initialisation step 6E1 is identical to that set forth in the scope of the method 400 for determining an optimal spin/charge conversion operating point illustrated in [FIG. 27]. At the end of this step, the system is in the singlet spin state S and in the charge state (1,1).

Step of Non-Adiabatically Modifying the Operating Point

The method 600 then comprises, starting from the first operating point, a step 6E2 of modifying the operating point so as to reach a second operating point for which the second basis is an eigenbasis of spin states. Due to the change in eigenbasis in this non-adiabatic transition (relative to the energy gap at the anti-crossing between the singlet spin state and the triplet spin state T0 at the second operating point), rotating the spin state between the first spin state and the second spin state occurs.

Characterising the S-T0 Oscillations

When the oscillations to be characterised are the S-T0 oscillations, as already set forth in the scope of the method 400 for determining a spin/charge conversion operating point, this step 6E2 may be implemented by modifying the operating point non-adiabatically (with respect to the energy gap at the anti-crossing between the singlet spin state and the triplet spin state T0 at the second operating point) so as to obtain a second operating point in the isolated regime. Such a modification is illustrated in [FIG. 31].

Characterising the S-T+ Oscillations

When the oscillations to be characterised are S-T+ oscillations, this step 6E2 can be implemented by changing the operating point non-adiabatically (with respect to the energy gap at the anti-crossing between the singlet spin state S and the triplet spin state T+) so as to obtain a second operating point located at a zone called S-T+ anti-crossing well known to the skilled person.

Coherent Rotation for a Predetermined Time

The method 600 then comprises a step 6E3 of waiting for a predetermined time at the second operating point for which rotation between the first spin state and the second spin state continues in a coherent manner.

Spin/Charge Conversion

The method 600 then comprises a step 6E4 of spin/charge converting the spin state of both charged particles PC, the conversion being performed using a conversion operating point and for associating the first spin state with a first charge state and the second spin state to be associated with a second charge state different from the first charge state. It will be noted that the same conversion operating point can be used for both S-T0 and S-T+ oscillations.

In one embodiment, this conversion operating point is determined using a method 400 according to the invention. Of course, other methods may be used to determine this conversion operating point.

Characterising the S-T0 or S-T+ Oscillations

The conversion is identically made for characterising both the S-T0 and S-T+ oscillations. It comprises a sub-step of modifying, from the second operating point P10, the parameter $\Gamma_{QD}$ so as to reach a fourth operating point P20 having a value of the parameter $\Gamma_{QD}$ equal to the value of the parameter $\Gamma_{QD}$ of the conversion operating point P21, the modification being made in a non-adiabatic manner (with respect to the energy gap at the anti-crossing between the singlet spin state S and the triplet spin state T0 or the triplet spin state T+). It then comprises a sub-step of modifying, from the fourth operating point P20, the parameter ε so as to reach the conversion operating point P21, modifying the parameter ε being adiabatically made in comparison with the parameter $\Gamma_{QD}$.

Determining the Charge State

The method 600 also includes a step 6E5 of determining the charge state of the pair of quantum dots, determining being made at a reading operating point associated with a fully isolated regime in which no exchange of charged particles PC is possible between the first quantum dot QD1 and the second quantum dot QD2 of the pair CP of quantum dots QD.

Characterising the S-T0 or S-T+ Oscillations

Whether the S-T0 or S-T+ oscillation is to be characterised, determining the charge state is done in the same way as illustrated in [FIG. 29].

Making a Statistic for Several Waiting Times

In the method 600 according to the invention, the preceding five steps 6E1-6E5 are repeated for a plurality of waiting times and a plurality of times for each waiting time so as to determine the time course of the first spin state or the second spin state.

Determining the Position of the S-T+ Anti-Crossing

As previously mentioned, in order to determine the S-T+ oscillation frequency, it is necessary to know the position of the operating points of the system that can be associated with S-T+ anti-crossing. Determining these operating points is known to those skilled in the art, but a method for determining this position will now be described by way of illustration.

The sequence used is identical to that implemented when determining an optimal conversion operating point. In this determination, the sequence shown in [FIG. 33] is implemented so as to obtain a mixed spin state, that is a state for which at least two different spin states have a non-zero probability of being measured. For any operating point P10, it is therefore possible to determine the probability of measuring a singlet state (using a spin/charge conversion followed by a charge state measurement as detailed earlier). By measuring this probability (denoted P(S)) for a plurality of operating points P10 located on an axis dl, the curve illustrated in [FIG. 34] is obtained. In this curve, it is possible to identify a first zone for which the probability of measuring a singlet spin state is approximately ½ (noted S+T0) and a second zone in which the probability of measuring a singlet spin state is approximately 1 (noted S). In addition, in this second zone, a narrow peak appears for which the probability of measuring a singlet state drops to ½ (denoted S-T+). The position of the S-T+ anti-crossing is given by the position of this peak.

It will also be noted that if this operation is carried out for a plurality of static magnetic fields, then it is possible to deduce, from the course of the position of the peak associated with the S-T+ anti-crossing, the conversion factor between the voltage applied to the gates and the energy associated with the tunnel barrier $\Gamma_{QD}$. It will also be detailed in the following how it is possible to access the conversion factor between the voltage applied to the gates and the energy gap of the ground level E.

Of course, this is only an example so that other methods can be used to determine the operating points associated with this S-T+ anti-crossing.

Results

At the end of the method according to a sixth aspect of the invention, the Rabi frequency associated with the oscillation between the first spin state and the second spin state is known.

Method for Characterising the Exchange Interaction Between Two Charged Particles The purpose of a system SYS according to the invention is to implement quantum gates in order to perform one or more quantum operations. Also, it may be advantageous to identify operating points for making a quantum gate with one or two qubits, that is involving one or two charged particles PC. In other words, it is useful to characterise the exchange interaction between two charged particles in order to control the value thereof.

For this, a sixth aspect of the invention illustrated in [FIG. 35] related to a method 700 for characterising the exchange interaction between two charged particles in a pair CP of quantum dots QD of a system SYS according to the invention, each quantum dot QD1, QD2 containing a charged particle PC. In other words, the exchange interaction between two charged particles PC in the pair CP of quantum dots QD is herein characterised when the charge state of the pair CP of quantum dots QD is (1,1). The method 700 comprises, for a plurality of operating points to be characterised, the following steps.

Initialising the System

The method first comprises a step 7E1 of initialising the system in an initial operating point P10 associated with a charge state (1,1), a fully isolated regime and for which the spin state is the spin state (u,d).

This initialisation may include a substep of charging two charged particles PC into the singlet state S. Such charging may, for example, be done using a charging operating point determined by a method 200 according to the invention. However, any method for charging two charged particles PC into the singlet state S may be used.

In one exemplary embodiment illustrated in [FIG. 36], the system SYS is charged in a singlet spin state S and a charge state (2,0) in a reading operating point $P_{iso}$ associated with the fully isolated regime. Such an operating point may, for example, be determined using a method 100 according to the invention. Of course, other methods may also be used to determine the position of this operating point. The operating point is then changed in the same way as the sequence in [FIG. 27] already described to reach a third operating point P02 via a second operating point P01, this modification being made adiabatically (with respect to the tunnel coupling between both quantum dots QD at the third operating point).

From the third operating point P02, the initialisation comprises a sub-step of non-adiabatically modifying (with respect to the lowest energy gap between the spin state S and the spin state T+, obtained at the crossing of the two levels) the parameter $\Gamma_{QD}$ so as to pass through the S-T+ crossing zone and reach an operating point P03. The initialisation then comprises a sub-step of adiabatically modifying (with respect to the lowest energy gap between the spin state S and the spin state T0, obtained at the crossing of both levels) the parameter $\Gamma_{QD}$ so as to reach the initial operating point P10 associated with the same charge state as the third operating point and associated with the fully isolated regime, this modification being adiabatically made (there is therefore no rotating of the spin states as in the case of the randomisation of the spin states). This first sub-step makes it possible to pass from the spin state T+ to a "ud product" spin state. More particularly, the first sub-step consists in passing from an operating point for which the spin state is the singlet spin state S and is in the ground state to an operating point for which the spin state remains the singlet spin state S, but for which the ground state is the triplet spin state T+ (after passing the ST+ crossing). In addition, the second sub-step consists in converting the singlet spin state S into the "ud product" with adiabatically modifying the operating point.

Non-Adiabatically Modifying the Operating Point

As illustrated in [FIG. 37], the method 700 comprises, starting from the initial operating point P10, a step 7E1 of non-adiabatically modifying (with respect to the energy gap at the anti-crossing between the singlet spin state S and the triplet spin state T0 or the triplet spin state T+) the operating point so as to obtain an operating point to be characterised. Preferably, the operating point to be characterised is associated with a charge state (1,1) (stated differently a charge state identical to the charge state of the operating point to be characterised). Indeed, the analysis of operating points associated with a charge state (2,0) or (0,2) is generally of little interest for the implementation of a quantum gate.

Waiting at the Operating Point to be Characterised

As illustrated in [FIG. 38], the method then includes a step 7E2 of waiting at the operating point to be characterised for a predetermined duration. This waiting time corresponds to the target duration of the quantum gate for which the exchange interaction is sought to be characterised. This step 7E2 is followed by a step 7E3 of modifying the operating point so as to return to the first operating point, this modification being carried out in a non-adiabatic manner (with respect to the energy gap at the anti-crossing between the singlet spin state S and the triplet spin state T0 or the triplet spin state T+).

Spin/Charge Conversion

As illustrated in [FIG. 39], the method 700 also comprises, from the initial operating point, a spin/charge conversion step 7E4 using a conversion operating point. In the example of [FIG. 39], this conversion comprises a substep of modifying, from the initial operating point P10, the parameter $\Gamma_{QD}$ so as to reach an operating point P20 having a value of the parameter $\Gamma_{QD}$ equal to the value of the parameter $\Gamma_{QD}$ of the conversion operating point P21, the modification being made adiabatically (with respect to the energy gap at the anti-crossing between the singlet spin state S and the triplet spin state T0). During this first sub-step, a basis conversion takes place from the base (u,d) to the base (S,T) and at the operating point P20 obtained, called the basis conversion point, the spin state of both charged particles (PC) is a singlet spin state or a triplet spin state. It then comprises a sub-step of modifying, from the operating point P20, the parameter ε so as to reach the conversion operating point P21, the modification of the parameter ε being made adiabatically in comparison with the parameter $\Gamma_{QD}$ at operating point P20.

In one embodiment, the conversion operating point is a known conversion operating point, for example determined using a method 400 according to the invention or any other method.

In one embodiment, the conversion operating point is an optimal conversion operating point and the method 700 therefore comprises beforehand, a step of determining an optimal conversion operating point using a method 400 according to the invention. Of course, it is also possible to determine such an operating point using other methods.

Determining the Charge State

As illustrated in [FIG. 40], the method 700 also includes a step 7E5 of determining the charge state using the reading operating point $P_{iso}$ in the fully isolated regime. As this step 7E5 has been preceded by a conversion step 7E4, the charge state measurement is used to determine the spin state of the charged particles.

Characterising a Plurality of Operating Points in
Order to Determine an Optimal Zone The preceding steps are repeated a plurality of times for
each operating point to be characterised so as to determine,
for each of them, the probability of measuring the spin state
in a singlet state S and thus characterise the exchange
interaction.

Once this exchange interaction is characterised, it will
then be possible to determine at least one zone, the so-called
optimal zone, in which the operating point for which the
exchange interaction assumes the desired value.

Probability Mapping

The previously discussed probability of measuring a
singlet spin state S can be represented in the stability
diagram as illustrated in [FIG. 41] (in this figure, cross-talks
have not been corrected, which explains tilt of the patterns).
As mentioned in the previous paragraph it is possible, from
this probability, to identify the value of the exchange inter-
action for each operating point to be characterised. In fact,
this value allows the determination of the quantum gate
made at the operating point considered. It is therefore
possible, as mentioned previously, to determine the zone in
which the optimal operating point for a given quantum gate
will be located as a function of the probability of measuring
a spin state in the singlet state S. For example, if it is desired
to implement a one-qubit gate, the chosen operating point
will have to be associated with a high probability of mea-
suring the singlet state, that is be located in the zone Z1.
Conversely, if it is desired to implement a two-qubit gate, the
operating point chosen should be associated with a pi phase,
that is be located in the zone Z2. It is therefore possible to
determine a plurality of optimal zones, each zone being
associated with a given quantum gate.

Determining the Optimal Operating Point

The method then comprises, for each operating point
located in the optimal zone, a step 7E6 comprising a
plurality of implementations of the target quantum gate, the
operating point for obtaining the best fidelity being chosen
as the optimal operating point, for example the operating
point with a symmetry point where there are the most
oscillations.

Results

As a result of this method, the exchange interaction for a
given quantum gate has been characterised thereby deter-
mining an adapted operating point for the quantum gate
considered.

Method for Determining the Conversion Factor
Between the Voltage Applied to the Gates of the
System and the Tunnel Coupling Between Both
Quantum Dots When using a system SYS according to the invention, it
may be of interest to determine the conversion factor
between the voltage applied to the gates and the tunnel
coupling $\Gamma_{QD}$. It has been shown previously that this factor
could be determined from the course of the position of the
S-T+ anti-crossing as a function of the magnetic field.

However, it is possible to determine this value using a
second method which will now be described. For this, an eighth aspect of the invention relates to a method 800 for
determining the conversion factor between a voltage applied
to the gates of a system SYS and the tunnel coupling $\Gamma_{QD}$
between both quantum dots QD1,QD2 of the pair CP of
quantum dots QD, the system SYS comprising a pair CP of
quantum dots containing two charged particles PC and
including a first quantum dot QD1 and a second quantum dot
(QD2), and the tunnel coupling $\Gamma_{QD}$ between both quantum
dots QD1,QD2 of the pair CP of quantum dots QD being
modulated using a plurality of gates, a set of voltages
applied to said gates of the plurality of gates defining an
operating point of the system SYS, the pair CP of quantum
dots QD being in one charge state from the charge state
(2,0), the charge state (1,1) and the charge state (0,2), and
both charged particles PC adopting either a singlet spin state
S or a triplet spin state T+.

Initialising the System

As illustrated in [FIG. 43], the method 800 includes a step
8E1 of initialising the system to a reading operating point
associated with the fully isolated regime and with the charge
state (2,0) and to a singlet spin state S.

In one embodiment, the position of the reading operating
point $P_{iso}$ is known.

In one embodiment, the position of the reading operating
point $P_{iso}$ is not known and the method according to the
invention comprises beforehand a step of determining an
operating point in the fully isolated regime using a method
100 according to the invention.

In one embodiment, initialising the system in the singlet
spin state is performed using a charging operating point
associated with the singlet state determined using a method
200 according to the invention and the method therefore
comprises, beforehand, a step of determining an operating
point.

Non-Adiabatic Modification

The method 800 then comprises a step 8E2 of modifying
the operating point so as to reach an operating point P10 to
be characterised, said modification being performed in a
non-adiabatic manner (with respect to the energy gap at the
anti-crossing between the singlet spin state S and the triplet
spin state T+). This non-adiabatic modification will result in
a coherent spin state oscillation between the singlet spin
state S and the triplet spin state T+.

Preferably, the operating point to be characterised is
associated with the charge state (1,1), with the exploration of
the operating points associated with the charge state (2,0) or
(0,2) being generally of little interest.

Waiting at the Operating Point to be Characterised

As illustrated in [FIG. 44], the method then includes a step
8E3 of waiting at the operating point to be characterised for
a randomly selected duration within the interval $$\left[\frac{1}{f_{Rabi}^{max}}, \frac{1}{f_{Rabi}^{min}}\right]$$

so as to allow the spin state to oscillate freely in a coherent
manner. As a reminder, $f_{Rabi}^{max}$ is the maximum oscillation
speed between the singlet spin state S and the triplet spin state T+ and $f_{Rabi}^{min}$ is the minimum oscillation speed between the S singlet spin state and the T+ triplet spin state.

Spin-Charge Conversion

As illustrated in [FIG. 45], the method then includes a spin/charge conversion step 8E4 using a conversion operating point. In the example of [FIG. 45], this conversion comprises a substep of modifying, from the initial operating point P10, the operating point so as to reach an operating point P20 having a value of the parameter $\Gamma_{QD}$ equal to the value of the parameter $\Gamma_{QD}$ of the conversion operating point P21, the modification being carried out in a non-adiabatic manner (with respect to the energy gap at the anti-crossing between the singlet spin state S and the triplet spin state T+). It then comprises a sub-step of modifying, from the operating point P20, the parameter ε so as to reach the conversion operating point P21, the modification of the parameter ε parameter being adiabatically made in comparison with the parameter $\Gamma_{QD}$.

In one embodiment, the conversion operating point is a known conversion operating point, for example determined using a method 400 according to the invention or any other method.

In one embodiment, the conversion operating point is an optimal conversion operating point and the method 800 therefore comprises beforehand, a step of determining an optimal conversion operating point using a method 400 according to the invention. Of course, it is also possible to determine such an operating point using other methods.

Determining the Charge State

As illustrated in [FIG. 46], the method 800 also includes a step 8E5 of determining the charge state using the reading operating point $P_{iso}$ in the fully isolated regime in which, for a reference duration, no exchange of charged particles PC is possible between the quantum dots QD1,QD2 of the pair CP of quantum dots QD. Since this step 8E5 was preceded by a conversion step 8E4, the measurement of the charge state allows spin state of the charged particles to be determined.

Characterising a Plurality of Operating Points

The preceding steps are repeated for a plurality of operating points P10 to be characterised and a plurality of times for each of these operating points so as to determine, for each of these operating points, the probability of measuring a singlet state S.

The mapping thus obtained is illustrated in [FIG. 47] (in this figure cross-talks have not been compensated for). It is possible to identify the crossing line of the singlet spin state S and the triplet spin state T+ on this mapping.

For this, the method also includes a step (8E6) of identifying the crossing line of the singlet spin state S and the triplet spin state T+.

Characterising the Crossing Line

The preceding steps (8E1-8E5) being repeated for a plurality of operating points (P10) located on a line perpendicular to the crossing line and for which the energy potential difference between both quantum dots of the pair of quantum dots is zero and passing through said crossing line, and for a plurality of magnetic fields so as to characterise course of the position of the crossing as a function of the magnetic field

Determining the Conversion Factor

The method 800 finally comprises a step 8E7 of determining, from this course, the conversion factor between the voltage applied to the gates of the system and the tunnel coupling $\Gamma_{QD}$ between both quantum dots QD1, QD2 of the pair CP of quantum dots QD.

Method for Determining the Conversion Factor Between the Voltage Applied to the System Gates and the Potential Difference Between Both Quantum Dots When using a system SYS according to the invention, it can be interesting to determine the conversion factor for knowing, from the gate voltage applied, the potential energy difference E between the two quantum dots QD.

For this, an eighth aspect of the invention illustrated in [FIG. 42] relates to a method 900 for determining the conversion factor between the voltage applied to the gates of the system and the potential difference between both quantum dots comprising two charged particles, both charged particles PC adopting either a "ud" spin state, a "du" spin state, a singlet spin state S in a ground state or a plurality of excited states, a triplet spin state T0 or a triplet spin state T+/T−.

Initialising the System

As illustrated in [FIG. 43], the method 900 includes a step 9E1 of initialising the system to a reading operating point associated with the fully isolated regime and the charge state (2,0) and to a singlet spin state S.

In one embodiment, the position of the reading operating point $P_{iso}$ is known.

In one embodiment, the position of the reading operating point $P_{iso}$ is not known, and the method according to the invention comprises beforehand a step of determining an operating point in the fully isolated regime using a method 100 according to the invention.

In one embodiment, the initialisation of the system into the singlet spin state is performed using a charging operating point associated with the singlet state determined using a method 200 according to the invention and the method therefore comprises, beforehand, a step of determining an operating point.

Non-Adiabatic Modification

The method 900 then comprises a step 9E2 of modifying the operating point so as to reach an operating point P10 to be characterised, said modification being performed non-adiabatically (with respect to the energy gap at the anti-crossing between the spin state T0 and the spin state T0 or the spin state T+) as a function of the tunnel coupling $\Gamma_{QD}$ between both quantum dots at the operating point P10 to be characterised.

This non-adiabatic modification will have the consequence, when the tunnel coupling is strong (that is a very large tunnel coupling compared to the fully isolated regime), of inducing a coherent oscillation of the spin state between the singlet spin state S and the triplet spin state T0 or the triplet spin state T+.

At a low tunnel coupling (that is a tunnel coupling close to the fully isolated regime), this modification will induce an excess of triplet by a process combining:

a tunnel process from the singlet state S of the charge state (2,0) in the ground state to the singlet charge states S (1,1) in excited states; and a relaxation process towards the "ud" and "du" spin states of the ground state of the charge state (1,1).

Preferably, the operating point to be characterised is associated with the charge state (1,1), with the exploration of the operating points associated with the charge state (2,0) or (0,2) being generally of little interest.

Waiting at the Operating Point to be Characterised

As illustrated in [FIG. 44], the method then includes a step 9E3 of waiting, under microwave excitation (that is a microwave wave at a given frequency is applied to the system during this waiting time), at the operating point to be characterised for a randomly chosen duration in the interval $$\left[\frac{1}{f_{Rabi}^{max}}, \frac{1}{f_{Rabi}^{min}}\right]$$

so that the spin state is allowed to oscillate freely and coherently. As a reminder, $f_{Rabi}^{max}$ is the maximum oscillation speed between the singlet spin state S and the triplet spin state T0 and/or the triplet spin state T+ and $f_{Rabi}^{min}$ is the minimum oscillation speed between the singlet spin state S and the triplet spin state T0 and/or the triplet spin state T+.

In other words, to establish the time interval, either the singlet S and triplet T0 spin states or the singlet S and triplet T+ spin states will be assumed as reference, or, for each determination of the time interval, one of the pairs ST0 or ST+ will be randomly chosen as reference.

Spin-Charge Conversion

As illustrated in [FIG. 45], the method then includes a spin/charge conversion step 9E4 using a conversion operating point. In the example of [FIG. 45], this conversion comprises a substep of modifying, from the initial operating point P10, the operating point so as to reach an operating point P20 having a value of the parameter $\Gamma_{QD}$ equal to the value of the parameter $\Gamma_{QD}$ of the conversion operating point P21, the modification being made non-adiabatically (with respect to the energy gap at the anti-crossing between the T0 spin state and the T+ spin state). It then comprises a sub-step of modifying, from the operating point P20, the parameter $\varepsilon$ so as to reach the conversion operating point P21, the modification of the parameter $\varepsilon$ being adiabatically made in comparison with the parameter $\Gamma_{QD}$.

In one embodiment, the conversion operating point is a known conversion operating point, for example determined using a method 400 according to the invention or any other method.

In one embodiment, the conversion operating point is an optimal conversion operating point and the method 900 therefore comprises beforehand, a step of determining an optimal conversion operating point using a method 400 according to the invention. Of course, it is also possible to determine such an operating point using other methods.

Determining the Charge State

As illustrated in [FIG. 46], the method 900 also includes a step 9E5 of determining the charge state using the reading operating point $P_{iso}$ in the fully isolated regime in which, for a reference duration, no exchange of charged particles PC is possible between the quantum dots QD1,QD2 of the pair CP of quantum dots QD. Since this step 9E5 was preceded by a conversion step 9E4, the measurement of the charge state allows the spin state of the charged particles to be determined.

Characterising a Plurality of Operating Points

The preceding steps are repeated for a plurality of operating points P10 to be characterised and a plurality of times for each of these operating points so as to determine, for each of these operating points, the probability of measuring a singlet state S.

The mapping thus obtained is illustrated in [FIG. 47] (in this figure, cross-talks have not been compensated for). It is possible to identify, in this mapping, lines corresponding to orbital excited states according to the process described above for the weak tunnel coupling case in the surrounded zone, one of these excitations being highlighted with a dashed line in [FIG. 47].

For this, the method comprises a step 9E6 of identifying at least one line of the orbital excited states.

Characterising the Excitation Line

The above steps being repeated for a plurality of operating points located on a line perpendicular to the line of orbital excited states and passing through said line so as to characterise excitation due to microwaves. In addition, characterisation of the excitation is repeated for a plurality of frequencies so as to measure course of the excitation as a function of the microwave frequency applied to the system during the waiting step 9E3.

Determining the Conversion Factor

It is then possible to determine, from this course, the conversion factor between the voltage applied to the system gates and the potential difference E between the two quantum dots QDs. Indeed, as illustrated in [FIG. 48], the application of a microwave frequency will generate, in addition to the central peak associated with the excited states, two secondary peaks located on either side of the main peak, the gap to the main peak being a function of the frequency applied. It is then possible to extract the conversion factor sought from the course of this gap.

For this, the method 900 finally comprises a step 9E7 of determining, from this course, the conversion factor between the voltage applied to the gates of the system and the potential difference E between both quantum dots QD1, QD2 of the pair CP of quantum dots QD. Once this conversion factor is known, it is then possible to deduce the parameters of the system which are charge energy of the system and energies associated with the orbital excited states.

The invention claimed is:

1. A method for determining an optimal spin/charge conversion operating point in a system comprising a pair of quantum dots comprising a first quantum dot and a second quantum dot, the pair of quantum dots containing two charged particles and adopting a first charge state {2,0} in which both charged particles are in the first quantum dot, a second charge state {1,1} in which each quantum dot contains a charged particle, or a third charge state {0,2} in which both charged particles are in the second quantum dot, the charge state being a function of the voltage applied to at least two gates configured to modulate a charge state of the pair of quantum dots, the value of the voltages defining an operating point of the pair of quantum dots; the charged particles adopting a first spin state, referred to as the singlet spin state S, or a second spin state, referred to as the triplet spin state among the triplet spin state T0 or the triplet spin state T+/T−, the method comprising:

a step of determining an operating point associated with two charged particles being in the singlet spin state S in the pair of quantum dots;

and, for each of a plurality of conversion operating points:

a step 4E1 of initialising the system in the singlet spin state S with the operating point associated with the two charged particles being in the singlet state S in the pair of quantum dots, the operating point at the end of the initialisation step being associated with the first charge state {2,0};

a step 4E2 of spin/charge converting the charge state of the system using the conversion operating point considered;

a step 4E3 of measuring the signal using a charge state detector comprising an electrometer for the charge state thus converted; and a step 4E4 of initialising the system in a spin state that can assume either the singlet state S or the triplet state T0 or T+/T− according to a set probability, referred to as the mixed spin state, using the operating point associated with the two charged particles being in the singlet state in the pair of quantum dots;

a step 4E5 of spin/charge converting the charge state of the system using the conversion operating point considered so as to obtain a mixed charge state;

a step 4E6 of measuring the signal measured by the charge state detector for the mixed charge state thus converted;

a step 4E7 of determining the difference between the signal measured for the charge state associated with the singlet spin state and the signal measured for the charge state associated with the mixed spin state;

both measurement steps 4E3 and 4E6 being carried out at an operating point associated with a fully isolated regime in which, for a reference duration, no exchange of charged particles is possible between the first quantum dot and the second quantum dot, the reference duration being greater than or equal to the time required for the implementation of the measurement step, the preceding steps 4E1-4E7 being repeated a plurality of times for each conversion operating point among the plurality of operating points so as to establish a difference between the signal associated with the singlet state and the signal associated with the mixed state, the conversion operating point for obtaining the highest difference being considered as the optimal spin/charge conversion operating point.

2. The method according to claim 1, comprising a step of determining an operating point associated with the fully isolated regime including:

a first sub-step of determining a stability diagram of the system so as to determine a plurality of charge states taken by the first quantum dot as a function of the operating point of the system;

from this stability diagram, a second sub-step of evaluating the operating points corresponding to an isolated regime of the first quantum dot with respect to the second quantum dot, the operating points not being in the isolated regime being considered in a non-isolated regime;

the step of determining an operating point associated with the fully isolated regime comprising, for a first charging operating point evaluated as being in the non-isolated regime during the evaluation sub-step and corresponding to a first charge state of the first quantum dot:

from the first charging operating point, a sub-step of modifying the operating point so as to obtain a second operating point in a regime evaluated as being the isolated regime during the evaluation sub-step and corresponding to the first charge state;

from the second operating point, a sub-step of modifying the operating point so as to obtain a third operating point, said third operating point being in a regime evaluated as being the isolated regime in the evaluation sub-step and corresponding to a second charge state different from the first charge state;

at the third operating point, a sub-step of waiting for a predetermined waiting time;

at the third operating point, a substep of determining the charge state of the first quantum dot;

the operating point of the system being reinitialised to the first charging operating point at the end of the sub-step of determining the charge state of the first quantum dot, the preceding four sub-steps being repeated for a plurality of waiting durations and a plurality of times for each of these waiting times so as to determine a probability of measuring the first charge state as a function of the waiting time, determine, from this probability, the tunnelling rate $\Gamma$ associated with the third operating point and, when the value of the tunnelling rate $\Gamma$ is less than a predetermined value dependent on the reference duration, select the third operating point as the operating point associated with the fully isolated regime.

3. The method according to claim 1, wherein the system also comprises a reservoir of charged particles, a tunnel coupling existing between the reservoir of charged particles and the pair of quantum dots, wherein initialisation, spin/charge conversion and signal measurement steps are implemented in an operating point associated with a partially isolated regime of the system in which, for a second reference duration greater than or equal to the duration required to implement the initialisation, spin/charge conversion and signal measurement steps, no exchange of charged particles is possible between the pair of quantum dots and the reservoir of charged particles, the method comprising a step of determining an operating point associated with the partially isolated regime including:

a first sub-step of determining a stability diagram of the system so as to determine a plurality of charge states assumed by the pair of quantum dots as a function of the operating point of the system;

from said stability diagram, a second sub-step of evaluating the operating points corresponding to a partially isolated regime of the pair of quantum dots with respect to the reservoir of charged particles, the operating points not being in the partially isolated regime being considered in a non-isolated regime;

the step of determining an operating point associated with the partially isolated regime comprising, for a first charging operating point evaluated as being in the non-isolated regime during the evaluation sub-step and corresponding to a first charge state of the pair of quantum dots:

from the first charging operating point, a sub-step of modifying the operating point so as to obtain a second operating point in a regime evaluated as being the partially isolated regime during the evaluation sub-step and corresponding to the first charge state;

from the second operating point, a sub-step of modifying the operating point so as to obtain a third operating point, said third operating point being in a regime evaluated as being the partially isolated regime in the evaluation sub-step and corresponding to a second charge state different from the first charge state;

at the third operating point, a sub-step of waiting for a predetermined waiting time;

at the third operating point, a sub-step of determining the charge state of the pair of quantum dots;

the operating point of the system being reinitialised to the first charging operating point at the end of the substep of determining the charge state of the pair of quantum dots, the four preceding substeps being repeated for a plurality of waiting durations and a plurality of times for each of these waiting times so as to determine a probability of measuring the first charge state as a function of the waiting time, determine, from this probability, the tunnelling rate $\Gamma$ associated with the third operating point and, when the value of the tunnelling rate $\Gamma$ is less than a predetermined value dependent on the second reference duration, select the third operating point as the operating point associated with the partially isolated regime.

4. The method according to claim 1, wherein the step of determining an operating point associated with charging of two charged particles in a singlet state in a pair of quantum dots comprises, for a plurality of operating points, called charging operating points and associated with a charge state of two charged particles:

a first sub-step of modifying the operating point of the pair of quantum dots so as to adopt the charging operating point considered, modifying being made along a first path, referred to as the charging path;

a sub-step of waiting at the charging operating point for a predetermined duration which is short compared with the relaxation time from the triplet spin state to the singlet spin state;

a second sub-step of modifying the operating point of the pair of quantum dots so as to adopt the reading operating point, modifying being made along a path reverse to the charging path, referred to as the reading path;

a sub-step of measuring the signal from the charge state detector, measuring being made at an operating point associated with the fully isolated mode;

the charging operating point being associated with charging a singlet state if the determined charge state is equal to zero, the reference duration being greater than or equal to the duration required to modify the operating point, measure the signal of the charge state detector and wait.

5. The method according to claim 4, wherein modifying in the charging path comprises:

from the reading operating point, a sub-step of modifying the operating point so as to obtain a second operating point not associated with a partially isolated regime and associated with the same charge state as the reading operating point;

from the second operating point, a sub-step of modifying the operating point so as to obtain the charging operating point considered, the latter not being associated with a partially isolated regime and being associated with a charge state of two charged particles;

and modifying according to the reading path comprises from the charging operating point considered, a sub-step of modifying the operating point so as to obtain the second operating point;

from the second operating point, a sub-step of modifying the operating point so as to return to the reading operating point.

6. A method for determining an operating point associated with optimal charging of two charged particles in a singlet state in a pair of quantum dots of a system, the system also comprising a reservoir of charged particles and a charge state detector comprising an electrometer for measuring the charge state whose signal is a function of the charge state of the pair of quantum dots, the pair of quantum dots being separated from the reservoir of charged particles by a potential barrier, said potential barrier and the charge state of the pair of quantum dots being modulated using a plurality of gate voltages, the value of said voltages defining an operating point of the system, two charged particles in the pair of quantum dots adopting a singlet spin state or a triplet spin state, the method comprising, from a reading operating point associated with a partially isolated regime in which, for a first reference duration, no exchange of charged particles is possible between the pair of quantum dots and the reservoir of charged particles, and for a plurality of operating points, referred to as the charging operating points and associated with a charge state of two charged particles, the method comprising:

a step of determining a plurality of operating points associated with charging of a singlet state S in the pair of quantum dots;

a step of determining a spin/charge conversion operating point using a method according to claim 5;

the method further comprising, for each charging operating point of the plurality of charging operating points:

a step of adiabatically charging the pair of quantum dots using the operating point considered;

a step of spin/charge converting the spin state of the charged particles in the pair of quantum dots using the spin/charge conversion operating point;

a step of determining the charge state of the pair of quantum dots so as to determine the spin state of the charged particles, determining the charge state being carried out in a fully isolated regime in which, for a second reference duration, no exchange of charged particles is possible between the quantum dots of the pair of quantum dots;

the three preceding steps being repeated a plurality of times for each charging operating point so as to determine, for each operating point, a statistic of the spin state measured, the first reference duration being greater than or equal to the time required to implement the spin/charge conversion step and the charge state determination step, the second reference duration being greater than or equal to the time required to determine the charge state of the pair of quantum dots, the operating points for obtaining a probability of charging a singlet state greater than a threshold probability being considered as the operating point for optimally charging two charged particles in a singlet state.

7. A system comprising a first subsystem and a second subsystem, the first subsystem and/or the second subsystem being likely to contain zero, one or more charged particles, a transport coupling existing between the first subsystem and the second subsystem, said coupling allowing exchange of one or more charged particles between the first subsystem and the second subsystem and being modulated by a gate voltage applied to one or more gates configured to form a potential barrier between the first subsystem and the second subsystem, the system also comprising a charge state detector comprising an electrometer for measuring the charge state of the first subsystem and/or the second subsystem, the system also comprising means configured to execute the steps of the method according to claim 1.

8. A non-transitory computer-readable medium comprising instructions, which when executed by a process, perform the method of claim 1.

\*    \*    \*    \*    \*